United States Patent [19]

Ito

[11] Patent Number: 5,438,967
[45] Date of Patent: Aug. 8, 1995

[54] INTERNAL COMBUSTION DEVICE

[75] Inventor: Yasusi Ito, Susono, Japan

[73] Assignee: Toyota Jidosha Kabushiki Kaisha, Toyota, Japan

[21] Appl. No.: 139,973

[22] Filed: Oct. 20, 1993

[30] Foreign Application Priority Data

Oct. 21, 1992 [JP] Japan .................................. 4-283007
Oct. 21, 1992 [JP] Japan .................................. 4-283018
Nov. 2, 1992 [JP] Japan .................................. 4-294298
Oct. 1, 1993 [JP] Japan .................................. 5-246984

[51] Int. Cl.$^6$ ............................................. F02M 3/00
[52] U.S. Cl. ........................... 123/339.12; 123/339.24
[58] Field of Search ............... 123/339, 520, 519, 672, 123/518, 406

[56] References Cited

U.S. PATENT DOCUMENTS

| | | | |
|---|---|---|---|
| 4,344,398 | 8/1982 | Ikeura | 123/339 |
| 4,683,861 | 8/1987 | Breitkruez et al. | 123/520 |
| 5,203,300 | 4/1993 | Orzel | 123/339 |
| 5,261,368 | 11/1993 | Umemoto | 123/339 |

FOREIGN PATENT DOCUMENTS

| | | |
|---|---|---|
| 191170 | 3/1989 | European Pat. Off. . |
| 62-20669 | 1/1987 | Japan . |
| 2-19631 | 1/1990 | Japan . |
| 4-194334 | 7/1992 | Japan . |
| 4-194354 | 7/1992 | Japan . |
| 4-295150 | 10/1992 | Japan . |

OTHER PUBLICATIONS

Copending U.S. application Ser. No. 795,979, filed Nov. 22, 1991.

Primary Examiner—Raymond A. Nelli
Attorney, Agent, or Firm—Kenyon & Kenyon

[57] ABSTRACT

An internal combustion engine having a combustion chamber, an intake passage and an exhaust passage, includes a fuel injector for feeding fuel to the engine and purge control apparatus for controlling the feeding of fuel vapor into the engine. The idling speed of the engine is controlled by adjusting a fuel injection operation and a purging operation while the engine is idling. The purging operation is carried out continuously while the engine is idling. A quantity of fuel which, in addition to the fuel vapor fed to the engine, is required to maintain an idling speed of the engine at a desired idling speed is calculated. The fuel injector is then controlled so that the required additional quantity of fuel is fed to the engine. When the required additional quantity of fuel becomes smaller than a predetermined minimum fuel injection amount, the fuel injection operation is stopped.

17 Claims, 44 Drawing Sheets

INJECTION INTO CYLINDER

INJECTION INTO INTAKE PORT

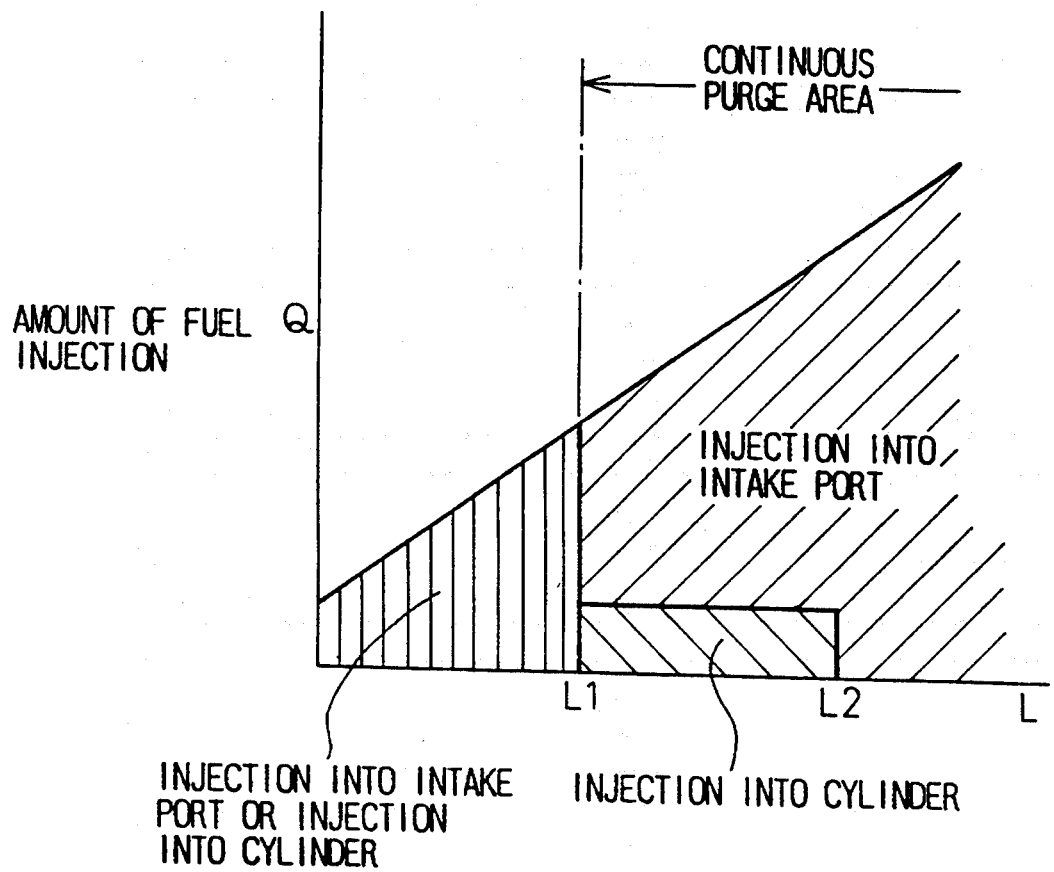

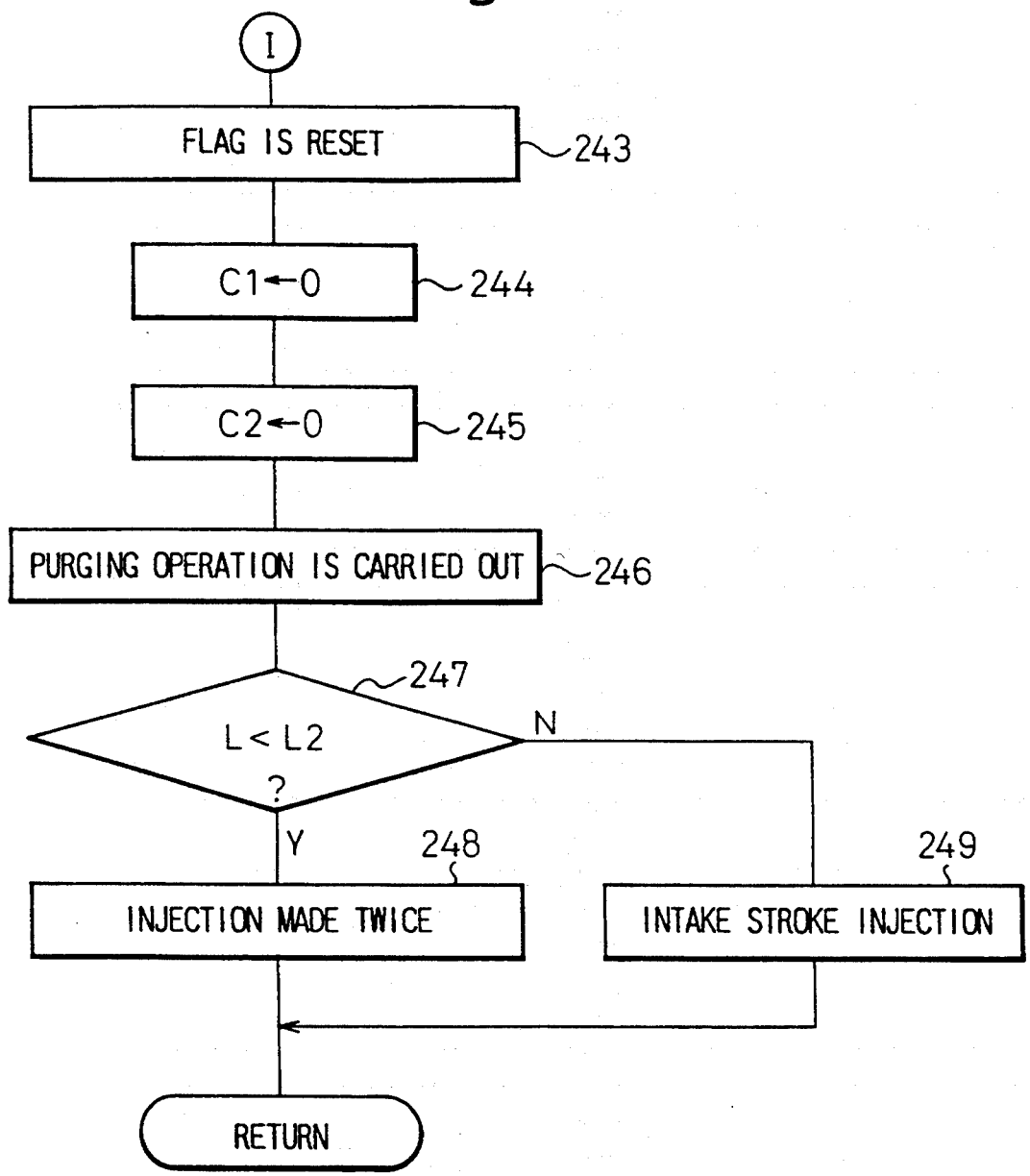

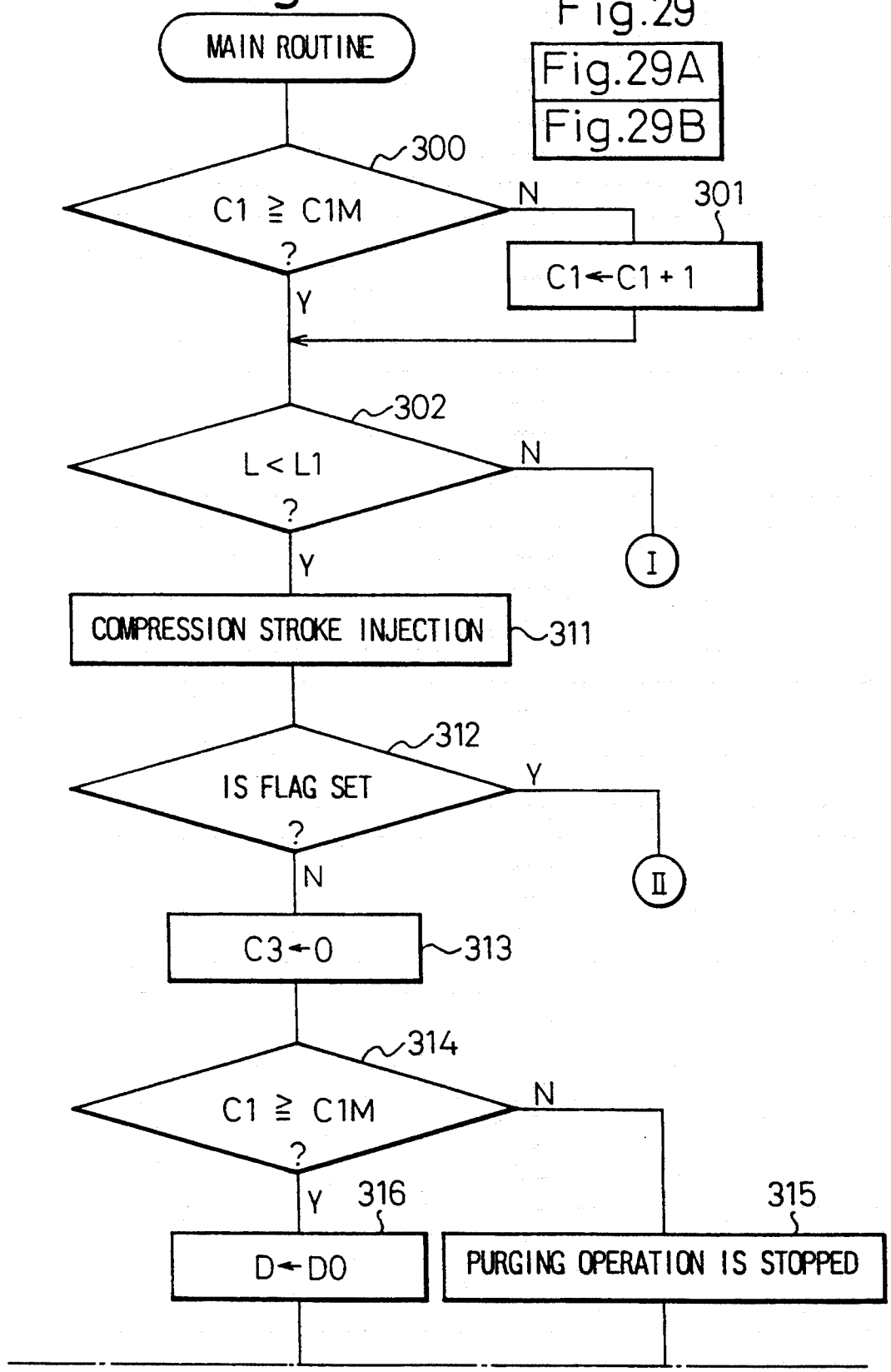

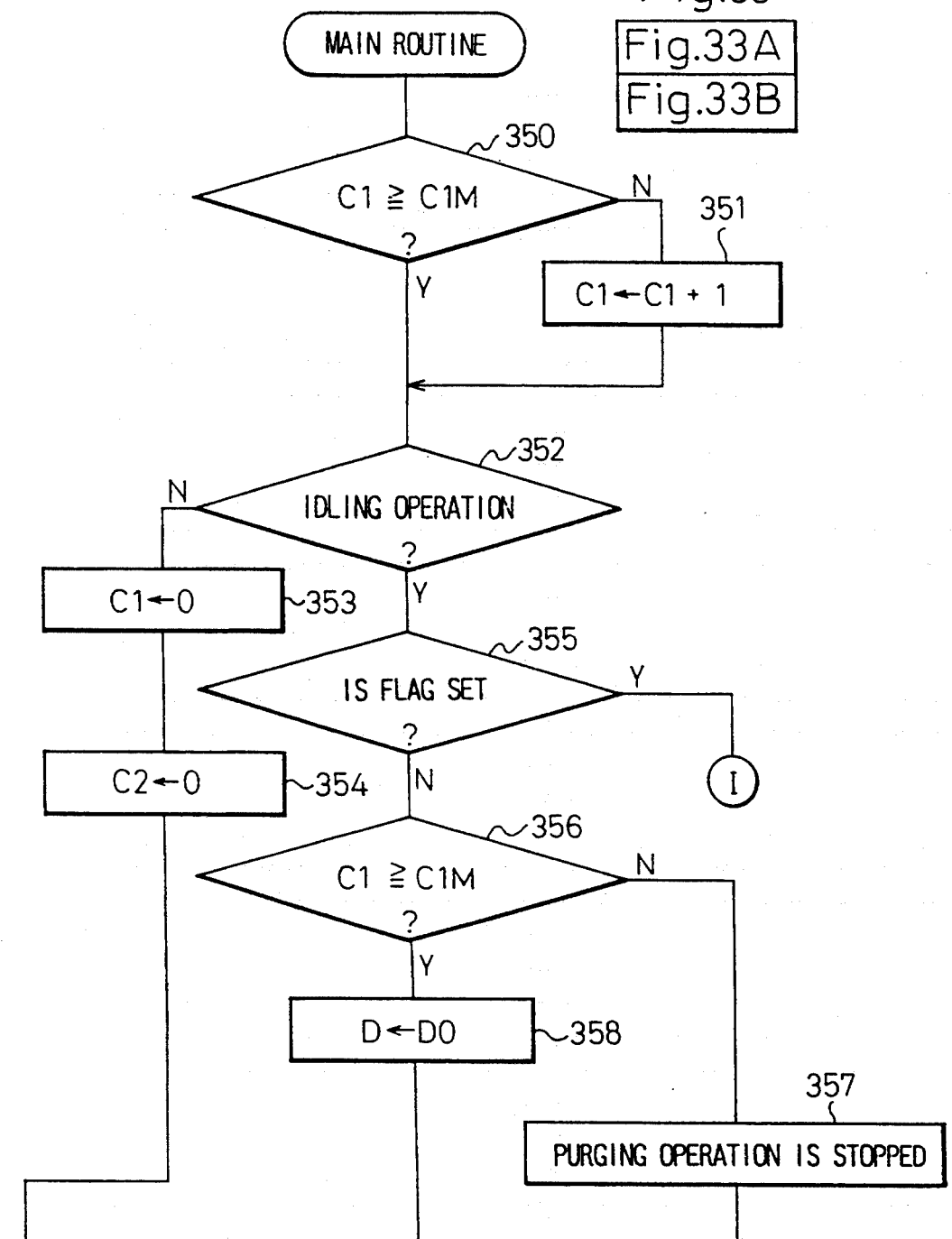

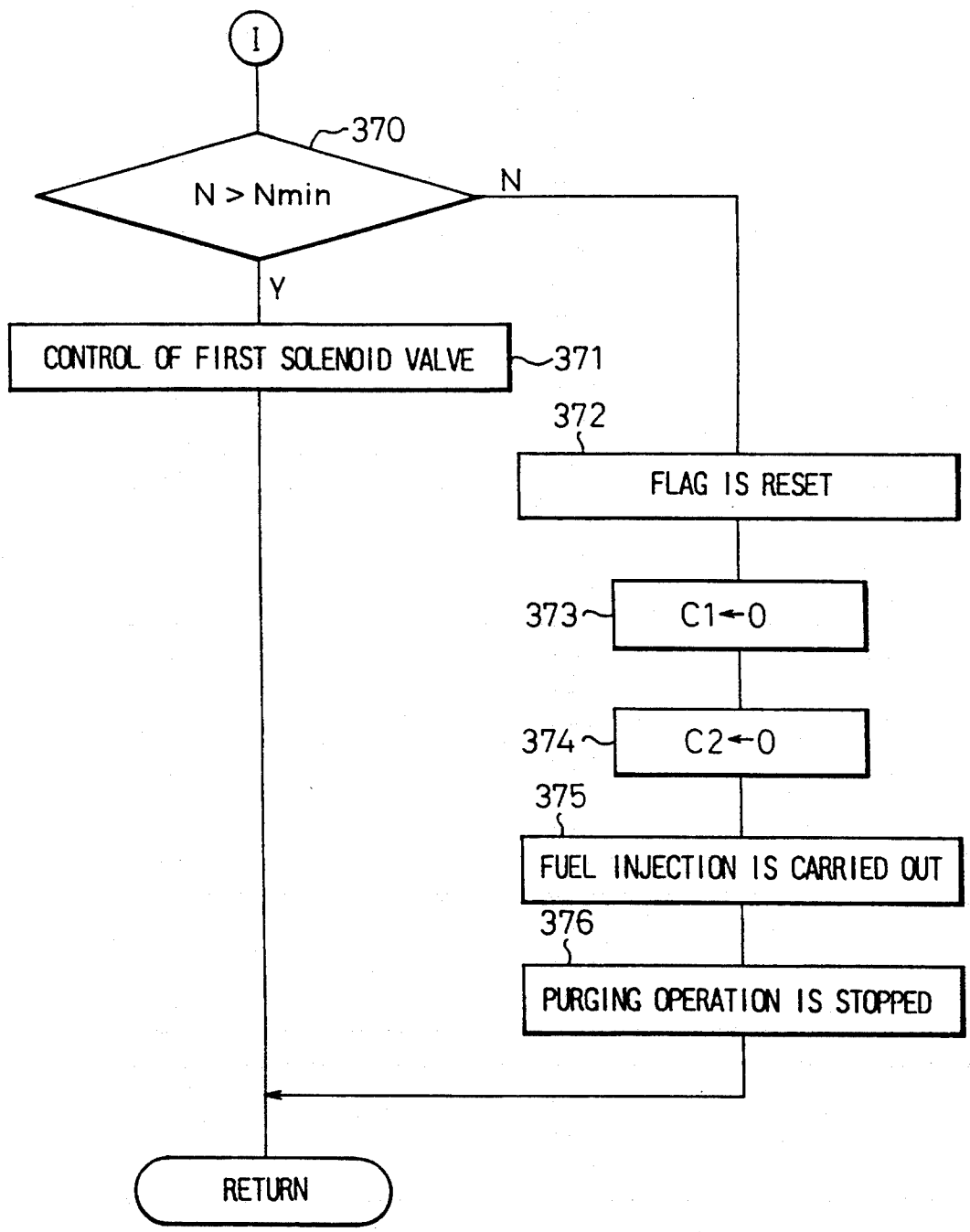

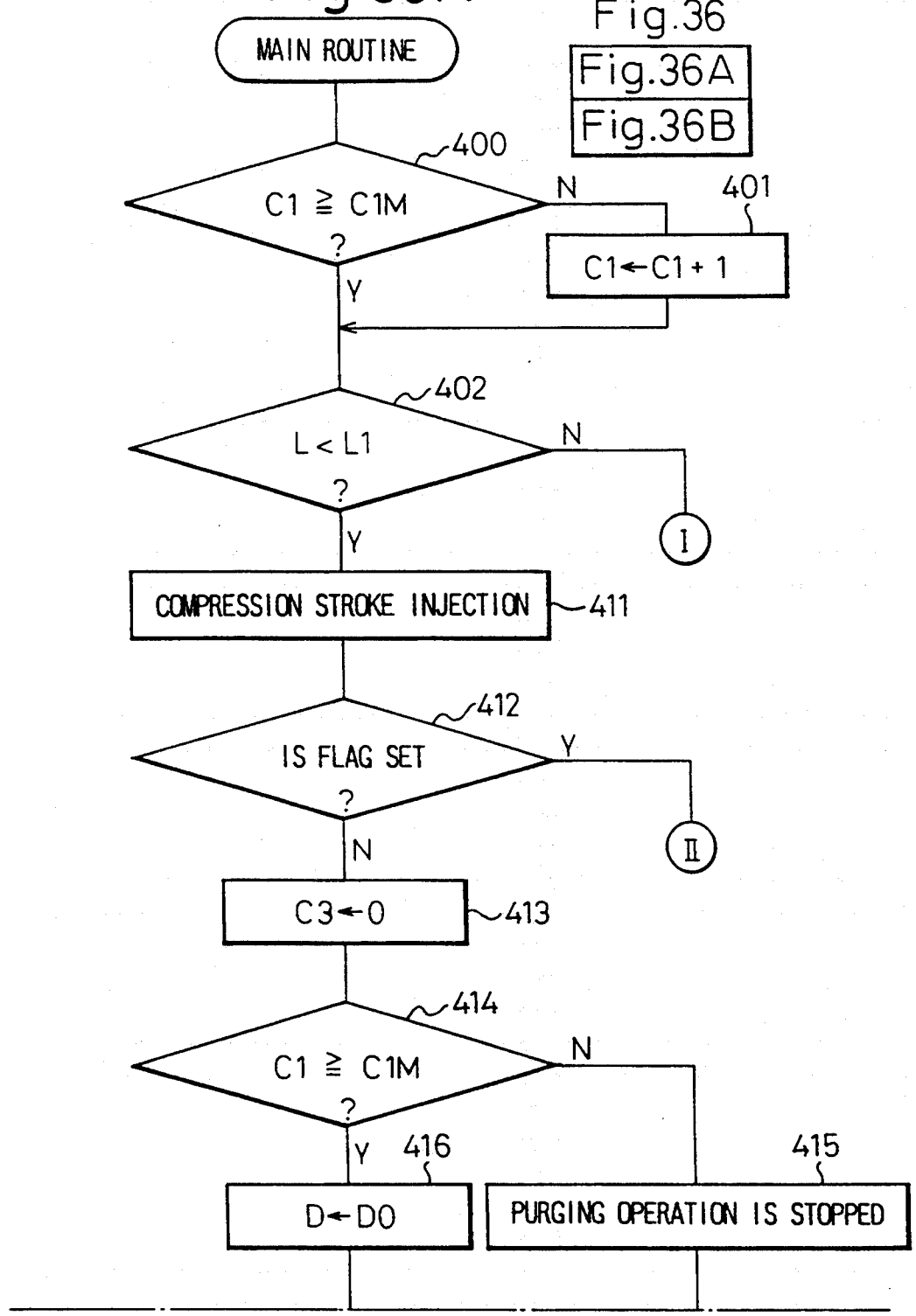

5,438,967

INTERNAL COMBUSTION DEVICE

BACKGROUND OF THE INVENTION

1. Field of the Invention

The present invention relates to an internal combustion engine.

2. Description of the Related Art

In a known internal combustion engine, the engine is provided with a fuel injection device and a purge control device(Japanese Unexamined Patent Publication (KOKAI) No. 62-20669).

Such a purge control device usually is provided with a charcoal canister having an activated carbon layer therein for adsorbing fuel vapor produced in, for example, the fuel tank, to prevent fuel vapor from being discharged into the outside air. When a purging operation is to be carried out, fuel vapor adsorbed by the charcoal canister is desorbed and fed into the combustion chamber of the engine. If the purging operation is carried out while the engine is idling, the idling speed of the engine may be increased above an acceptable limit. However, if the purging operation is stopped in order to maintain the idling speed of the engine within the acceptable range, the charcoal canister of the purge control device may become saturated with fuel vapor. This then results in the discharge of fuel vapor into the atmosphere.

In an another known internal combustion engine, when the engine is operating under a light load, an air-fuel mixture is formed in a restricted region in the combustion chamber. The remainder of the combustion chamber is filled with air, and the air-fuel mixture is ignited by the spark plug. Conversely, when the engine is operating under a middle load or under a high load, the entire interior of the combustion chamber is filled with an air-fuel mixture(Japanese Unexamined Patent Publication (KOKAI) No. 4-194354). Such an engine is also provided with the above-mentioned purge control device.

In such an engine, if the purging operation is carried out while the engine is idling, fuel vapor spreads into the air in the combustion chamber and a large portion of the fuel vapor may be discharged into the exhaust passage of the engine without being burned in the combustion chamber. If the purging operation is stopped while the engine is idling in order to prevent fuel vapor from being discharged into the exhaust manifold air without being burned in the combustion chamber, the charcoal canister of the purge control device may become saturated with fuel vapor. Thus the adsorbing capacity of the charcoal canister is reduced and fuel vapor may be discharged into the outside air without being adsorbed by the charcoal canister.

SUMMARY OF THE INVENTION

An object of the present invention is to provide an internal combustion engine capable of suppressing the discharge of harmful gas into the outside air and of maintaining an idling speed within a predetermined range.

According to the present invention, there is provided an internal combustion engine having a combustion chamber, an intake passage and an exhaust passage, the engine comprising: fuel injection means for feeding fuel to the engine; purge control means for controlling the feeding of fuel vapor into the engine; and combustion control means for controlling a fuel injection and a purging operation to substantially completely burn the fuel vapor in the combustion chamber when the purging operation is carried out during an idling operation of the engine and to maintain the idling speed of the engine within a predetermined range.

The present invention may be more fully understood from the description of preferred embodiments of the invention set forth below, together with the accompanying drawings.

BRIEF DESCRIPTION OF THE DRAWINGS

In the drawings:

FIGS. 14, 14A, 14B and 15 are a flow chart for executing a third embodiment;

FIG. 20 is a diagram illustrating the amount of the fuel injection of the forth embodiment;

FIGS. 21, 21A, 21B and 22 are a flow chart for executing a forth embodiment;

FIGS. 25, 25A, 25B and 26 are a flow chart for executing a fifth embodiment;

FIGS. 29, 29A, 29B, 30 and 31 are a flow chart for executing a sixth embodiment;

FIGS. 33, 33A, 33B, and 34 are a flow chart for executing a seventh embodiment;

FIGS. 36, 36A, 36B, 37 and 38 are a flow chart for executing a eighth embodiment.

DESCRIPTION OF THE PREFERRED EMBODIMENTS

Figure 1:
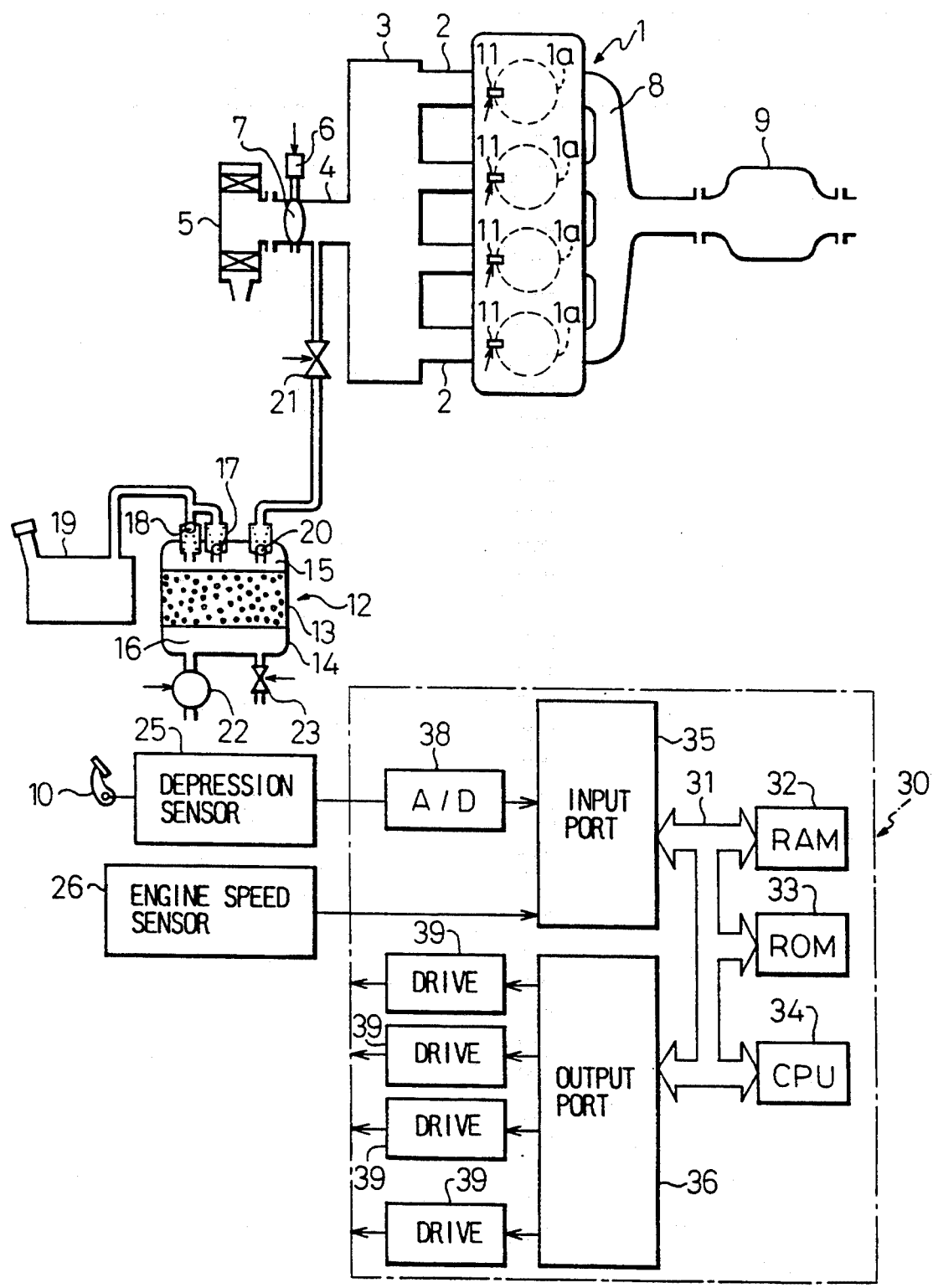
FIG. 1 is a general view of an engine.

Referring to FIG. 1, an engine body 1 has four cylinders 1a and each cylinder 1a is connected to a common surge tank 3 via a corresponding branch pipe 2. The surge tank 3 is connected to an air cleaner 5 via an intake duct 4. A throttle valve 7 driven by a stepping motor 6 is arranged in the intake duct 4. This throttle valve 7 is partly closed when the engine is operating under an extremely low load, and remains fully open when the engine load becomes higher.

The cylinders 1a are connected to an exhaust manifold 8, which is connected to a three-way catalytic converter 9. In addition, fuel injectors 11, provided for the corresponding cylinders 1a, and controlled signals output from an electronic control unit 30. In this embodiment, a fuel injection pressure for each of fuel injectors 11 is maintained at a predetermined pressure by a common pressure regulator (not shown).

As illustrated in FIG. 1, a purge control device 12 for feeding fuel vapor into the intake duct 4 is provided. This purge control device 12 comprises a charcoal canister 14 having an activated carbon layer 13 therein. A fuel vapor chamber 15 and an air chamber 16 are formed in the canister 14 on each side of the activated carbon layer 13. The fuel vapor chamber 15 is connected to a fuel tank 19 via a pair of check valves 17 and 18 arranged in parallel. The check valve 17 is arranged so that it allows flow only in a first direction while the check valve 18 is arranged so that it allows flow only in a direction opposite the direction of flow through the check valve 17. The fuel vapor chamber 15 is connected to the intake duct 4 downstream of the throttle valve 7 via a check valve 20 allowing only a flow of gas from the fuel vapor chamber 15 toward the intake duct 4, and via the first solenoid valve 21. This first solenoid valve 21 is driven by signals output from an electronic control unit 30. Further, the air chamber 16 is connected on one hand to an air feed pump 22, and on the other hand, to the outside air via a second solenoid valve 23.

When a purging operation is to be stopped, i.e., when the movement of fuel vapor to the intake duct 4 is to be stopped, the first solenoid valve 21 is closed and the air feed pump 22 is stopped. At the same time, the second solenoid valve 23 is opened. At this time, fuel vapor generated in the fuel tank 19 flows into the fuel vapor chamber 15 via the check valve 18, and this fuel vapor is adsorbed by the activated carbon of the activated carbon layer 13. Thereafter, the air from which the fuel component has been removed in the activated carbon layer 13 is discharged to the outside air via the second solenoid valve 23. When the pressure in the fuel tank 19 drops, the check valve 17 is opened to prevent the pressure drop from deforming the fuel tank 19.

When the purging operation is to be carried out, i.e., when fuel vapor is to be fed into the intake duct 4, the first solenoid valve 21 is opened and the second solenoid valve 23 is closed. At the same time, the air feed pump 22 is driven, discharging air into the air chamber 16. The air discharged into the air chamber 16 is then fed into the activated carbon layer 13. At this time, fuel adsorbed in the activated carbon is desorbed. Thereafter, air including this desorbed fuel component flows into the fuel vapor chamber 15. Then, the air containing the fuel vapor component therein is fed into the intake duct 4, via the check valve 20 and the first solenoid valve 21. As mentioned above, in the embodiment illustrated in FIG. 1, the throttle valve 7 remains fully open under all engine operating states other than the extremely low load operating state. The air feed pump 22 is provided to enable fuel vapor to be fed into the intake duct 4 even when the throttle valve 7 is fully open.

The electronic control unit 30 is constructed as a digital computer and comprises RAM (random access memory) 32, ROM (read only memory) 33, a CPU (microprocessor, etc.) 34, an input port 35 and an output port 36. The RAM 32, ROM 33, CPU 34, the input port 35 and the output port 36 are interconnected to each other via a bidirectional bus 31.

An accelerator pedal 10 is connected to a depression sensor 25 producing an output voltage proportional to the depression of the accelerator pedal 10. The voltage output from the depression sensor 25 is input to the input port 35 via an A/D converter 38. Further, an engine speed sensor 26, which produces output pulses representing an engine speed, is connected to the input port 35. The output port 36 is connected to the step motor 6, the fuel injectors 11, the first solenoid valve 21, the air feed pump 22, and the second solenoid valve 23 via corresponding drive circuits 39.

Figure 2:
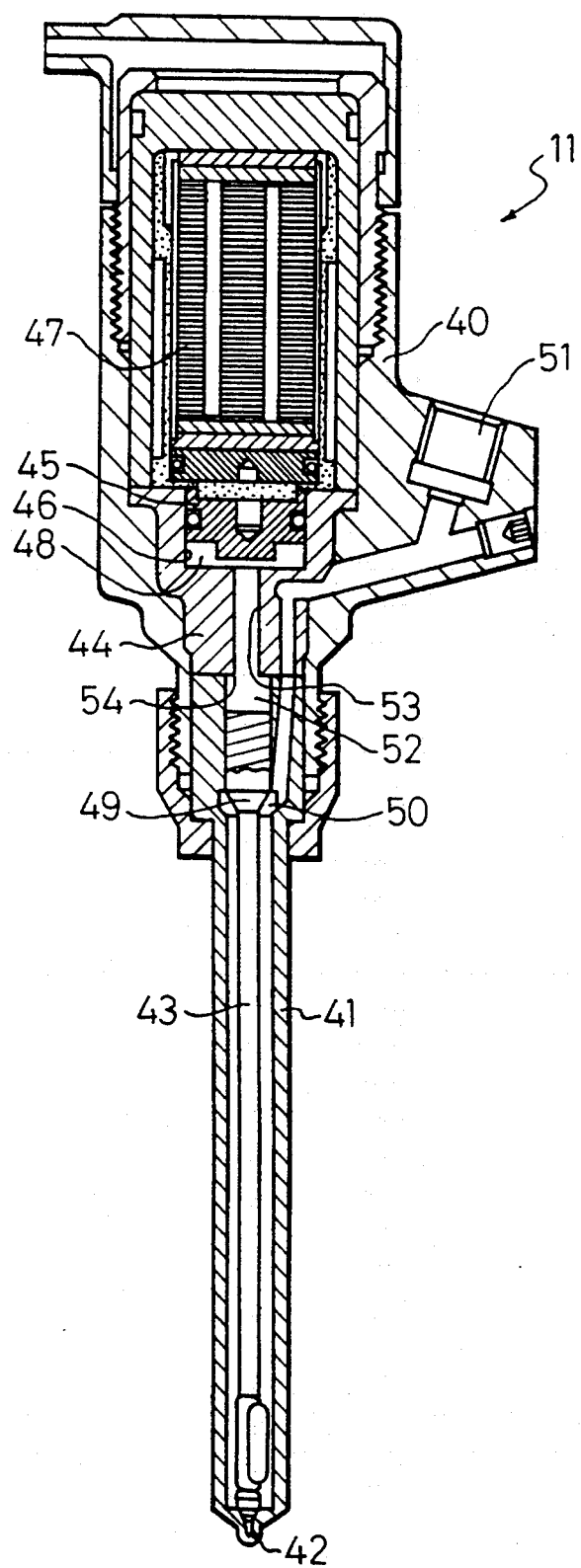
FIG. 2 is a cross-sectional view of a fuel injector.

FIG. 2 illustrates a cross-sectional view of the fuel injector 11 including a housing 40, a nozzle-holder 41 having a nozzle 42 at a tip thereof. A needle 43 is displacably arranged in the nozzle holder 41 and a piston-holder 44 is fitted into the housing 40. A piston 45 is slidably inserted into a piston-inserting-aperture 46 formed in the piston-holder 44. An actuator 47 which may be formed by, for example, a laminate of a piezoelectric element, is coupled to the piston 45. A pressure control chamber 48 is defined by a bottom face of the piston 45 in the piston-inserting-aperture 46. For the actuator 47, a magnetostrictive element can be used.

Also, around a substantially conical shaped surface 49 formed on the needle 43, a fuel collector 50 is formed. This fuel collector 50 is connected on one hand to the nozzle 42, and the other hand to a fuel inlet 51 connected to a fuel branch pipe (not shown), the fuel branch pipe being connected to the pressure regulator. As seen in FIG. 2, a back pressure chamber 52 is formed above the top face of the needle 43, and connected to the pressure control chamber 48 via a fuel opening 53 upwardly extending from a center portion of a top face of the back pressure chamber 52. Further, at the peripheral portion of the top face of the back pressure chamber 52, a needle-lift limiting face 54 is formed by a bottom face of the piston-holder 44.

When the actuator 47 shrinks in the direction of the actuator axis so as to start the fuel injection, the piston 45 is displaced upward. Since the needle 43 is not displaced at once even when the piston 45 is displaced upward, fuel pressure in the pressure control chamber 48 and the fuel opening 53 drops, and fuel pressure in the back pressure chamber 52 also drops, therefore, pressure acting to the top face of the needle 43 drops. When pressure acting on the top face of the needle 43 drops, the needle 43 is forced upward by fuel pressure acting on the conically shaped surface 49, and thereafter, when the needle 43 opens the nozzle 42, the fuel injection is started. Next, when the top face of the needle 43 abuts against the needle-lift limiting face 54, the upward displacement of the needle 43 is stopped.

When the actuator 47 is extended in the direction of the axis so as to stop the fuel injection, the piston 45 is displaced downward. Since the needle 43 does not displace at once even when the piston 45 is displaced downward, the fuel pressure in the pressure control chamber 48 and the fuel opening 53 rises, and fuel pressure in the back pressure chamber 52 also rises. Therefore pressure acting on the top face of the needle 43 rises. When the pressure acting on the top face of the needle 43 rises, the needle 43 is moved downward and, thereafter, when the needle 43 closes the nozzle 42, the fuel injection is stopped.

In such a fuel injector 11, the amount of fuel injected is controlled by controlling the time during which the nozzle 42 is open, i.e., by controlling the fuel injection time. Accordingly, the amount of the fuel injection becomes smaller as the fuel injection time becomes shorter. For such a fuel injector 11, however, there is normally a predetermined a minimum fuel injection time. Therefore, for such a fuel injector 11, there is a predetermined a minimum amount of fuel injection.

In this embodiment, when the fuel injection is carried out during an idling operation of the engine, the fuel injection time of the fuel injector 11 is feedback-controlled so that the idling speed of the engine is maintained at a predetermined, desired idling speed.

However, during an idling operation of the engine, a purging operation is continuously carried out. When the purging operation is carried out at the time of the idling operation of the engine, the fuel vapor fed into the engine is substantially completely burned, and thus the idling speed becomes higher than the desired idling speed. At this time, the fuel injection time is reduced, i.e., the amount of the fuel injection is reduced, as mentioned above, so that the idling speed is reduced to the desired idling speed. When a calculated fuel injection time is shorter than the minimum fuel injection time, the actual idling speed remains higher than the desired idling speed even when the fuel injection time is reduced to the minimum fuel injection time. The fuel injection time, however, cannot be reduced to less than the minimum fuel injection time. In the first embodiment of the present invention, when the calculated fuel injection time becomes shorter than the minimum fuel injection time, the fuel injection is stopped. Thus, the amount of fuel fed into the engine is reduced. Accordingly, the idling speed can be adjusted to correspond to the desired idling speed.

When the fuel injection is stopped during the idling operation of the engine, the idling speed is controlled by controlling the degree of opening of the first solenoid valve 21 so that the actual idling speed is maintained at the desired idling speed. During the time in which the purging operation is carried out, the amount of the fuel vapor desorbed from the activated carbon layer 13 becomes smaller, and thus the amount of the fuel vapor fed into the engine becomes smaller. Therefore, the idling speed is reduced during the time in which the purging operation is carried out even when the degree of opening of the first solenoid valve 21 is fully open. If, after the fuel injection has been stopped, the idling speed drops below a predetermined minimum tolerable idling speed, which is lower than the desired idling speed, fuel injection is resumed. Therefore, the actual idling speed can be maintained at the desired idling speed. At this time, the fuel injection time is made the minimum fuel injection time, and thus a rapid increase in the engine speed can be prevented.

According to this embodiment, during the idling operation of the engine, the activated carbon layer 13 of the purge control device 12 does not become saturated with the fuel vapor since the purging operation is carried out continuously, while the idling speed is maintained at the desired idling speed.

Next, a routine for executing the above described control of the fuel injection and the purging operation will be described with reference to FIGS. 3 and 4.

Figure 3:
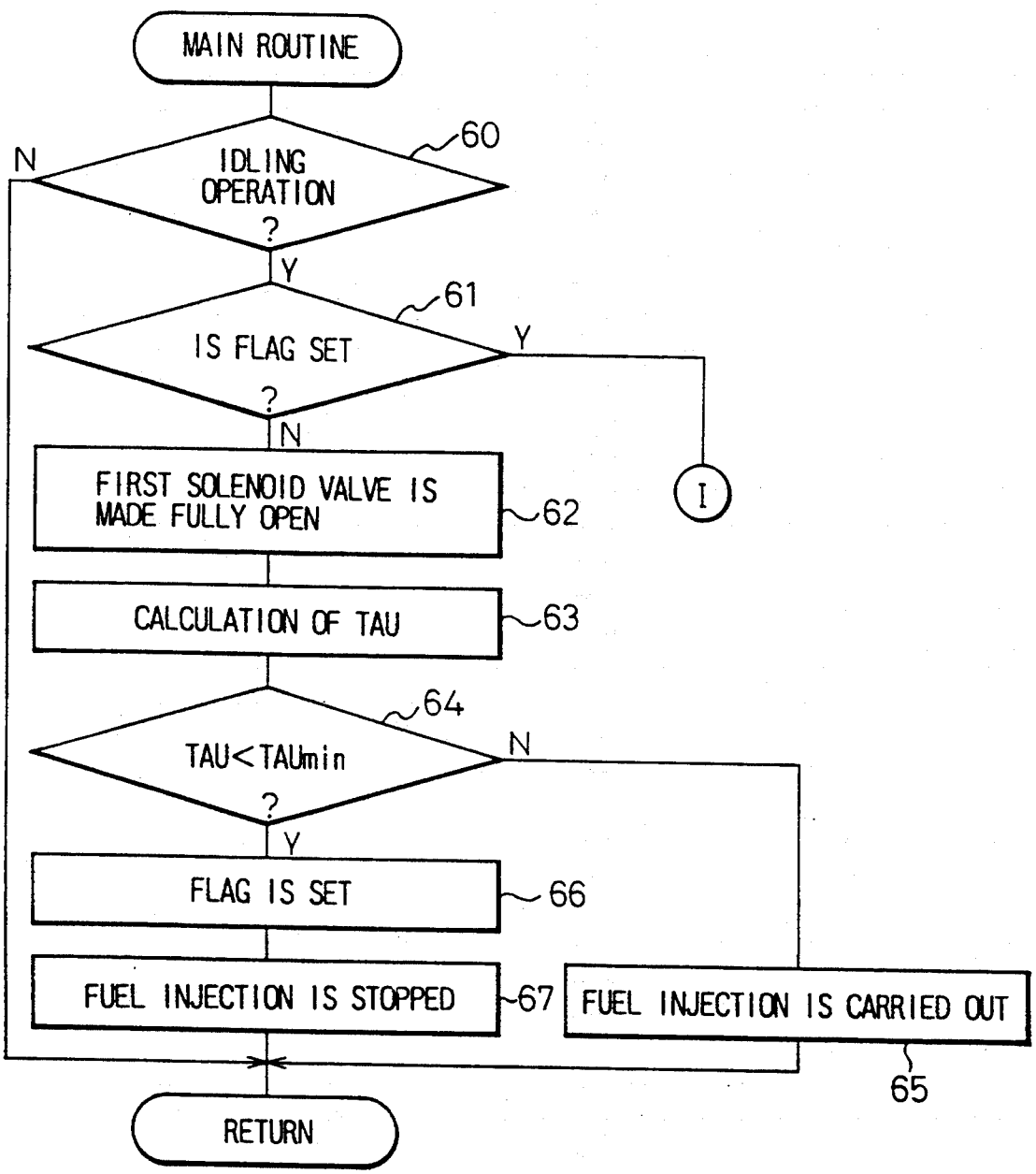
FIGS. 3 and 4 are a flow chart for executing a first embodiment.
Figure 4:
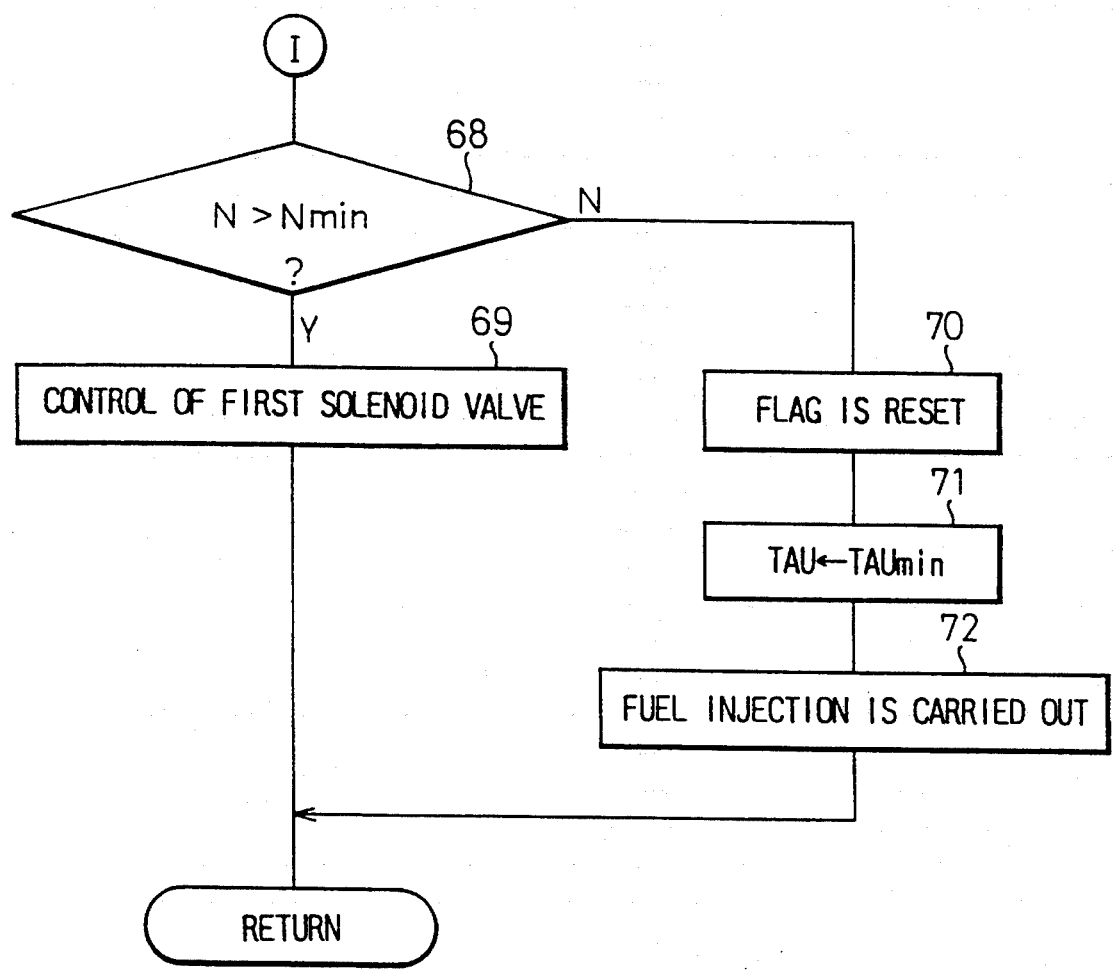

Referring to FIGS. 3 and 4, in step 60, it is determined whether or not the engine operating state is an idling operation. If the engine operating state is not the idling operation, the processing cycle is ended. If the engine operating state is an idling operation, the routine goes to step 61, and it is determined whether or not a flag, which is set when a fuel injection is to be stopped, is set. If the flag is reset, the routine goes to step 62. In step 62, the first solenoid valve 21 is made fully open. In step 63, the fuel injection time TAU is calculated. The fuel injection time TAU is feedback-controlled so that the actual idling speed is maintained at the desired idling speed, as mentioned above. In step 64, it is determined whether or not the calculated fuel injection time TAU is shorter than a minimum fuel injection time TAUmin, i.e., the amount of fuel to be injected is smaller than a minimum amount thereof. If TAU≧TAUmin, the routine goes to step 65, and fuel injection is carried out. If TAU<TAUmin, the routine goes to step 66, and the flag is set. In step 67, fuel injection is stopped.

If the flag is set, the routine goes from step 61 to step 68. In step 68, it is determined whether or not the actual idling speed N is higher than a tolerable minimum idling speed Nmin. If N>Nmin, the routine goes to step 69, and a degree of opening of the first solenoid valve 21 is feedback-controlled so that the actual idling speed is maintained at the desired idling speed. At this time, the fuel injection is still stopped. If N≦Nmin, the routine goes to step 70, and the flag is reset. In step 71, the fuel injection time TAU is made TAUmin, and in step 72, fuel injection is carried out again.

Figure 5:
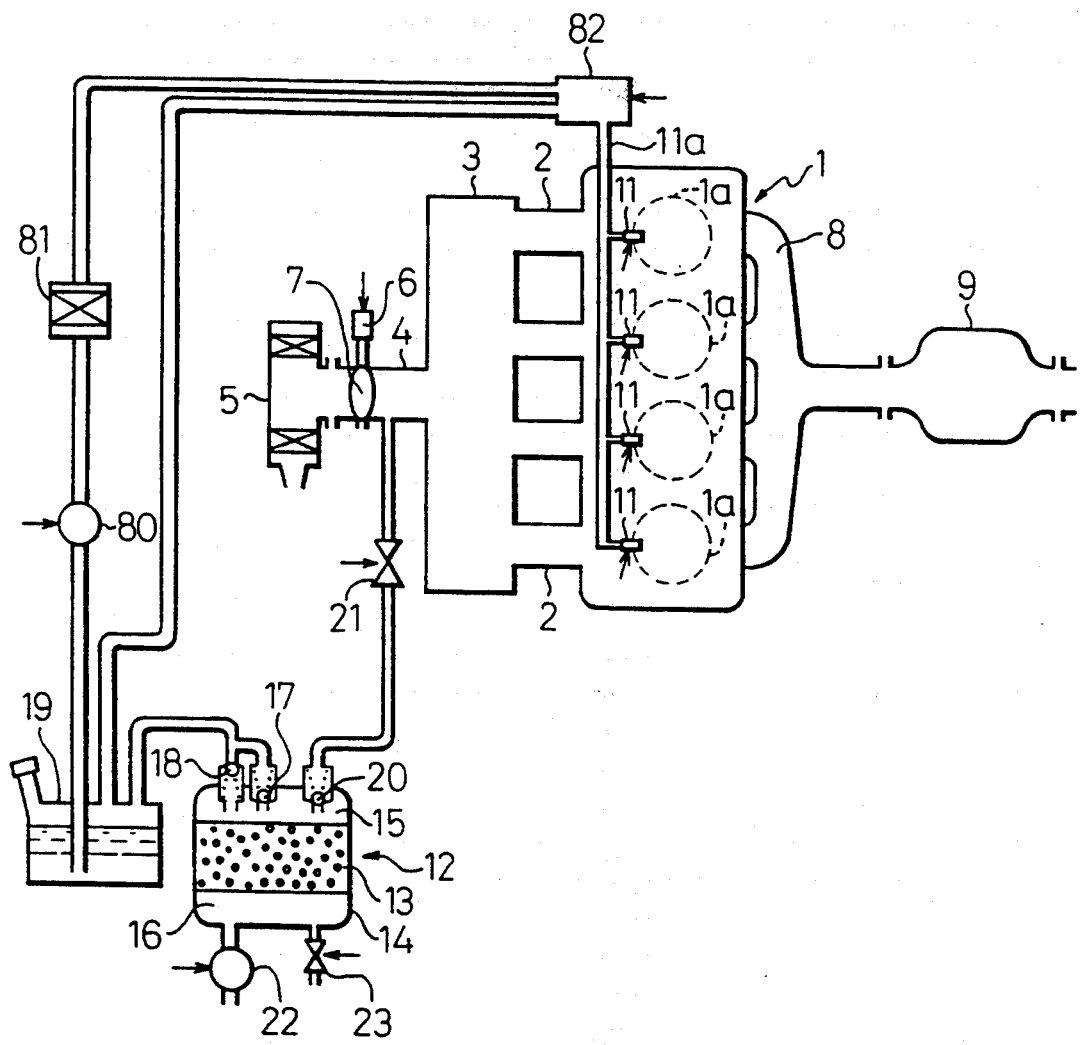
FIG. 5 is a general view of a second embodiment of an engine.

FIG. 5 illustrates a second embodiment of the present invention. In this embodiment, similar components are indicated with the same reference numerals as used in FIG. 1. Also, in this embodiment, an electronic control unit 30 as illustrated in FIG. 1 is provided, but this electronic control unit is not depicted in FIG. 5.

Referring to FIG. 5, fuel pumped by a fuel pump 80 from the fuel tank 19 is fed to a fuel-pressure control device 82 via a fuel cleaner 81, and then fed to each of the fuel injectors 11 via a common fuel supply pipe 11a. The fuel-pressure control device 82 controls fuel pressure at which the fuel injection is carried out, i.e., the fuel injection pressure, and is driven by signals from the electronic control unit. Fuel pressure at which the fuel injection is carried out is normally maintained at a predetermined, constant value.

In the second embodiment, the purging operation is continuously carried out during the idling operation of the engine, as in the first embodiment. In this embodiment, when the idling speed is higher than the desired idling speed, the fuel injection time is reduced, i.e., the amount of the fuel injection is reduced so that the actual idling speed is reduced to the desired idling speed, while the fuel injection pressure is maintained at the constant pressure by the fuel-pressure control device 82. When the idling speed exceeds the desired idling speed even after the fuel injection time has been adjusted to minimum fuel injection time, the fuel injection pressure is reduced by the fuel-pressure control device 82 so that the actual idling speed is reduced to the desired idling speed. There is, however, a predetermined tolerable minimum fuel injection pressure for the fuel injectors since, if the fuel injection pressure is made too low, fuel cannot be vaporized enough to be burned substantially completely. Accordingly, at the time when the fuel injection time is the minimum time and the fuel injection pressure is the minimum pressure, the amount of fuel injected is the minimum fuel injection amount.

When the actual idling speed is higher than the desired idling speed even when the fuel injection is the minimum amount of fuel, the fuel injection is stopped. Accordingly, the idling speed can be made to correspond to the desired idling speed.

When fuel injection is stopped during the idling operation of the engine, the idling speed is controlled by feedback-controlling the first solenoid valve 21 so that the actual idling speed is maintained at the desired idling speed. Thereafter, if the idling speed becomes lower than the tolerable minimum speed after the fuel injection has been stopped, the fuel injection is carried out again. Therefore, the actual idling speed can be maintained at the desired idling speed. At this time, the amount of fuel injection is made the minimum amount of fuel injection.

The amount of fuel injection is normally much larger than the amount of the fuel vapor purged by the purging operation. Therefore, when fuel injection is started again during the idling operation of the engine, the idling speed increases quickly. In this embodiment, when fuel injection is started again during the idling operation of the engine, the amount of fuel injection is made the minimum amount thereof. Accordingly, the increase in the idling speed at the time of restarting fuel injection can be reduced as much as possible. On the other hand, when fuel injection is to be stopped during the idling operation of the engine, the fall in the idling speed can also be reduced as much as possible, since the amount of fuel injection has been made the minimum amount thereof at this time, in this embodiment.

Next, the routine for executing the above-mentioned second embodiment will be described with reference to FIGS. 6A, 6B and 7.

Figures 6, 6A, 6B:
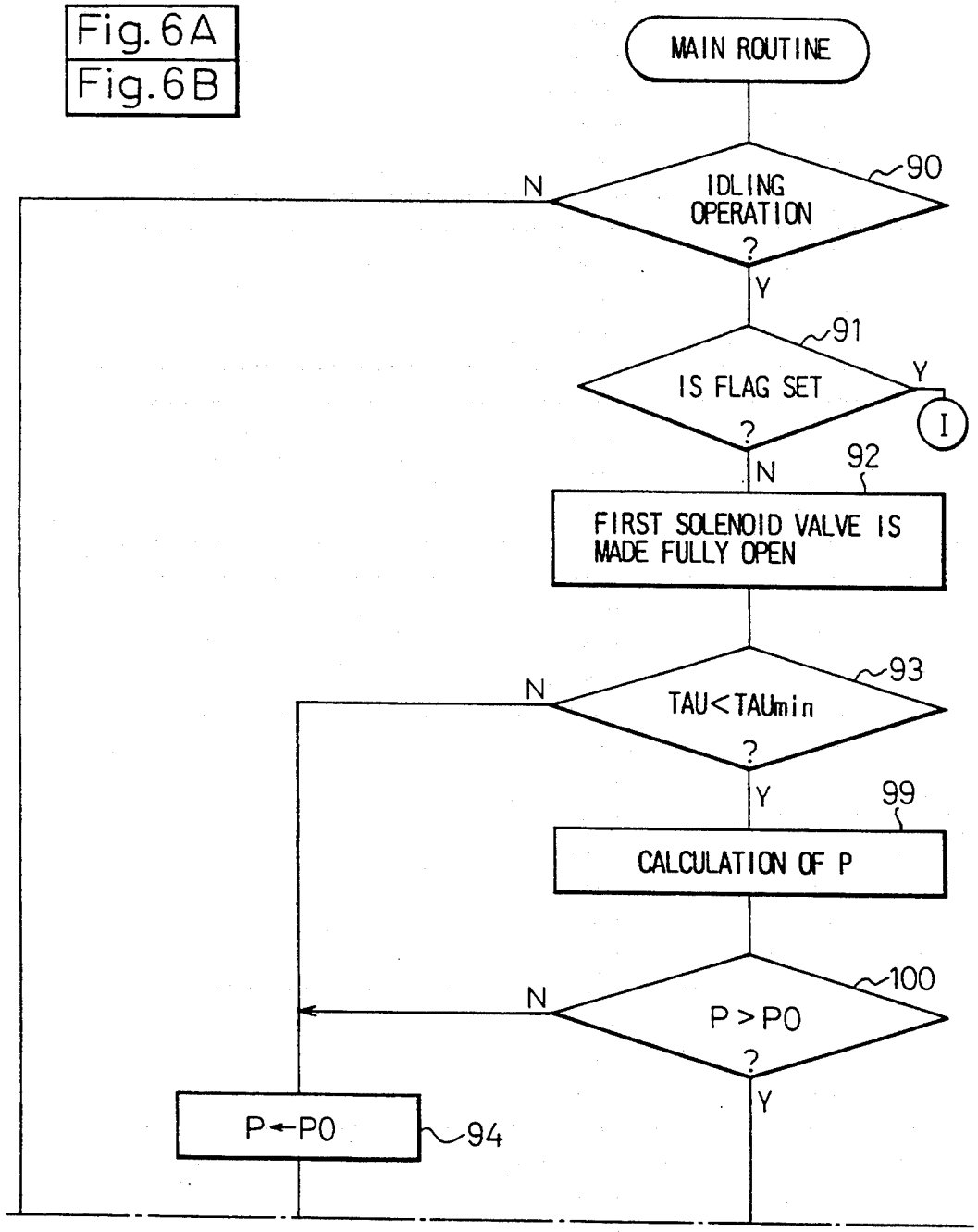
FIGS. 6, 6A, 6B and 7 are a flow chart for executing a second embodiment.
Figure 6B:
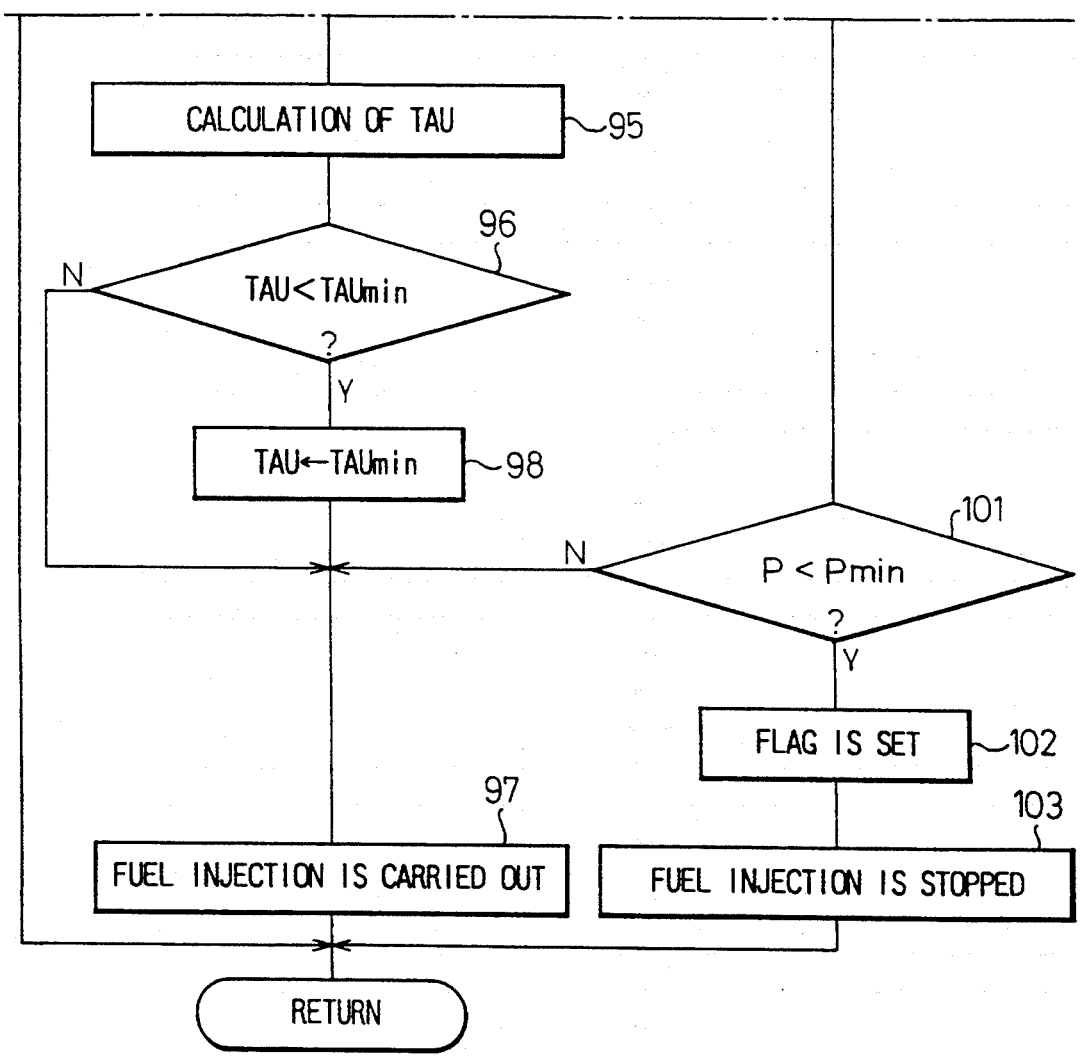
Figure 7:
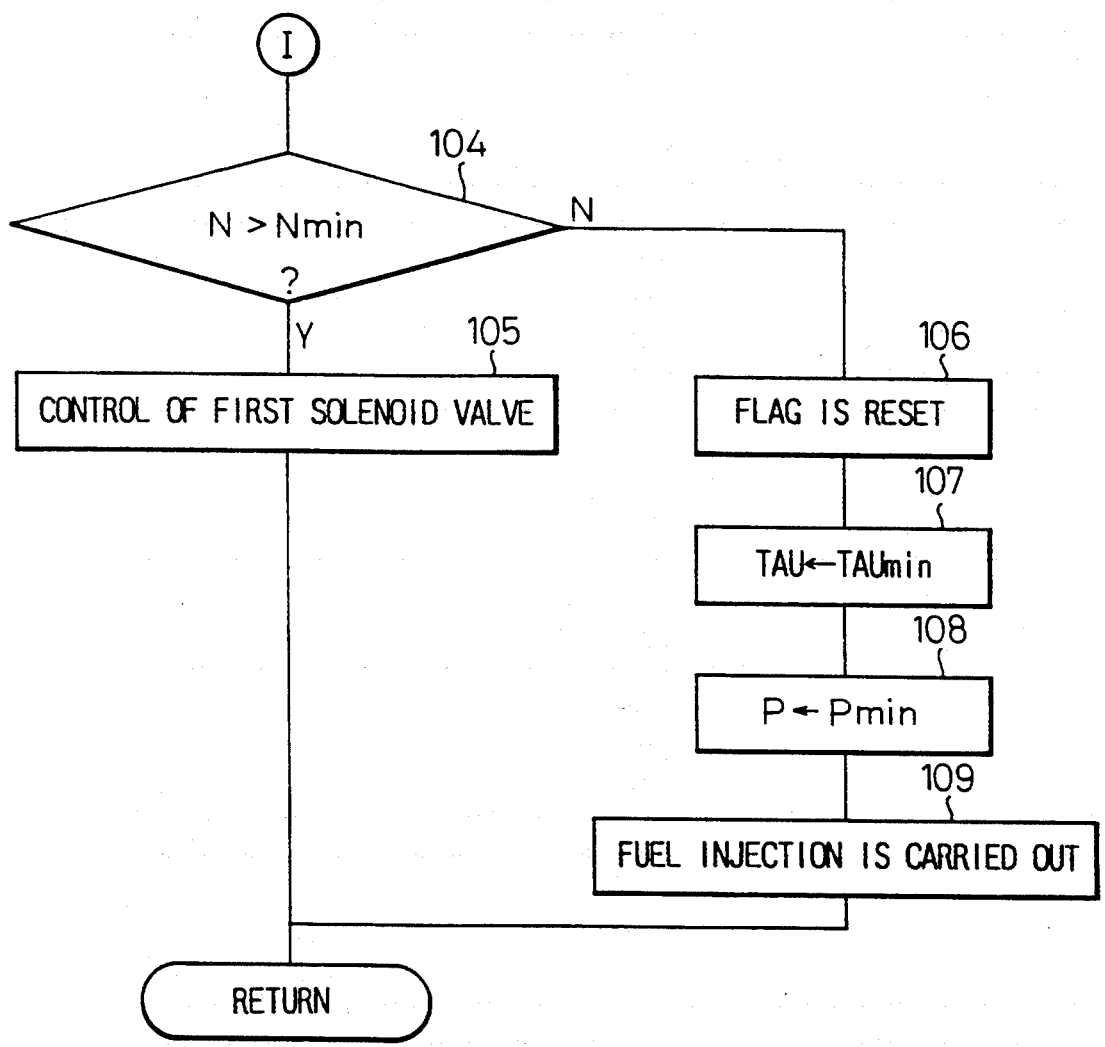

Referring to FIGS. 6A, 6B and 7, in step 90, it is determined whether or not the engine operating state is the idling operation. If the engine operating state is not the idling operation, the processing cycle is ended. If the engine operating state is the idling operation, the routine goes to step 91, and it is determined whether or not a flag which is set when the fuel injection is to be stopped during the idling operation of the engine, is set. If the flag is reset, the routine goes to step 92. In step 92, the first solenoid valve 21 is made fully open. In step 93, it is determined whether or not a fuel injection time TAU, which was calculated in the preceeding processing cycle, equals a minimum fuel injection time TAUmin. Since the fuel injection time TAU is normally longer than the minimum fuel injection time TAUmin, the routine normally goes to step 94. In step 94, a desired fuel injection pressure P is made a predetermined, constant pressure P0. In this embodiment, another routine (not shown) is provided to maintain an actual fuel injection pressure at this desired fuel injection pressure P. In the routine shown in FIGS. 6A, 6B and 7, only calculation of the desired fuel injection pressure P is carried out. In step 95, the fuel injection time TAU, when the desired fuel injection pressure P equals the constant P0, is calculated. The fuel injection time TAU is feedback-controlled so that the actual idling speed is maintained at the desired idling speed. In step 96, it is determined whether or not the calculated fuel injection time TAU is shorter than the minimum fuel injection time TAUmin, i.e., the amount of fuel injection becomes the minimum amount of fuel injection when the desired fuel injection pressure P equals the constant P0. If TAU≧TAUmin, the routine goes to step 97, and fuel injection, wherein the fuel injection time is made the calculated fuel injection time TAU, is carried out. If TAU<TAUmin, the routine goes to step 98, and the fuel injection time TAU is made the minimum fuel injection time TAUmin. Thereafter, in step 97, fuel injection, wherein the fuel injection time is made the minimum fuel injection time TAUmin, is carried out.

In the next processing cycle, the routine goes from step 93 to step 99 when the fuel injection time equals the minimum time of fuel injection TAUmin. In step 99, the desired fuel injection pressure P, wherein the fuel injection time TAU equals the minimum time TAUmin, is calculated. In step 100, it is determined whether or not the desired fuel injection pressure P is higher than the constant pressure P0. Since, at this time, the desired fuel injection pressure P is normally lower than the constant pressure P0, the routine normally goes to step 101. In step 101, it is determined whether or not the desired fuel injection pressure P is lower than the tolerable minimum pressure of fuel injection Pmin. If P≧P0, the routine goes to step 97, and the fuel injection wherein the desired pressure of the fuel injection P is made the calculated pressure, is carried out. If P<P0, then the routine goes to step 102, and the flag is set. In step 103, fuel injection is stopped.

If the flag is set, the routine goes from step 91 to step 104. In step 104, it is determined whether or not the actual idling speed N is higher than the tolerable minimum idling speed Nmin. If N>Nmin, the routine goes to step 105, and a degree of opening of the first solenoid valve 21 is feedback-controlled so that the actual idling speed is maintained at the desired idling speed. At this time, fuel injection is still stopped. If N≦Nmin, the routine goes to step 106, and the flag is reset. In step 107, the fuel injection time TAU is made TAUmin, and in step 108, the desired fuel injection pressure P is made Pmin. In step 109, fuel injection is carried out again.

After the fuel injection is restarted, the desired fuel injection pressure P is feedback-controlled so that the idling speed is maintained at the desired idling speed, while the fuel injection time TAU remains the minimum fuel injection time TAUmin. At this state, when the desired fuel injection pressure P increases and thus the desired fuel injection pressure P becomes higher than the constant pressure P0, the routine goes from step 100 to step 94, and the desired fuel injection pressure P is made the constant pressure P0. Thereafter, the fuel injection time TAU is feedback-controlled so that the idling speed is maintained at the desired idling speed, while the desired fuel injection pressure P remains the constant pressure P0. On the other hand, when the desired fuel injection pressure P becomes lower than the tolerable minimum pressure Pmin when the desired fuel injection pressure P is feedback-controlled with the minimum fuel injection time TAUmin, then the routine goes from step 101 to step 102, and fuel injection is stopped again.

According to this embodiment, the activated carbon layer 13 of the purge control device 12 does not become saturated with fuel vapor since while the engine is idling the purging operation is carried out continuously, while the idling speed is maintained at the desired idling speed.

In the embodiments described above, each of the fuel injectors 11 injects fuel into a cylinder. Alternatively each of the fuel injectors 11 may be arranged in the corresponding branch pipe 2, and may inject fuel into an intake passage.

Figure 8:
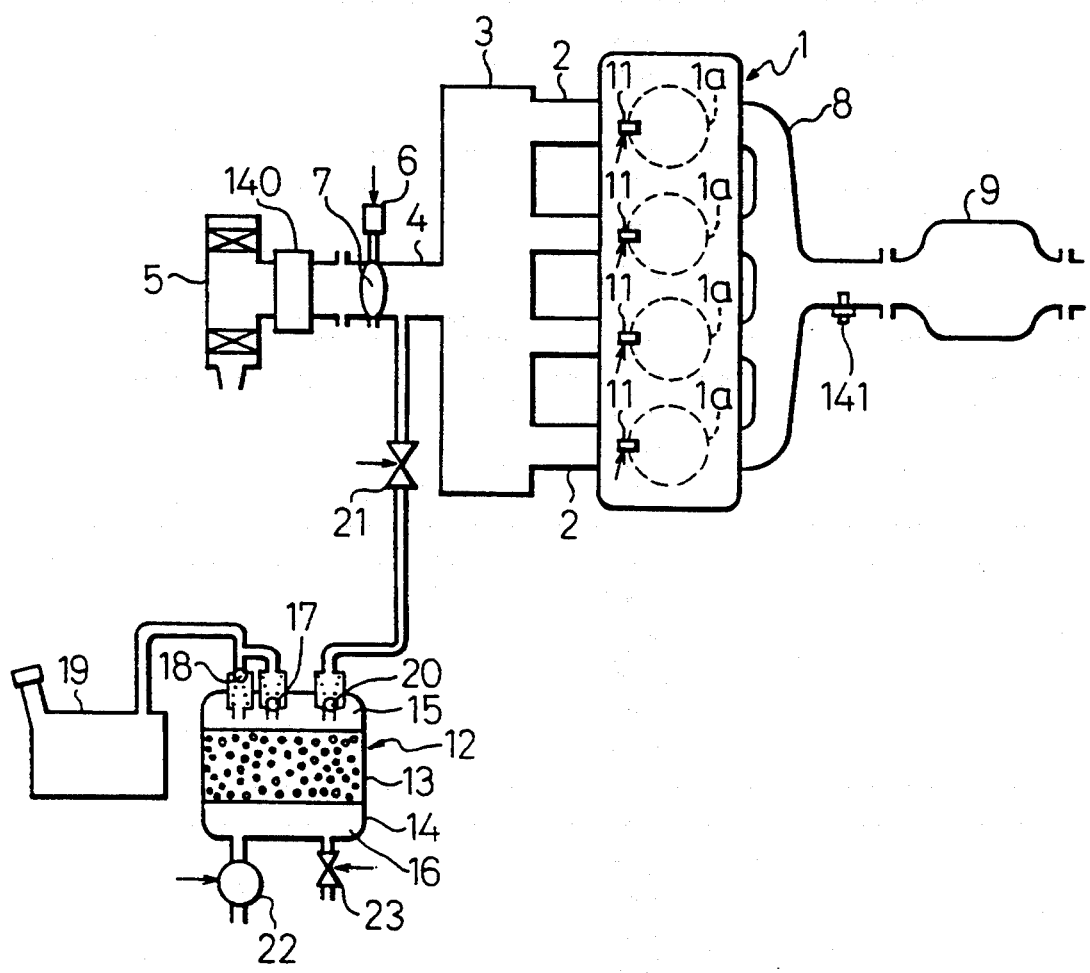
FIG. 8 is a general view of a third embodiment of an engine.

FIG. 8 illustrates a third embodiment. In this embodiment, similar components are indicated with the same reference numerals as used in FIG. 1. Also, in this embodiment, an electronic control unit 30 as illustrated in FIG. 1 is provided, but this electronic control unit is not depicted in FIG. 8. Further, the fuel injection pressure is maintained at a predetermined, constant pressure in this embodiment.

Referring to FIG. 8, an air flow meter 140 is arranged between the intake duct 4 and the air cleaner 5. This air flow meter 140 produces an output voltage proportional to the amount of an intake air fed into the engine, and this output voltage is input to the input port of the electronic control unit, via an A/D converter. Also, an oxygen sensor 141 is provided at the downstream portion of the exhaust manifold 8. This oxygen sensor produces an output voltage proportional to the concentration of oxygen in exhaust gas, and this output voltage is input to the input port of the electronic control unit, via an A/D converter. In this embodiment, using the amount of the intake air fed into the engine detected by the air flow meter 140, and using the concentration of oxygen in exhaust gas detected by the oxygen sensor 141, the air-fuel ratio in the engine can be calculated.

Figure 9:
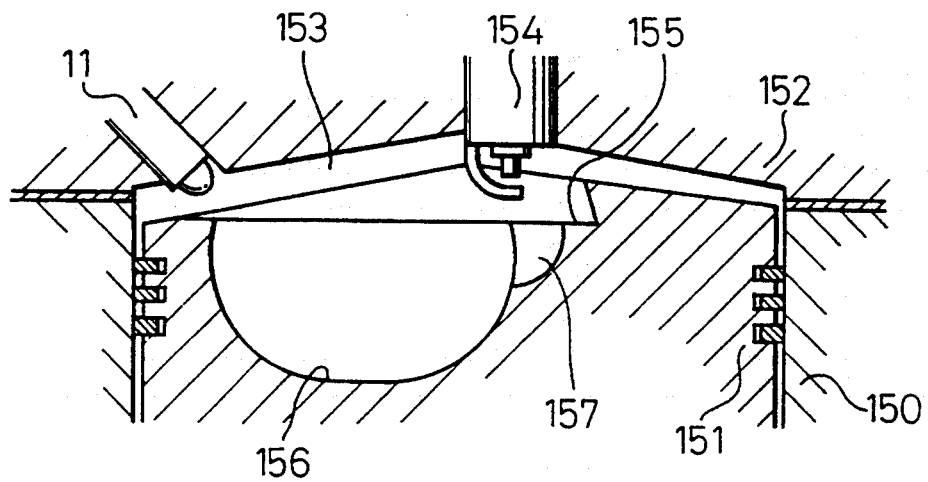
FIG. 9 is a cross-sectional view of the combustion chamber of the engine.
Figure 10:
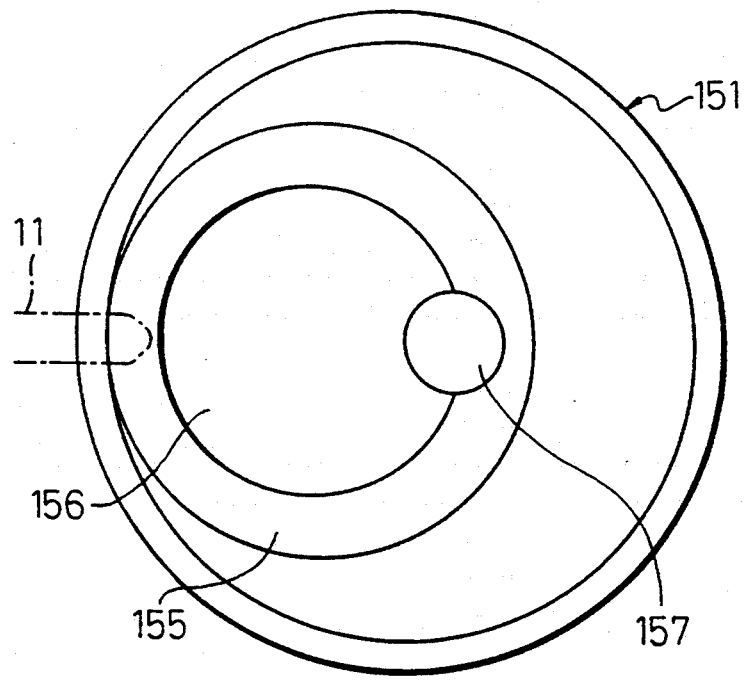
FIG. 10 is a plan view of a piston.

FIGS. 9 and 10 illustrate the construction of the combustion chamber of each cylinder 1a.

Referring to FIGS. 9 and 10, reference numeral 150 designates a cylinder block, 151 a piston reciprocally movable in the cylinder block 150, 152 a cylinder head fixed to the cylinder block 150, and 153 a combustion chamber formed between the piston 151 and the cylinder head 152. The intake valves and the exhaust valves (not shown) are arranged on the inner wall of the cylinder head 152, and the intake ports(not shown) are constructed so that air flowing into the combustion chamber 153 creates a swirl motion swirling about the axis of the cylinder. As illustrated in FIG. 9, a spark plug 154 is arranged on the central portion of the inner wall of the cylinder head 152, and the fuel injector 11 is arranged on the peripheral portion of the inner wall of the cylinder head 152. As illustrated in FIGS. 9 and 10, a shallow depression 155 having a substantially circular shaped contour and extending from a point beneath the fuel injector 11 to the spark plug 154 is formed on the top face of the piston 151, and a deep depression 156 having a substantially semispherical shape is formed in the central portion of the shallow depression 155. In addition, a recess having a substantially spherically shaped portion 157 is formed at the connecting portion of the shallow depression 155 and the deep depression 156 beneath the spark plug 154.

Figure 11A:
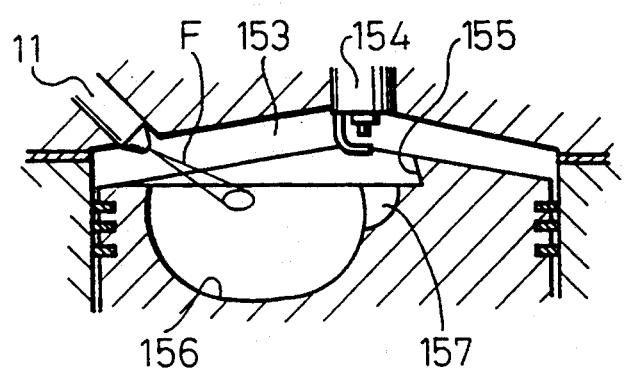
FIGS. 11A through 11C are views for illustrating a first method for fuel injection and combustion.
Figure 11B:
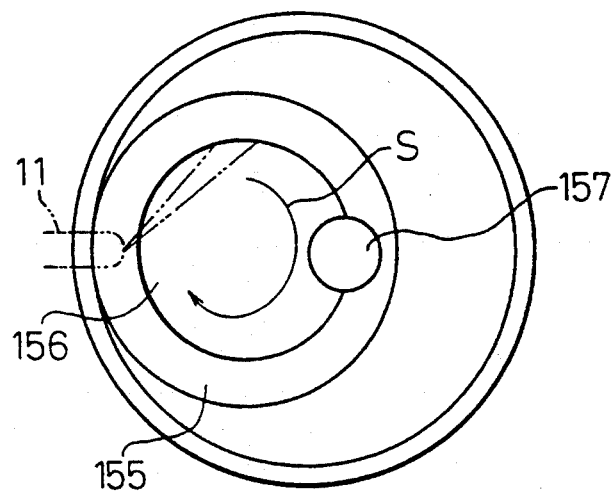
Figure 11C:
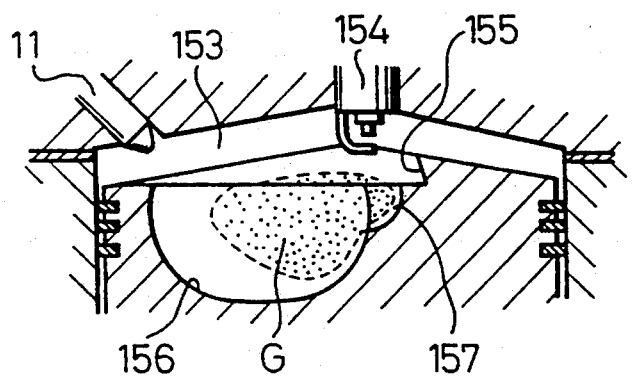

FIGS. 11A through 11C illustrates one fuel injection and combustion method, and FIGS. 12A through 12D illustrates another fuel injection and combustion method.

In the first method for the fuel injection and the combustion illustrated in FIGS. 11A through 11C, fuel F, which is gasoline in the embodiment illustrated in FIGS. 11A through 11C, is injected toward the circumferential wall of the deep depression 156 at the end of the compression stroke, as illustrated in FIGS. 11A and 11B. The fuel injected toward the circumferential wall of the deep depression 156 is spread while being vaporized by the swirl motion S, and as a result, as illustrated in FIG. 11C, an air-fuel mixture G is formed in the recessed portion 157 and the deep depression 156. At this time, the interior of the combustion chamber 153 other than the recessed portion 157 and the deep depression 156 is filled with air, and then the air-fuel mixture G is ignited by the spark plug 154.

Figure 12A:
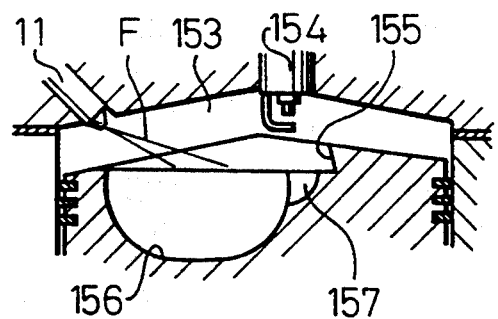
FIGS. 12A through 12D are views for illustrating a second method for fuel injection and combustion.
Figure 12B:
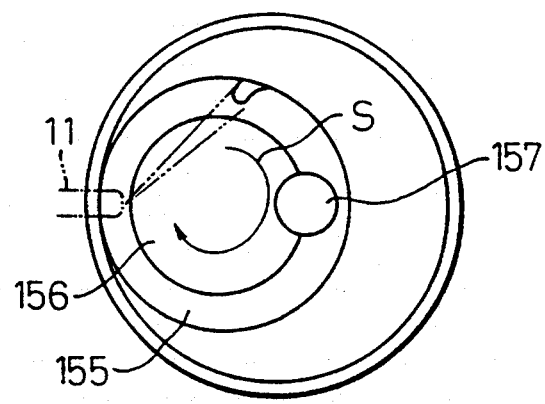
Figure 12C:
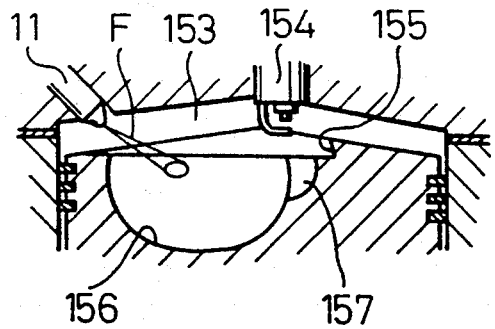
Figure 12D:
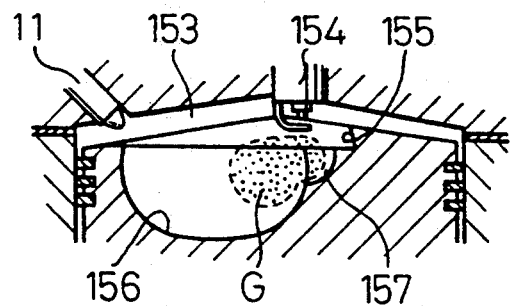

Conversely, in the second method for the fuel injection and combustion illustrated in FIGS. 12A through 12D, fuel injection is carried out at the beginning of the intake stroke and at the end of the compression stroke. Initially, as illustrated in FIGS. 12A and 12B, fuel F is injected toward the shallow depression 155 at the beginning of the intake stroke, and a lean air-fuel mixture is formed in the entire interior of the combustion chamber 153 by the injected fuel F. Then, as illustrated in FIG. 12C, fuel F is injected toward the circumferential wall of the deep depression 156 at the end of the compression stroke, and as illustrated in FIG. 12D, an ignitable air-fuel mixture G forming an ignition source is formed in the recessed portion 157 and the deep depression 156 by this injected fuel F. The air-fuel mixture G is ignited by the spark plug 154, and the lean air-fuel mixture existing in the entire interior of the combustion chamber 153 is burned by the flame of the air-fuel mixture G.

In this embodiment, still another method, i.e., a third method, for fuel injection and combustion is provided. In the third method for fuel injection and combustion, fuel is injected only once toward the shallow depression 155 at the beginning of the intake stroke, in the same manner as illustrated in FIGS. 12A and 12B. Therefore a uniform air-fuel mixture is formed in the combustion chamber 153. This uniform air-fuel mixture is ignited by the spark plug 154.

Figure 13:
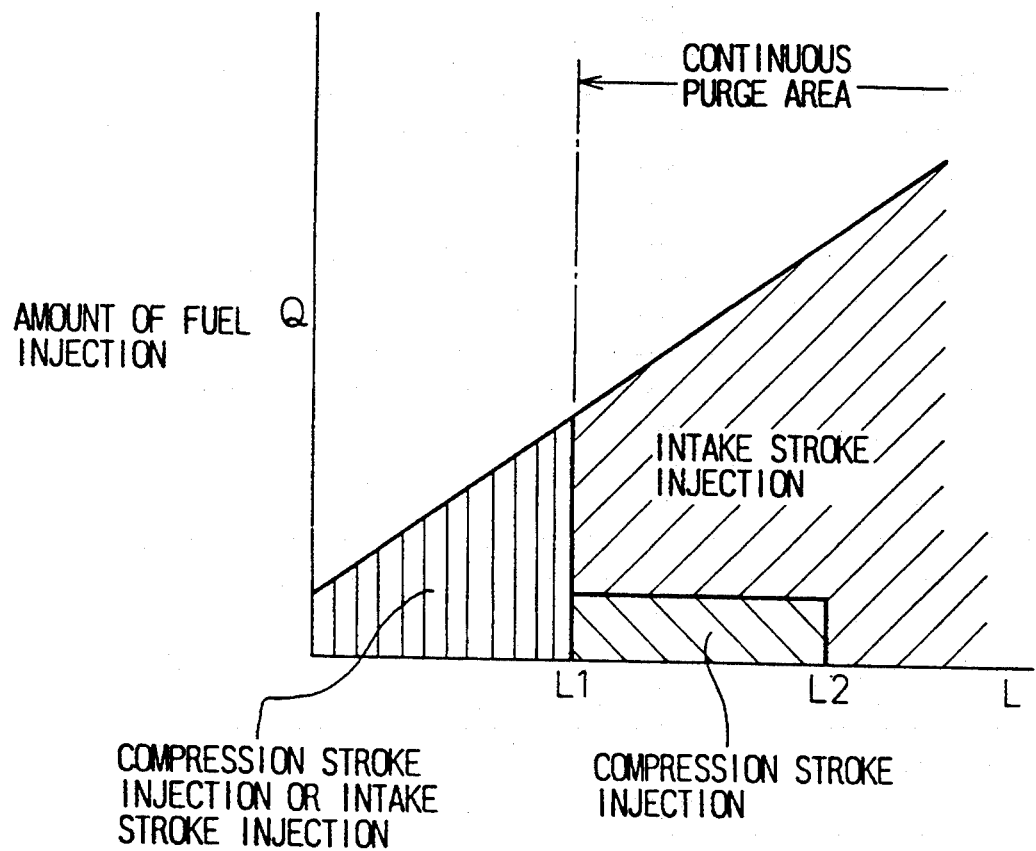
FIG. 13 is a diagram illustrating the amount of the fuel injection of the third embodiment.

FIG. 13 illustrates which method for fuel injection and combustion is carried out at a respective engine load based on, for example, the depression L of the accelerator pedal 10, in this embodiment. Also, FIG. 13 illustrates the relationship between an amount of fuel injected Q and the the depression L of the accelerator pedal 10.

Referring to FIG. 13, when the engine is operating under a light load, including during the idling operation thereof, wherein the depression L of the accelerator pedal 10 is smaller than L1, either the first method, as illustrated in FIGS. 11A through 11C or the third method as illustrated in FIGS. 12A and 12B is carried out. Namely, when the engine is operating under the light load, either the compression stroke injection or the intake stroke injection is carried out. In this case, the amount of fuel injection Q when the engine is operating under the light load is increased as the depression L of the accelerator pedal 10 becomes larger.

When the engine is operating under a medium load, wherein the depression L of the accelerator pedal 10 is between L1 and L2 in FIG. 13, the second method for fuel injection and combustion, as illustrated in FIGS. 12A through 12D, is carried out. That is, fuel injection is carried out twice: at the beginning of the intake stroke and at the end of the compression stroke. In this case, since the fuel injected at the end of the compression stroke is simply used for creating the ignition source, the amount of fuel injection Q at the end of the compression stroke is maintained constant regardless of the depression L of the accelerator pedal 10, as illustrated in FIG. 13. Conversely, the amount of fuel injection Q injected at the beginning of the intake stroke is increased as the depression L of the accelerator pedal 10 becomes larger.

When the engine is operating under a heavy load wherein the depression L of the accelerator pedal 10 is larger than L2 in FIG. 13, the third method for fuel injection and combustion, as illustrated in FIGS. 12A and 12B, is carried out. That is, the intake stroke injection is carried out. At this time, as illustrated in FIG. 13, the amount of fuel injection Q at the beginning of the intake stroke is increased as the depression L of the accelerator pedal 10 becomes larger.

In this embodiment, when the engine is operating under either the heavy load or the medium load, the purging operation is continuously carried out. If the purging operation is carried out when the engine is operating under a medium load or a heavy load, this fuel vapor forms, together with the fuel injected at the beginning of the intake stroke, an air-fuel mixture spreading over the entire interior of the combustion chamber 153. Accordingly, the fuel vapor is burned together with the injected fuel in the combustion chamber 153. Namely, at this time, the fuel vapor is used for increasing the output power of the engine.

Conversely, when the engine is operating under a light load, including at the time of the idling operation thereof, if the purging operation is carried out when the compression stroke injection is carried out wherein the air-fuel mixture is burned in the presence of excess air, as illustrated in FIG. 11A through 11C, almost all of the fuel vapor spreads into the air in the combustion chamber 153. Since the air-fuel mixture formed by the fuel vapor is extremely lean, however, a flame cannot propagate in this air-fuel mixture. Thus, the fuel vapor spreading in the air is discharged into the exhaust manifold 8 without being burned.

In this embodiment, when the purging operation is to be carried out when the engine is operating under a light load, including during the idling operation thereof, intake stroke injection is carried out, and thus a uniform air-fuel mixture is formed in the combustion chamber 153. At this time, the fuel vapor forms, together with the fuel injected, an air-fuel mixture spreading over the entire interior of the combustion chamber 153. Accordingly, the fuel vapor is burned together with the injected fuel in the combustion chamber 153. Namely, the fuel vapor is used for increasing the output power of the engine in all the engine operating states. Further, since the purging operation can be carried out even when the engine is operating under the light load, the activated carbon layer is prevented from being saturated with the fuel vapor, and thus the fuel vapor is not discharged into the outside air.

As the time during which the purging operation is carried out is increased, the amount of fuel vapor fed into the engine becomes smaller, since the amount of fuel vapor desorbed from the activated carbon layer 13 becomes smaller. At this time, if the purging operation is continued when the engine is operating under the light load, an extremely lean air-fuel mixture is formed in the combustion chamber 153, and it is difficult for the spark plug 154 to ignite this extremely lean air-fuel mixture. On the other hand, when the amount of fuel vapor fed into the engine becomes smaller, the amount of fuel injected is increased so that an air-fuel ratio of the engine is maintained at a desired air-fuel ratio. Accordingly, when the amount of fuel injected is larger than a predetermined amount and the purging operation is carried out while the engine is operating under a light load, it can be determined that, at this time, the amount of fuel vapor becomes smaller and an extremely lean air-fuel mixture is formed in the combustion chamber 153. In this embodiment, when the amount of fuel injected is larger than a predetermined amount and the purging operation is carried out while the engine is operating under a light load, the purging operation is stopped. Also, at this time, compression stroke fuel injection is carried out. Therefore, fuel vapor can be prevented from being discharged into the exhaust manifold 8 without being burned. Conversely, when the amount of fuel injected is smaller than the predetermined amount and the purging operation is carried out while the engine is operating under a light load, the purging operation and intake stroke injection is continued, since, at this time, it can be determined that the fuel vapor fed into the engine can be substantially completely burned.

Next, the routine executing the above-mentioned third embodiment will be described with reference to FIGS. 14A, 14B, and 15.

Figure 14A:
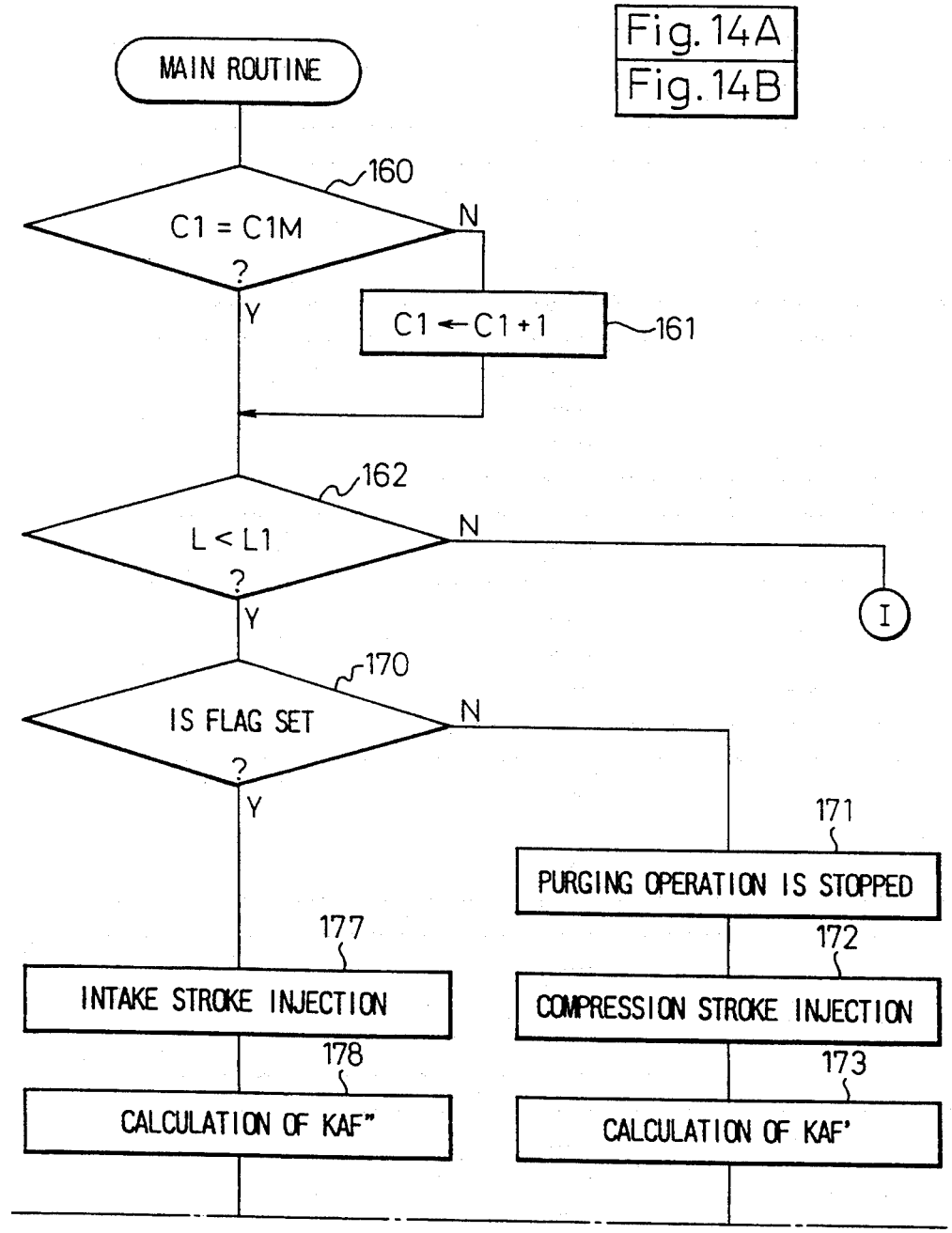
Figure 14B:
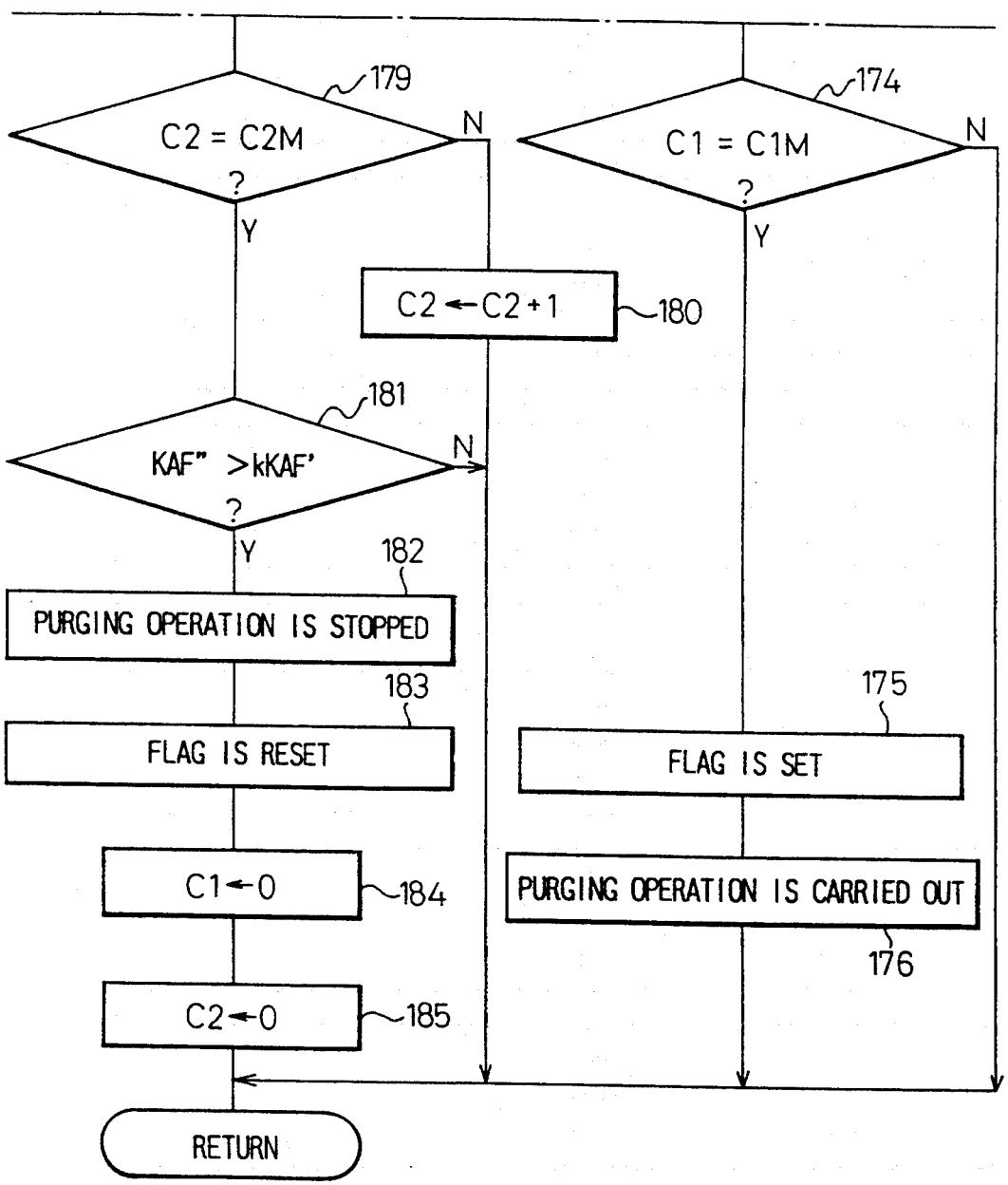
Figure 15:
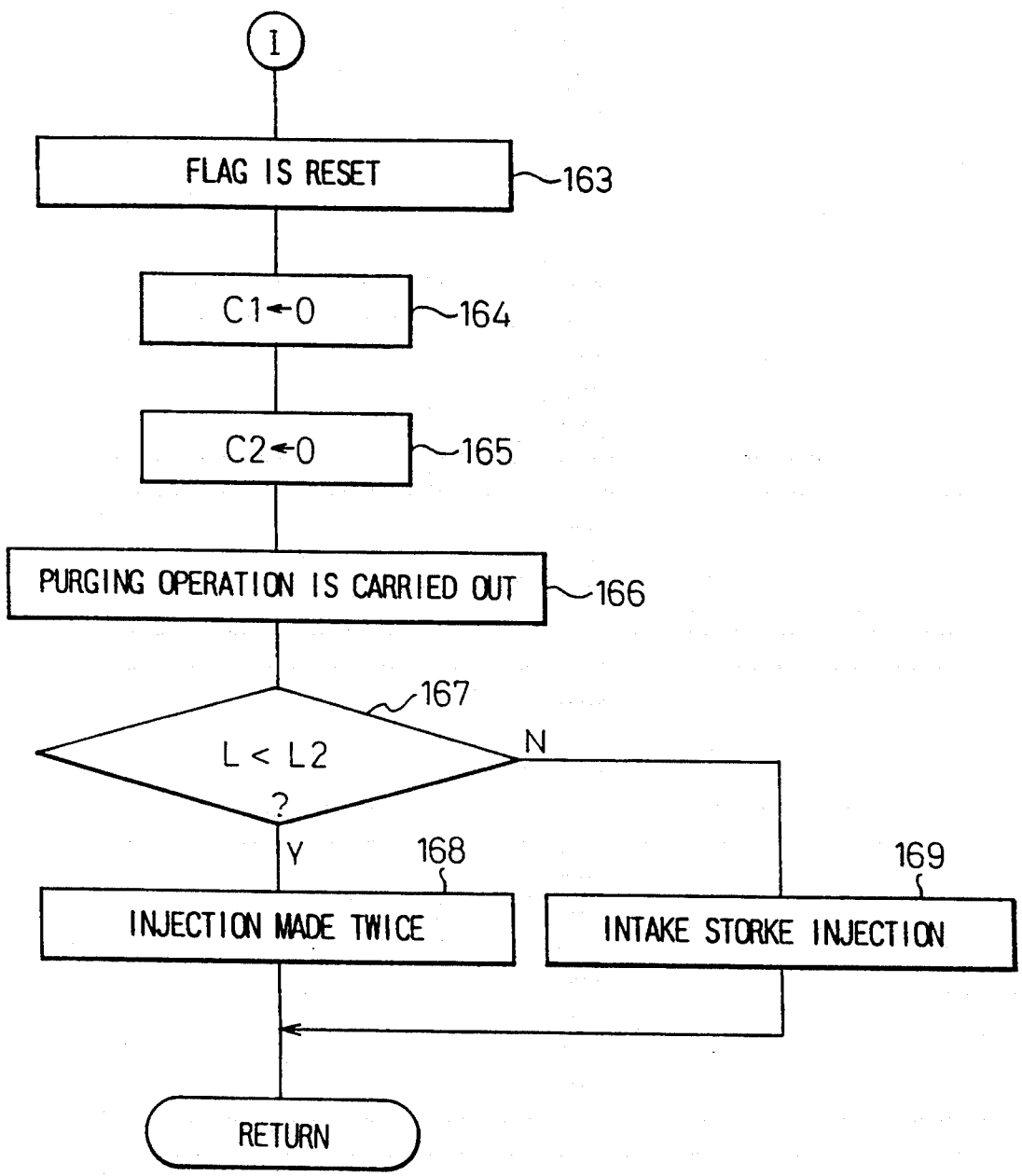

Referring to FIGS. 14A, 14B, and 15, in step 160 it is determined whether or not a value of a first counter C1 equals a predetermined value C1M. This value of the first counter C1 substantially represents the time during which the purging operation is stopped when the engine is operating under a light load, and when the value of the first counter C1 becomes equal to the predetermined value C1M, the purging operation is started. If C1≠C1M, the routine goes to step 162 via step 161 wherein the first counter is incremented. If C1=C1M, the routine goes directly to step 162.

In step 162, it is determined whether or not the depression L of the accelerator pedal 10 is smaller than L1, i.e. whether the engine is operating under a light load or is idling. If L≧L1, i.e., the engine is operating under a medium load or a heavy load, the routine goes to step 163, and a flag, which is set when the intake stroke injection is to be carried out and the engine is operating under the light load, is reset. In step 164, the first counter is reset, and, in step 165, a second counter is also reset. In step 166, the purging operation is carried out. In step 167, it is determined whether or not the depression L of the accelerator pedal 10 is smaller than L2. If L<L2, i.e., the engine is operating under a medium load, the routine goes to step 168 and the fuel injection is made twice: at the beginning of the intake stroke and at the end of the compression stroke. If L≧L2, i.e., the engine is operating under the heavy load, the routine goes to step 169 and intake stroke injection is carried out.

If L<L1, the routine goes to step 170, and it is determined whether or not the flag is set. If the flag is reset, the routine goes to step 171, and the purging operation is stopped. In step 172, the compression stroke injection is carried out.

Figure 16:
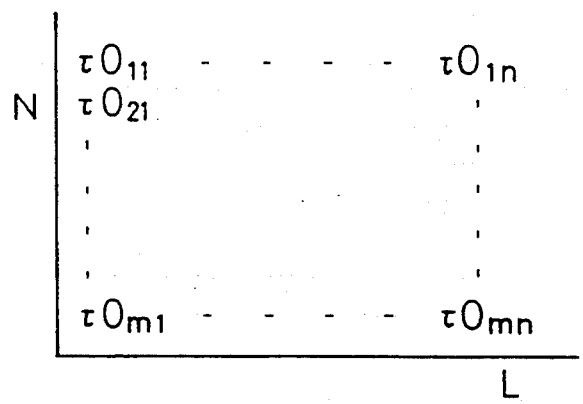
FIG. 16 is a view illustrating the standard time of the fuel injection.

In this embodiment, the fuel injection time TAU is calculated based on the following equation:

$$TAU = KAF \cdot TAU0 \qquad (1)$$

where KAF is a correction factor calculated so that the air-fuel ratio is maintained at the desired air-fuel ratio; and TAU0 is a standard time for fuel injection which is predetermined as a function of the engine speed and the depression L of the accelerator pedal 10, as in FIG. 16, and is stored in the ROM of the electronic control unit.

Accordingly, the amount of fuel injection Q becomes larger as the correction factor KAF becomes larger, since the amount of fuel injection Q is proportional to the fuel injection time TAU.

In step 173, a weighted mean KAF'0 of the correction factor KAF when the compression stroke injection is carried out is calculated, based on the following equation:

$$KAF' = \{(N-1) \cdot KAF' + KAF\}/N \qquad (2)$$

Since the weighted mean KAF' is calculated in this manner, the weighted mean KAF' does not drastically change even when the correction factor KAF changes drastically. Since the amount of fuel injection Q becomes larger as the correction factor KAF is larger, as mentioned above, the weighted mean KAF' when the compression stroke injection is carried out can be regarded as an amount of fuel injection when the compression stroke fuel injection is carried out. Namely, the weighted mean KAF' can be regarded as the amount of fuel injection when the purging operation is stopped and the engine is operating under a light load.

In step 174, it is determined whether or not the value of the first counter C1 equals the predetermined value C1M. If C1 = C1M, the routine goes to step 175, and the flag is set. In step 176, the purging operation is carried out. If C1≠C1M, the processing cycle is ended.

If the flag is set, the routine goes from step 170 to step 177, and intake stroke fuel injection is carried out. In step 178, a weighted mean KAF'' of the correction factor KAF when the intake stroke injection is carried out is calculated, based on the following equation:

$$KAF'' = \{(M-1) \cdot KAF'' + KAF\}/M \qquad (3)$$

This weighted mean KAF'' can be regarded as an amount of fuel injection when the purging operation is carried out and the engine is operating under the light load, for the same reason as in the case of the weighted mean KAF'.

In step 179, it is determined whether or not the value of the second counter C2 equals a predetermined value C2M. The value in the second counter C2 substantially represents a time during which the purging operation is carried out when the engine is operating under a light load. If C2≠C2M, the routine goes to step 180, and the second counter is incremented, and then the processing cycle is ended. If C2 = C2M, i.e., a predetermined time has passed since the purging operation is started while the engine is operating under a light load, the routine goes to step 181, and it is determined whether or not the weighted mean KAF'' for the intake stroke fuel injection is larger than the product of a constant K and the weighted mean KAF' for the compression stroke injection. At this time, the constant k is predetermined within a range of 0<k≦1, and therefore the product k·KAF' is defined to be smaller than KAF'.

In this embodiment, when the amount of fuel vapor fed into the engine is large and when fuel vapor can be substantially completely burned in the combustion chamber 153 when the intake stroke injection is carried out, the correction factor KAF is reduced to prevent the air-fuel ratio in the engine from being reduced. Therefore, at this time, the weighted mean KAF'' for the intake stroke fuel injection is reduced. Conversely, when the weighted mean KAF'' for the intake stroke fuel injection becomes larger, it can be determined that, at this time, the amount of fuel vapor fed into the engine becomes smaller. Accordingly, if the weighted mean KAF'' becomes lower than the product k·KAF''', then it can be detected that the amount of fuel vapor fed into the engine becomes relatively small and that the fuel vapor cannot be ignited by the spark plug 154. Therefore, if KAF''>k·KAF', the routine goes from step 181 to step 182, and the purging operation is stopped. In step 183, the flag is reset. In step 184, the first counter is reset, and in step 185, the second counter is also reset. If KAF''≦k·KAF', the processing cycle is ended. At this time, the purging operation and the intake stroke fuel injection are continued, since it can be determined that, at this time, the amount of fuel vapor fed into the engine is large enough to be able to be substantially completely burned in the combustion chamber 153.

Figure 17:
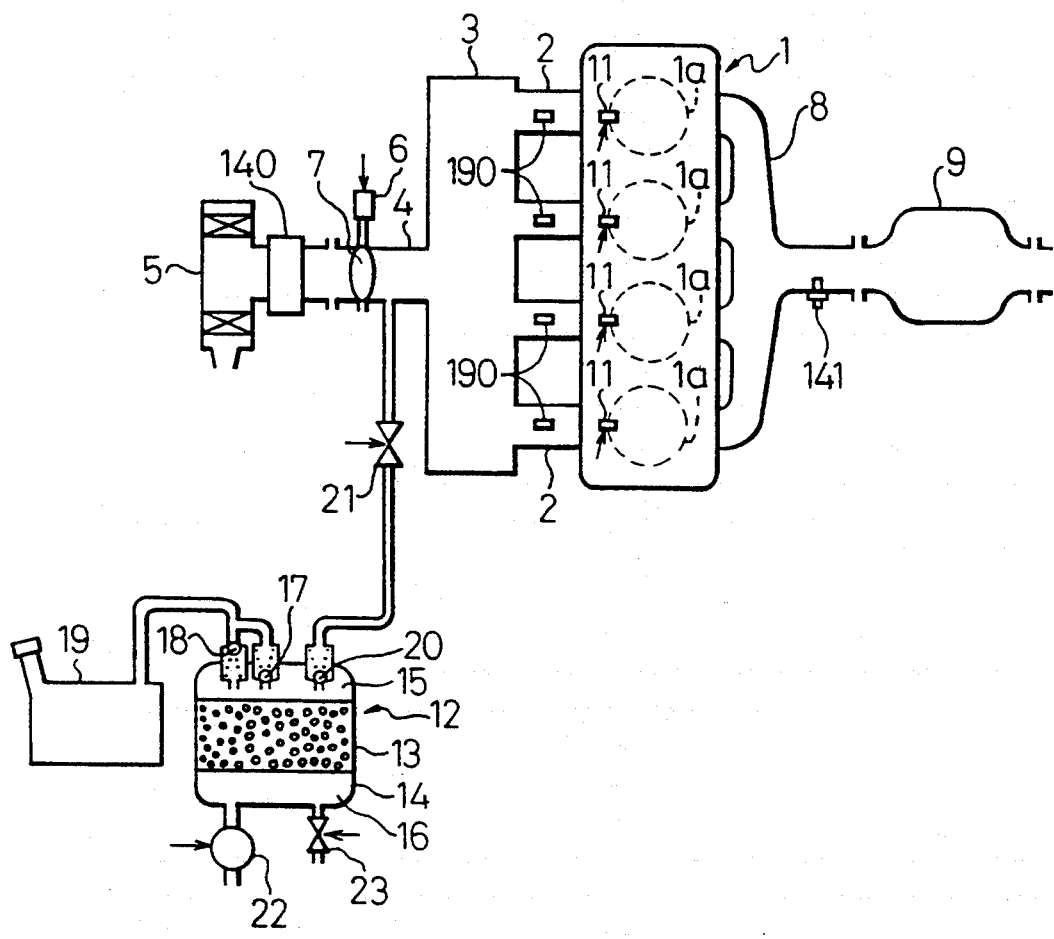
FIG. 17 is a general view of a fourth embodiment of an engine.

FIG. 17 illustrates a fourth embodiment of the present invention. In this embodiment, an electronic control unit the same as the electronic control unit 30 in FIG. 1 is provided. However, in FIG. 17, this electronic control unit is not depicted.

Referring to FIG. 17, each cylinder 1a has a first fuel injector 11 for injecting fuel into the cylinder 1a, as is FIG. 1. In this embodiment, however, each cylinder 1a has a second fuel injector. That is, an additional fuel injector 190 is arranged in a corresponding branch pipe 2 for injecting fuel into the intake port formed in the cylinder block. Accordingly, in this embodiment, each cylinder 1a has fuel injectors 11 and 190.

Figure 18A:
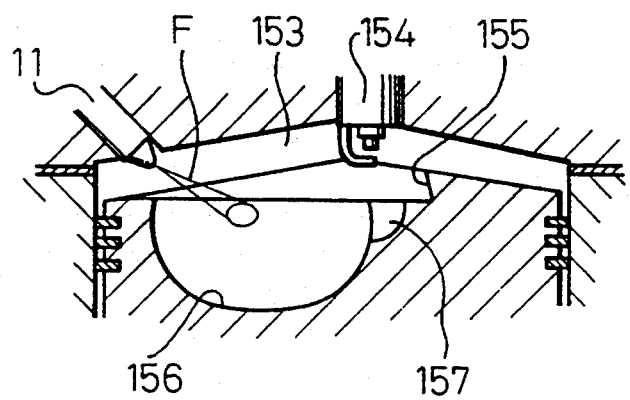
FIGS. 18A and 18B are views for illustrating a fuel injection method by a first fuel injector.
Figure 18B:
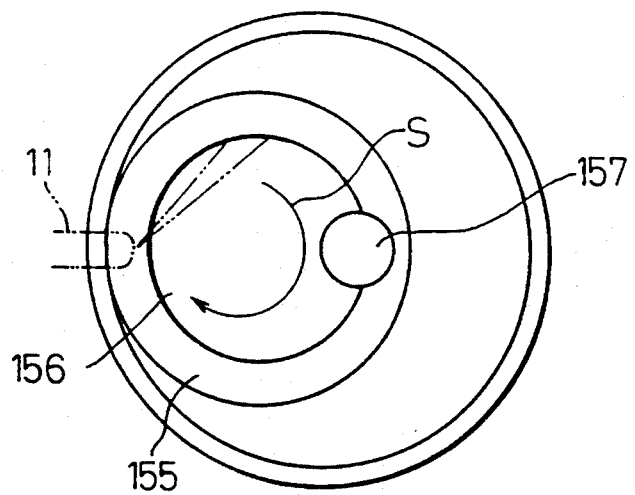
Figure 19:
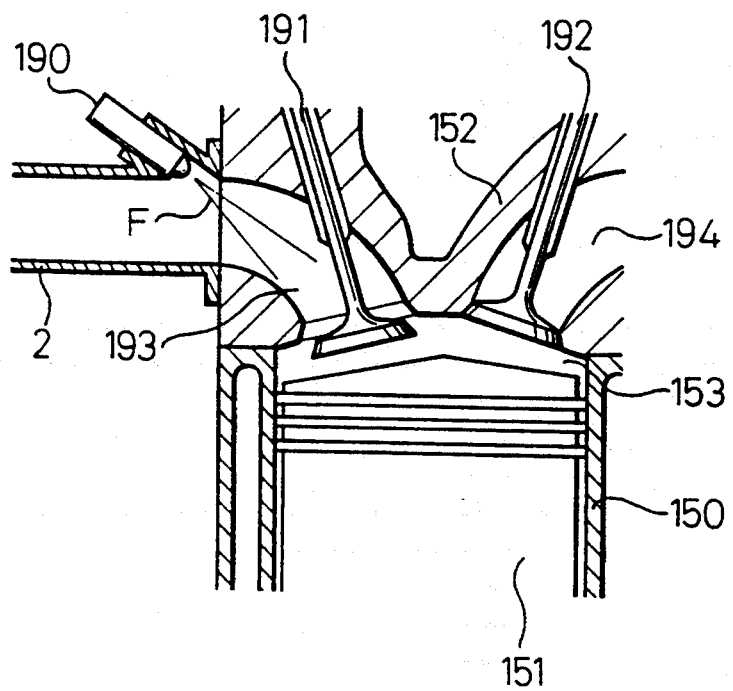
FIG. 19 is a view for illustrating a fuel injection method by a second fuel injector.

FIGS. 18A and 18B illustrate a fuel injection method using the first fuel injection 11, which corresponds to the compression stroke injection of the third embodiment. FIG. 19 illustrates another fuel injection method using the second fuel injection 190, which corresponds to the intake stroke injection of the third embodiment. Referring to FIG. 19, reference numeral 191 designates an intake valve, 192 an exhaust valve, 193 an intake port formed in the cylinder block 152 and 194 an exhaust port formed in the cylinder block 152.

In the first fuel injection method illustrated in FIGS. 18A and 18B, the fuel F is injected by the first fuel injector 11 toward the circumferential wall of the deep depression 156 at the end of the compression stroke. Namely, fuel injection into the cylinder is carried out in the first fuel injection method. The fuel injected toward the circumferential wall of the deep depression 156 is spread while being vaporized by the swirl motion S, and as a result, an air-fuel mixture is formed in the recessed portion 157 and the deep depression 156. At this time, while the interior of the combustion chamber 153 other than the recessed portion 157 and the deep depression 156 are filled with air, the air-fuel mixture is ignited by the spark plug 154. In this method, the fuel injection by the second fuel injector 190 is stopped.

Conversely, in the second fuel injection method illustrated in FIG. 19, a fuel injection is carried out twice: by the second fuel injector 190 into the intake port 193 and by the first fuel injector 11 into the cylinder. Initially, as illustrated in FIG. 19, fuel F is injected by the second fuel injector 190 into the intake port 193 at the beginning of the intake stroke, and a lean air-fuel mixture is formed in the entire interior of the combustion chamber 153 by the injected fuel F. Then, as illustrated in FIGS. 18A and 18B, fuel F is injected by the first fuel injector 11 toward the circumferential wall of the deep depression 156 at the end of the compression stroke, and an ignitable air-fuel mixture forming an ignition source is formed in the recessed portion 157 and the deep depression 156 by this injected fuel F. The air-fuel mixture is ignited by the spark plug 154, and the lean air-fuel mixture existing in the entire interior of the combustion chamber 153 is burned.

In the third fuel injection method, fuel F is injected only once by the second fuel injector 190 into the intake port 193, at the beginning of the intake stroke, as illustrated in FIG. 19, whereby a uniform air-fuel mixture is formed in the combustion chamber 153. In this embodiment, since the fuel injected into the intake port 193 flows into the combustion chamber 153 with the intake air, the fuel injected can be vaporized in the combustion chamber 153. Thus, the uniform air-fuel mixture can be formed in the combustion chamber 153 even when a temperature of the walls which define the combustion chamber 153 is relatively low. This uniform air-fuel mixture is ignited by the spark plug 154. In this method, fuel injection by the first fuel injector 11 is stopped.

FIG. 20 illustrates which method of the fuel injection is carried out at a respective depression L of the accelerator pedal 10 in this embodiment, as illustrated in FIG. 13.

Referring to FIG. 20, when the engine is operating under a light load, including an idling operation thereof, wherein the depression L of the accelerator pedal 10 is smaller than L1, either of the injection by the first fuel injector 11 into the cylinder, as illustrated in FIGS. 18A and 18B, or the injection by the second fuel injector 190 into the intake port, as illustrated in FIG. 19, is carried out. In this case, the amount of fuel injection Q when the engine is operating under the light load is increased as the depression L of the accelerator pedal 10 becomes larger.

When the engine is operating under a medium load wherein the depression L of the accelerator pedal 10 is between L1 and L2 in FIG. 20, both methods of fuel injection are carried out: the fuel injection by the second fuel injector 190 into the intake port 193 at the beginning of the intake stroke, as illustrated in FIG. 19, and the injection by the first fuel injector 11 into the cylinder at the end of the compression stroke, as illustrated in FIGS. 18A and 18B. In this case, since the fuel injected by the first fuel injector 11 into the cylinder is simply used for creating the ignition source, the amount of fuel injection by the first fuel injection 11 into the cylinder is maintained constant regardless of the depression L of the accelerator pedal 10, as illustrated in FIG. 20, when the engine is operating under a medium load. Conversely, the amount of fuel injection Q injected by the second fuel injector 190 into the intake port 193 is increased as the depression L of the accelerator pedal 10 becomes larger.

When the engine is operating under a heavy load, wherein the depression L of the accelerator pedal 10 is larger than L2 in FIG. 20, the injection by the second fuel injector 190 into the intake port 193, as illustrated in FIG. 19, is carried out. At this time, as illustrated in FIG. 20, the amount of fuel injection Q by the second fuel injector 190 into the intake port 193 is increased as the depression L of the accelerator pedal 10 becomes larger.

When the engine is operating under a heavy load or a medium load, the purging operation is continuously carried out, as in the third embodiment. If the purging operation is carried out when the engine is operating under a medium load or a heavy load, this fuel vapor forms, together with the fuel injected by the second fuel injector 190 into the intake port 193, an air-fuel mixture spreading over the entire interior of the combustion chamber 153. Accordingly, the fuel vapor is burned together with the injected fuel in the combustion chamber 153. Namely, at this time, the fuel vapor is used for increasing the output power of the engine.

When, however, the injection into the cylinder by the first fuel injector 11 is carried out when the engine is operating under the light load, if the purging operation is carried out, almost all of the fuel vapor spreads into the air in the combustion chamber 153, as mentioned above. Thus the air-fuel mixture formed by the fuel vapor is extremely lean. However, a flame cannot propagate in this air-fuel mixture, and the fuel vapor spreading into the air is discharged into the exhaust manifold 8 without being burned.

In this embodiment, when the purging operation is to be carried out when the engine is operating under the light load, including the idling operation thereof, fuel injection by the second fuel injector 190 into the intake port 193 is carried out. Thus a uniform air-fuel mixture is formed in the combustion chamber 153. At this time, the fuel vapor forms, together with the fuel injected, an air-fuel mixture spreading over the entire interior of the combustion chamber 153. Accordingly, the fuel vapor is burned together with the injected fuel in the combustion chamber 153.

As the time during which the purging operation is carried out is increased, the amount of the fuel vapor fed into the engine becomes smaller, since the amount of the fuel vapor desorbed from the activated carbon layer 13 becomes smaller. At this time, if the purging operation is continued when the engine is operating under the light load, an extremely lean air-fuel mixture is formed in the combustion chamber 153. Thus it becomes difficult to ignite this extremely lean air-fuel mixture using the spark plug 154. On the other hand, when the amount of the fuel vapor fed into the engine becomes smaller, the amount of fuel injection is increased so that the air-fuel ratio in the engine is maintained at a desired air-fuel ratio, in this embodiment. Accordingly, when the amount of the fuel injection is larger than a predetermined amount, and the purging operation is carried out while the engine is operating under the light load, it can be determined that, at this time, the amount of the fuel vapor becomes smaller wherein the extremely lean air-fuel mixture is formed in the combustion chamber 153. In this embodiment, when the amount of fuel injected is larger than a predetermined amount and the purging operation is carried out while the engine is operating under the light load, the purging operation is stopped. Also, at this time, fuel injection by the first injector 11 into the cylinder is carried out. Therefore, fuel vapor can be prevented from being discharged into the exhaust manifold 8 without being burned. Conversely, when the amount of fuel injected is smaller than the predetermined amount and the purging operation is carried out while the engine is operating under the light load, the purging operation and fuel injection by the second injector 190 into the intake port 193 is continued, since, at this time, it can be determined that the fuel vapor fed into the engine can be substantially completely burned.

Next, the routine executing the above-mentioned fourth embodiment will be described with reference to FIGS. 21A, 21B, and 22.

Figure 21A:
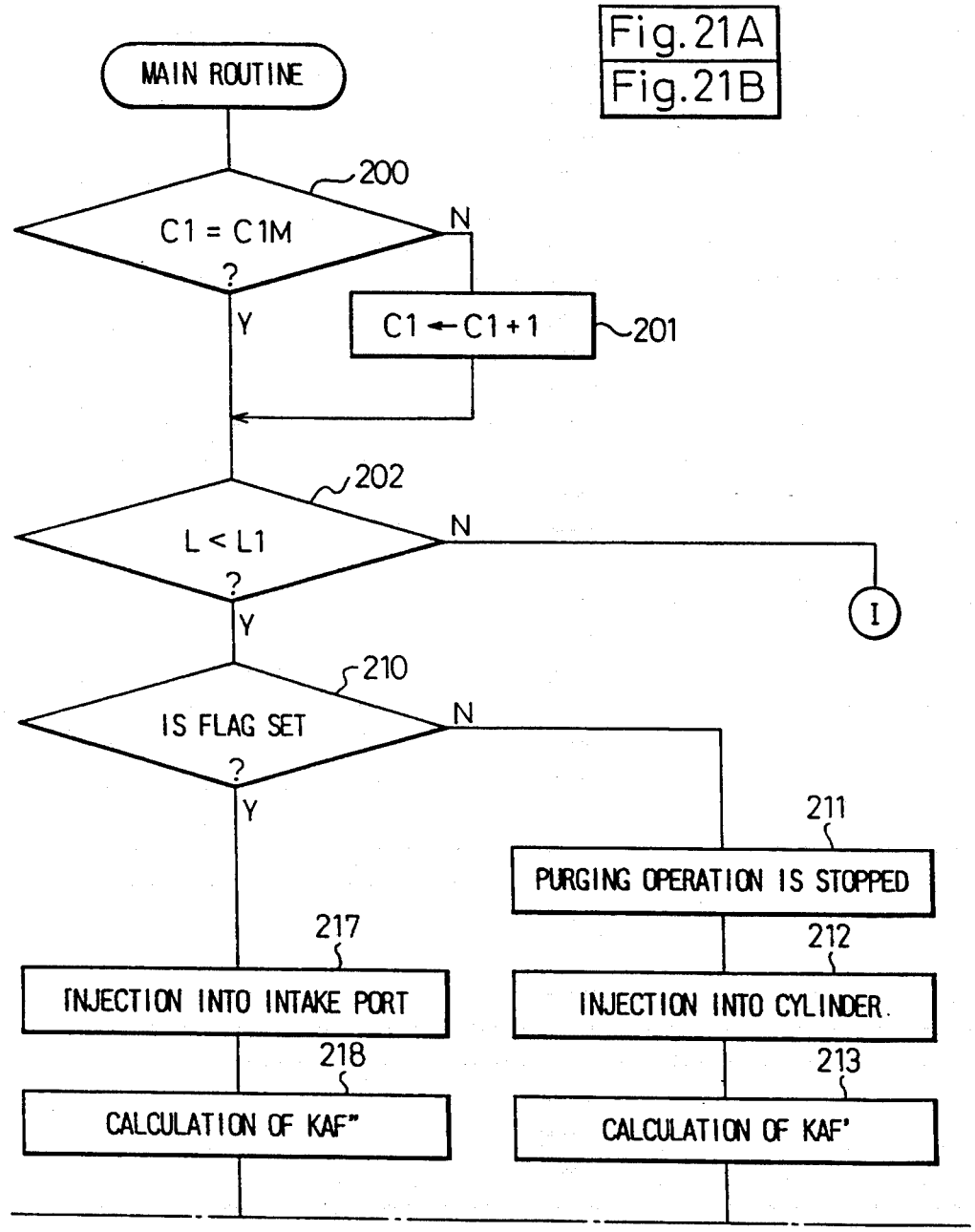
Figure 21B:
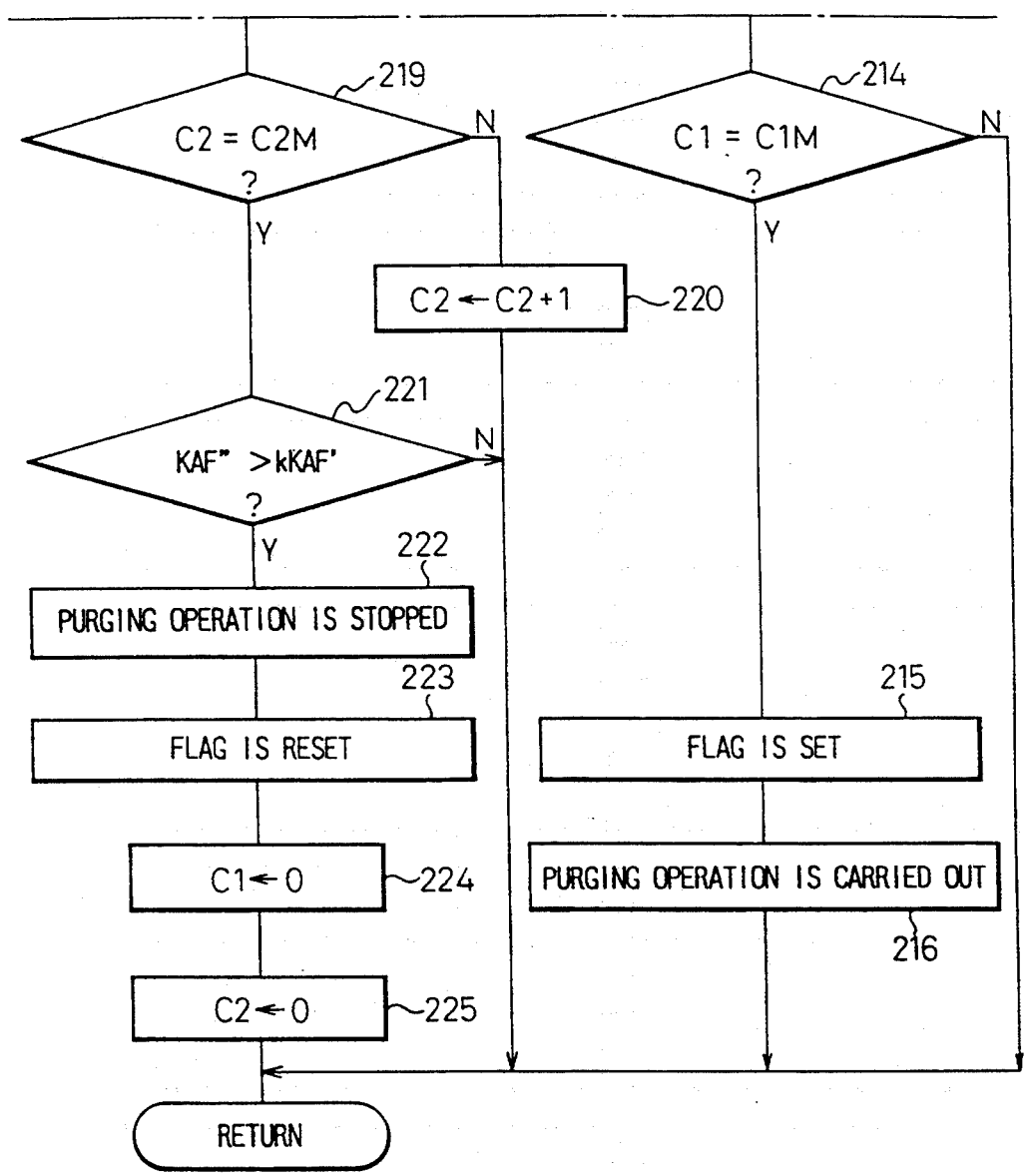
Figure 22:
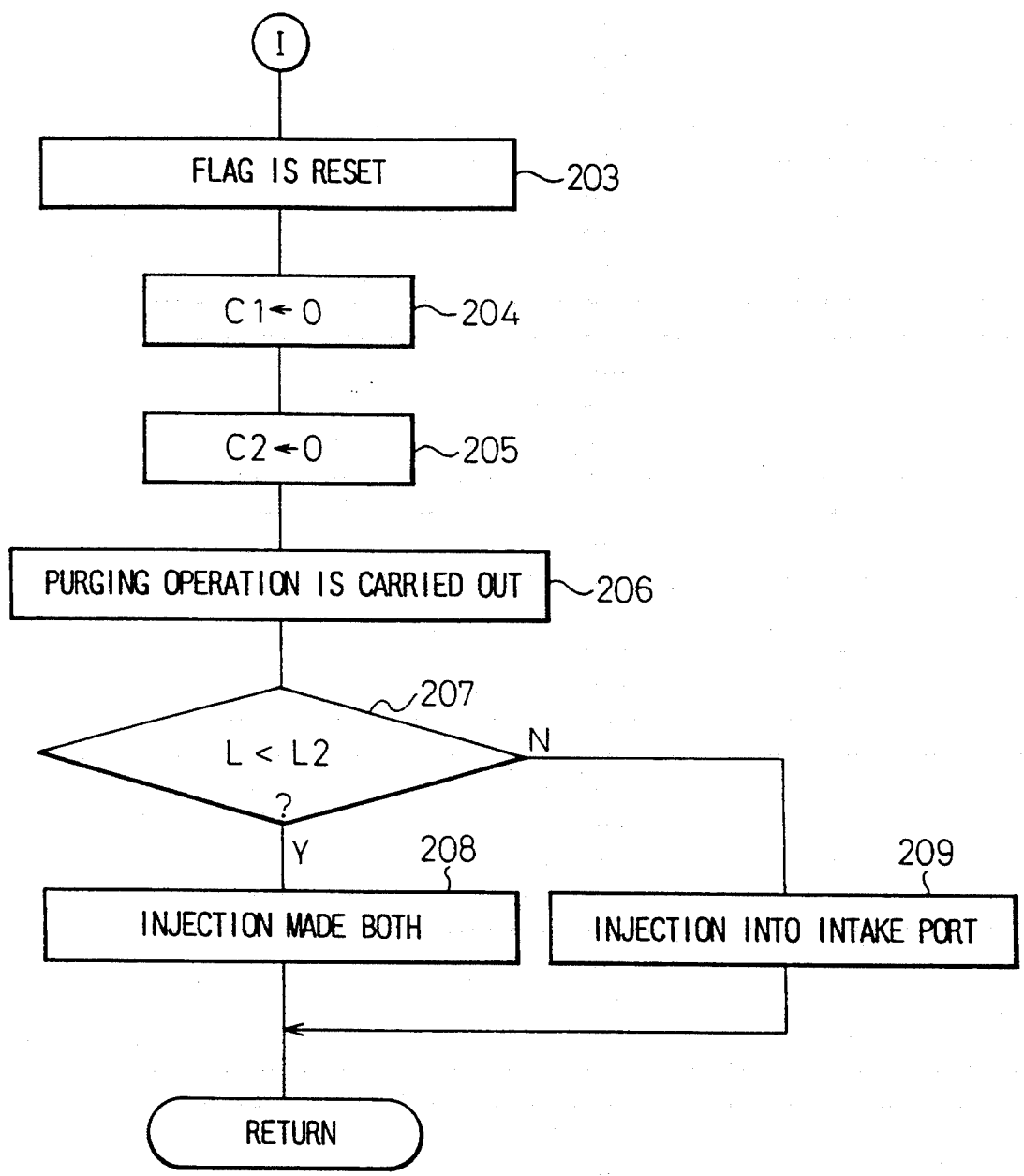

Referring to FIGS. 21A, 21B, and 22, in step 200, it is determined whether or not a value of a first counter C1 equals a predetermined value C1M. This value of the first counter C1 substantially represents the time during which the purging operation is stopped when the engine is operating under a light load. When the value of the first counter C1 becomes equal to the predetermined value C1M, the purging operation is started. If C1≠C1M, the routine goes to step 202 via step 201 wherein the first counter is incremented. If C1=C1M, the routine goes directly to step 202.

In step 202, it is determined whether or not the depression L of the accelerator pedal 10 is smaller than L1, i.e., the engine is operating under a light load including an idling operation thereof. If L≧L1, i.e., the engine is operating under a medium load or a heavy load, the routine goes to step 203, and a flag, which is set when the fuel injection by the second fuel injector 190 into the intake port 193 is to be carried out while the engine is operating under the light load, is reset. In step 204, the first counter is reset, and, in step 205, a second counter is also reset. In step 206, the purging operation is carried out. In step 207, it is determined whether or not the depression L of the accelerator pedal 10 is smaller than L2. If L<L2, i.e., the engine is operating under a medium load, the routine goes to step 208, and both methods of fuel injection are used: the fuel injection by the second injector 190 into the intake port 193 at the beginning of the intake stroke and the fuel injection by the first injector 11 into the cylinder at the end of the compression stroke. If L≧L2, i.e., the engine is operating under a heavy load, the routine goes to step 209, and the fuel injection by the second injector 190 into the intake port 193 is carried out.

If L<L1, the routine goes to step 210, and it is determined whether or not the flag is set. If the flag is reset, the routine goes to step 211, and the purging operation is stopped. In step 212, fuel injection by the first injector 11 into the cylinder is carried out. In step 213, a weighted mean KAF' corresponding to a condition wherein the purging operation is stopped when the engine is operating under a light load is calculated, as in the third embodiment, based on Equation (2). The weighted mean KAF' can be regarded as the amount of the fuel injected when the purging operation is stopped when the engine is operating under a light load. In step 214, it is determined whether or not the value of the first counter C1 equals the predetermined value C1M. If C1=C1M, the routine goes to step 215, and the flag is set. In step 216, the purging operation is carried out. If C1≠C1M, the processing cycle is ended.

If the flag is set, the routine goes from step 210 to step 217, and fuel injection by the second injector 190 into the intake port 193 is carried out. In step 218, a weighted mean KAF" for which the purging operation is carried out when the engine is operating under a light load is calculated, as in the third embodiment, based on Equation (3). This weighted mean KAF" can be regarded as an amount of the fuel injection when the purging operation is carried out when the engine is operating under a light load.

In step 219, it is determined whether or not the value of the second counter C2 equals a predetermined value C2M. This value of the second counter C2 substantially represents the time during which the purging operation is carried out when the engine is operating under a light load. If C2≠C2M, the routine goes to step 220, and the second counter is incremented, and then the processing cycle is ended. If C2=C2M, i.e., a predetermined time has passed since the purging operation has started while the engine is operating under a light load, the routine goes to step 221, and it is determined whether or not the weighted mean KAF" is larger than k·KAF'. At this time, the constant k is predetermined within a range of 0<k≦1.

In this embodiment, when the amount of fuel vapor fed into the engine is large and in which the fuel vapor can be substantially completely burned in the combustion chamber 153 when the fuel injection by the second injector 190 into the intake port is carried out while the engine is operating under a light load, the correction factor KAF is reduced so that the air-fuel ratio is maintained at the desired ratio. Therefore, at this time, the weighted mean KAF" is reduced. Conversely, when the weighted mean KAF" becomes larger, it can be determined that, at this time, the amount of fuel vapor fed into the engine becomes smaller. Accordingly, if the weighted mean KAF" becomes lower than the product k·KAF', then it can be detected that the amount of fuel vapor fed into the engine becomes relatively small and that the fuel vapor cannot be ignited by the spark plug 154. Therefore, if KAF">k·KAF', the routine goes from step 221 to step 222, and the purging operation is stopped. In step 223, the flag is reset. In step, 224 the first counter is reset, and in step 225, the second counter is also reset. If KAF"≦k·KAF', the processing cycle is ended. At this time, the purging operation and fuel injection by the second injector 190 into the intake port 193 are continued, since it can be determined that, at this time, the amount of fuel vapor fed into the engine is large enough to be substantially completely burned in the combustion chamber 153.

Next, a fifth embodiment will be described, wherein an engine body 1 may be constructed as illustrated in FIG. 8, i.e., each cylinder 1a has only one fuel injector 11 for injecting fuel into the cylinder. Also, the construction of the combustion chamber of each cylinder 1a may be the same as illustrated in FIGS. 9 and 10.

Figure 23:
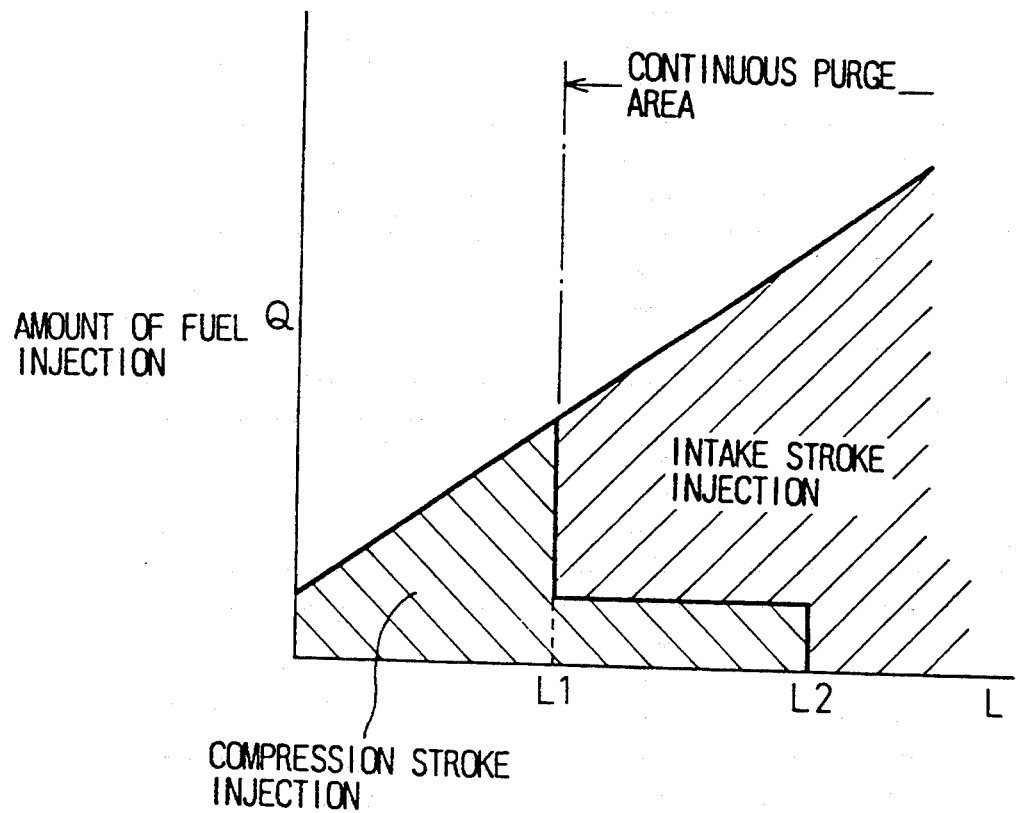
FIG. 23 is a diagram illustrating the amount of the fuel injection of the fifth embodiment.

FIG. 23 illustrates the method for fuel injection and the combustion carried out at a respective depression L of the accelerator pedal 10 in this embodiment, as in FIG. 13.

Referring to FIG. 23, when the engine is operating under a light load, including the idling operation thereof, wherein the depression L of the accelerator pedal 10 is smaller than L1, only compression stroke injection, as illustrated in FIGS. 11A through 11C, wherein the air-fuel mixture is burned in the presence of excess air, is carried out. Conversely, when the engine is operating under a medium load or a heavy load, the same method for fuel injection and combustion as in the third embodiment is carried out.

When the engine is operating under a medium load or a heavy load, the purging operation is continuously carried out, as in the third or fourth embodiment.

Figure 24:
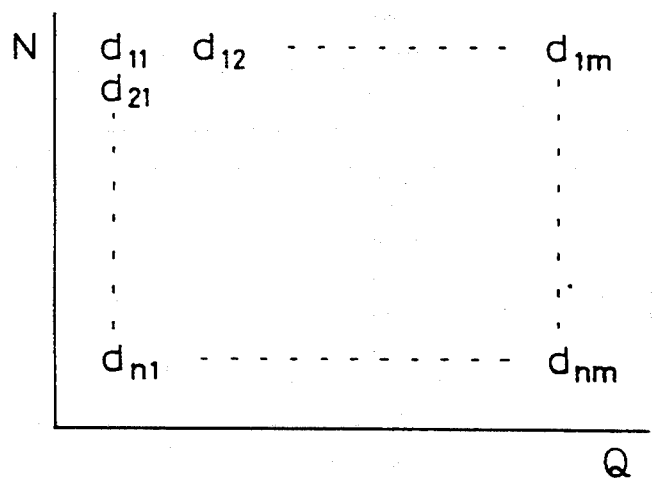
FIG. 24 is a view illustrating the degree of opening of the throttle valve.

In this embodiment, when the purging operation is to be carried out when the engine is operating under a light load, wherein the compression stroke injection is carried out, the amount of intake air fed into the engine is reduced by reducing the degree of opening of the throttle valve 7. Accordingly, at this time, the air-fuel mixture formed by the fuel vapor becomes rich enough to be burned substantially completely even when compression stroke injection is carried out. The degree of opening d of the throttle valve 7 at this time is predetermined as a function of an engine speed N and an amount of fuel injection Q, as illustrated in FIG. 24, and stored in the ROM of the electronic control unit.

Next, the routine executing the above-mentioned fifth embodiment will be described with reference to FIGS. 25A, 25B, and 26.

Figures 25, 25A, 25B:
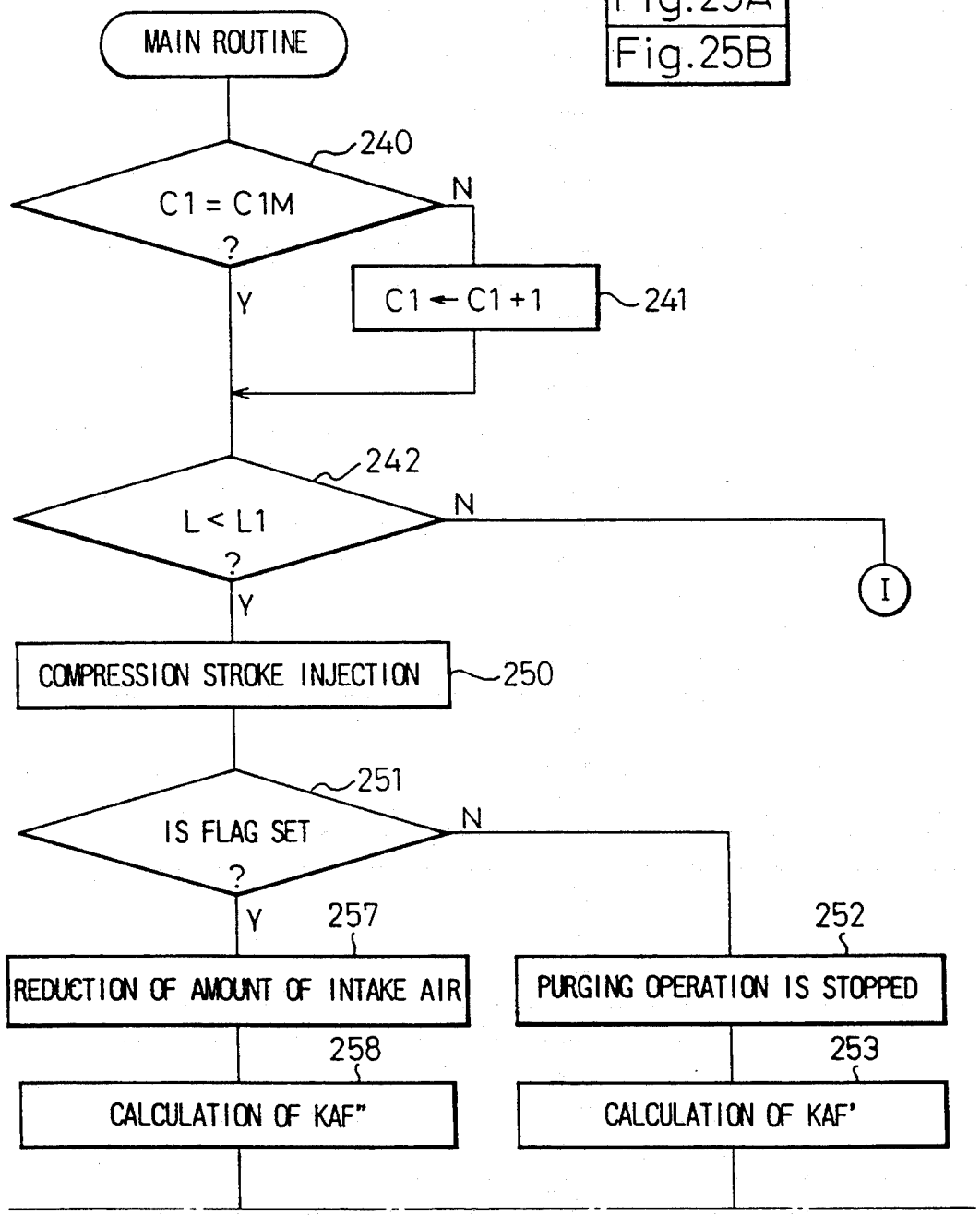
Figure 25B:
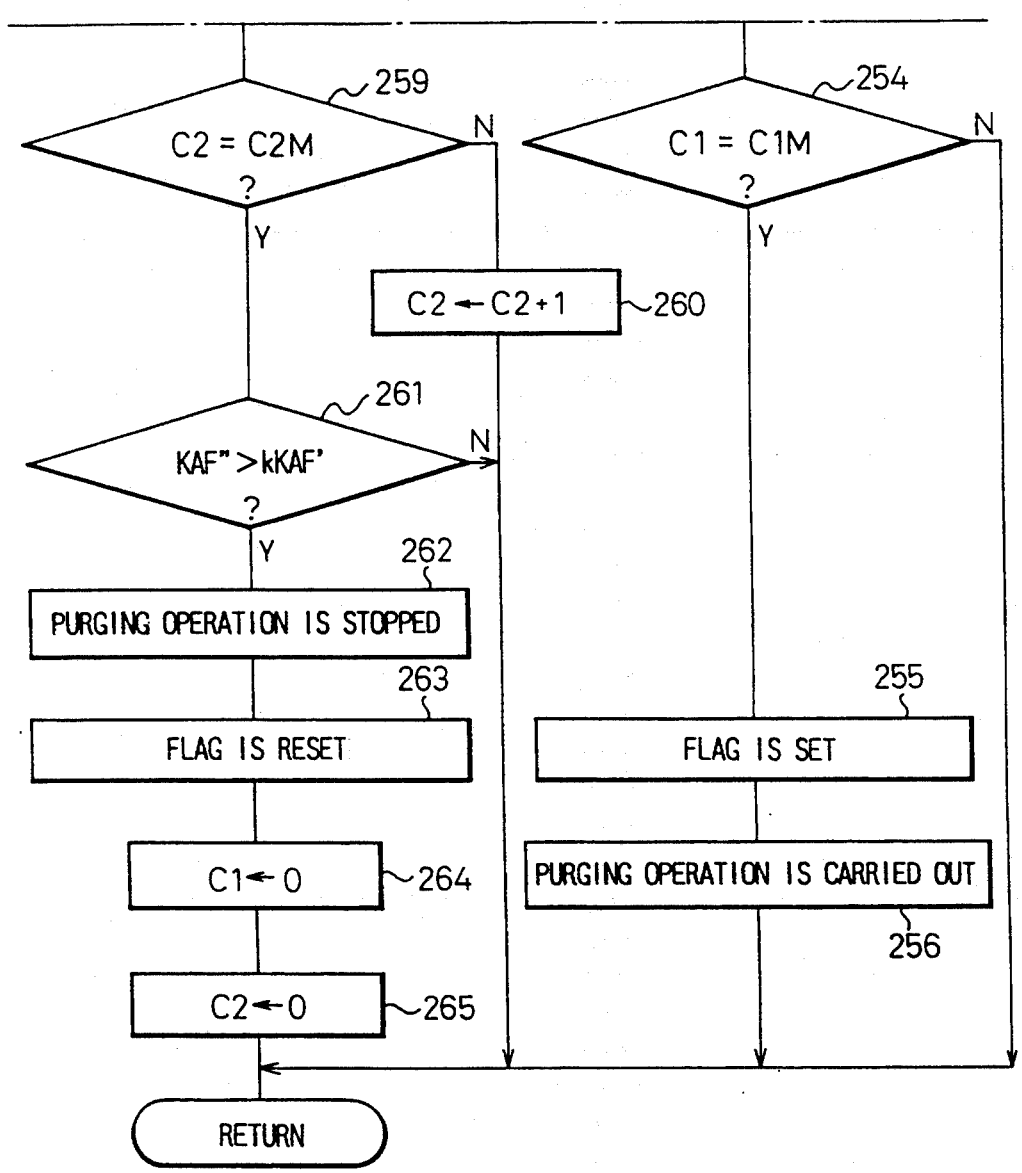

Referring to FIGS. 25A, 25B, and 26, in step 240, it is determined whether or not the value of the first counter C1 equals a predetermined value C1M. This value of the first counter C1 substantially represents the time during which the purging operation is stopped when the engine is operating under a light load, and when the first counter C1 becomes equal to the predetermined value C1M, the purging operation is started. If C1≠C1M, the routine goes to step 242 via step 241 wherein the first counter is incremented. If C1=C1M, the routine directly goes to step 242.

In step 242, it is determined whether or not the depression L of the accelerator pedal 10 is smaller than L1, i.e., the engine is operating under a light load including the idling operation thereof. If L≧L1, i.e., the engine is operating under a medium load or a heavy load, the routine goes to step 243, and a flag, which is set when a reduction of an amount of intake air is to be carried out when the engine is operating under a light load, is reset. In step 244, the first counter is reset, and, in step 245, a second counter is also reset. In step 246, the purging operation is carried out. In step 247, it is determined whether or not the depression L of the accelerator pedal 10 is smaller than L2. If L<L2, i.e., the engine is operating under the medium load, the routine goes to step 248, and the fuel injection is made twice: at the beginning of the intake stroke and at the end of the compression stroke. If L≧L2, i.e., the engine is operating under the heavy load, the routine goes to step 249, and the intake stroke injection is carried out.

If L<L1, the routine goes to step 250, and compression stroke injection is carried out. In step 251, it is determined whether or not the flag is set. If the flag is reset, the routine goes to step 252, and the purging operation is stopped. In step 253, a weighted mean KAF' corresponding to a condition wherein the purging operation is stopped when the engine is operating under a light load is calculated, as in the third embodiment, based on Equation (2). The weighted mean KAF' can be regarded as the amount of fuel injection when the purging operation is stopped when the engine is operating under a light load. In step 254, it is determined whether or not the value of the first counter C1 equals the predetermined value C1M. If C1=C1M, the routine goes to step 255, and the flag is set. In step 256, the purging operation is carried out. If C1≠C1M, the processing cycle is ended.

If the flag is set, the routine goes from step 251 to step 257, and a reduction of the amount of the intake air is carried out. Namely, in step 257, the degree of opening of the throttle valve 7 is made the degree of opening d illustrated in FIG. 24. In step 258, a weighted mean KAF" for which the purging operation is carried out when the engine is operating under a light load is calculated, as in the third embodiment, based on Equation (3). This weighted mean KAF" can be regarded as the amount of fuel injection when the purging operation is carried out when the engine is operating under a light load.

In step 259, it is determined whether or not the value of the second counter C2 equals a predetermined value C2M. This value of the second counter C2 substantially represents the time during which the purging operation is carried out when the engine is operating under a light load. If C2≠C2M, the routine goes to step 260, and the second counter is incremented, and then the processing cycle is ended. If C2=C2M, i.e., a predetermined time has passed since the purging operation was started while the engine is operating under a light load, the routine goes to step 261, and it is determined whether or not the weighted mean KAF" is larger than k·KAF'. At this time, the constant k is predetermined within a range of 0<k≦1. If KAF">k·KAF', the routine goes to step 262, and the purging operation is stopped, since it can be determined that, at this time, the amount of fuel vapor fed into the engine is small and thus cannot be substantially completely burned in the combustion chamber 153. In step 262, the flag is reset. In step, 263 the first counter is reset, and in step 264, the second counter is also reset. If KAF"≦k·KAF', the processing cycle is ended. At this time, the purging operation and the reduction of the amount of the intake air is continued, since it can be determined that, at this time, the amount of fuel vapor fed into the engine is large enough to be substantially completely burned in the combustion chamber 153.

Figure 27:
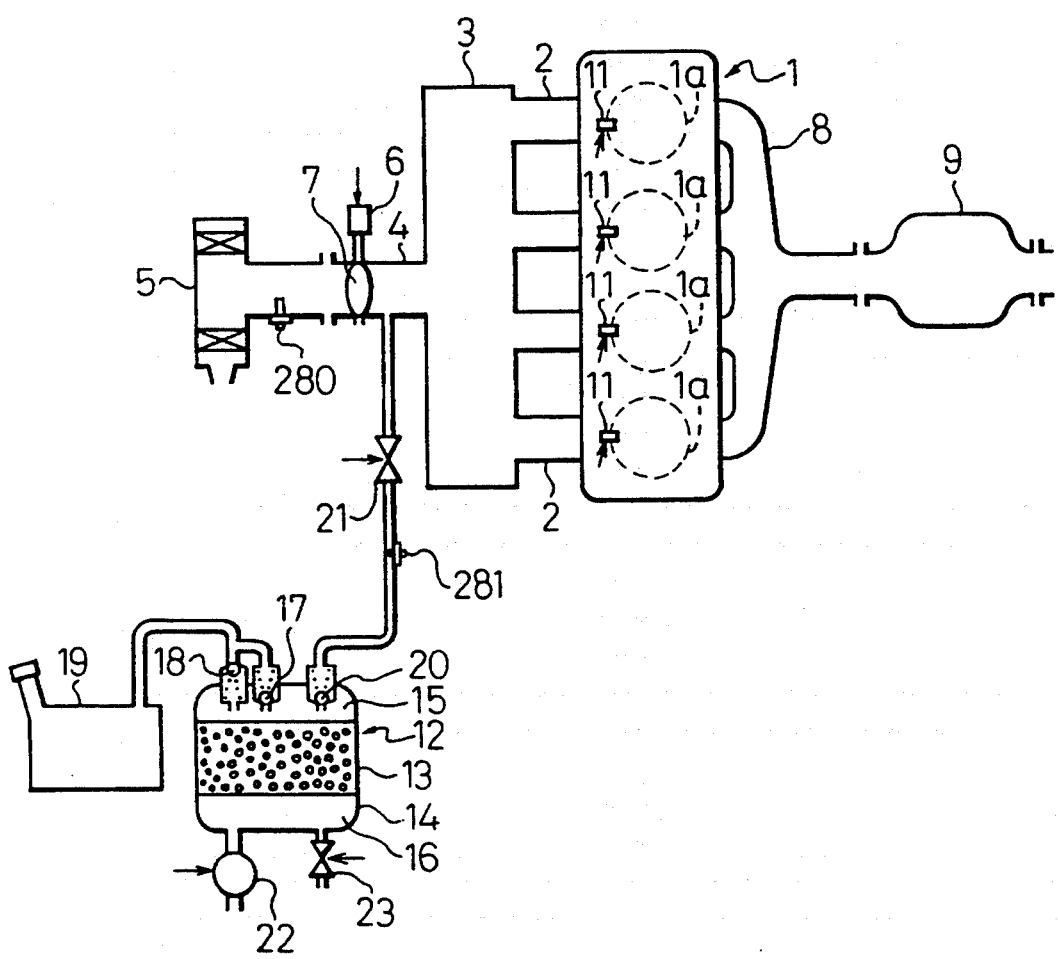
FIG. 27 is a general view of a sixth embodiment of an engine.

FIG. 27 illustrates a sixth embodiment. In this embodiment, an electronic control unit which is the same as an electronic control unit 30 illustrated in FIG. 1 is provided. However this electronic control unit is not depicted in FIG. 27.

Referring to FIG. 27, a temperature sensor 280 for detecting a temperature of the intake air is arranged between an air cleaner 5 and a throttle valve 7. This temperature sensor 280 produces an output voltage proportional to the temperature of the intake air, and this output voltage is input to the input port of the electronic control unit via an A/D converter. Further, a concentration sensor 281 for detecting the concentration of the fuel vapor fed into the engine is arranged between a check valve 20 and a first solenoid valve 21. This concentration sensor 281 produces an output voltage proportional to the concentration of the fuel vapor, and this output voltage is input to the input port of the electronic control unit via an A/D converter. In this embodiment, using the concentration of the fuel vapor detected by the concentration sensor 281, and using the amount of air pumped by an air feed pump 22, the amount of fuel vapor fed into the engine can be calculated.

In this embodiment, a method for fuel injection and combustion is carried out as in the fifth embodiment illustrated in FIG. 23. Namely, when the engine is operating under a heavy load, the fuel injection is carried out at the beginning of the intake stroke. When the engine is operating under a medium load, the fuel injection is carried out twice: at the beginning of the intake stroke and at the end of the compression stroke. When the engine is operating under a light load, including the idling operation thereof, the fuel injection is carried out at the end of the compression stroke. Also, in this embodiment, a purging operation is continuously carried out when the engine is operating under a heavy load or under a medium load.

When the engine is operating under a light load, including the idling operation, the purging operation is stopped. Thereafter, when a first predetermined time passes from stopping the purging operation, the purging operation is carried out wherein a degree of opening D of a first solenoid valve 21 is made a predetermined degree of opening D0. The first predetermined time is predetermined at the time the engine is started to become shorter as the temperature of the intake air T is higher.

Figure 28:
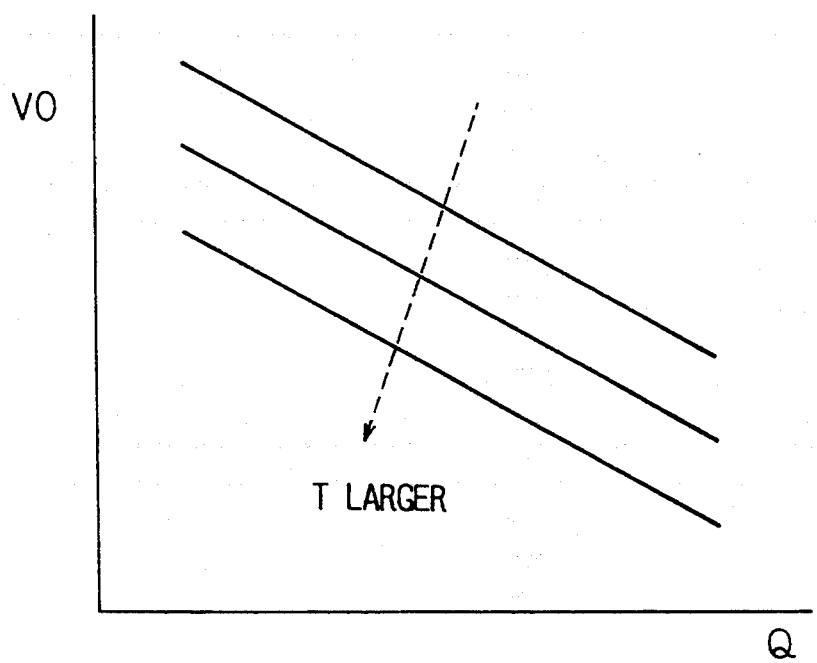
FIG. 28 is a diagram illustrating the tolerable minimum amount.
Figure 29B:
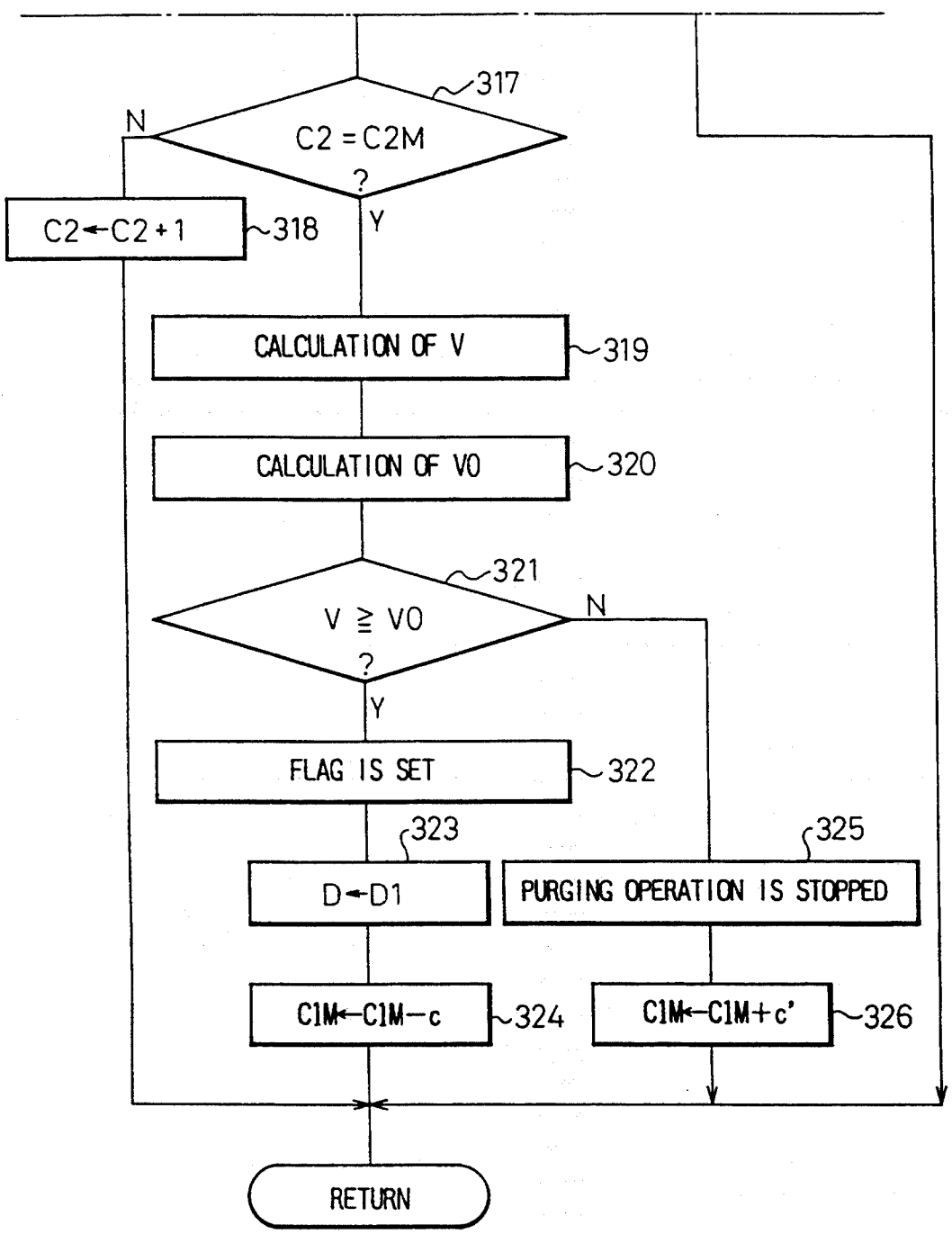
Figure 30:
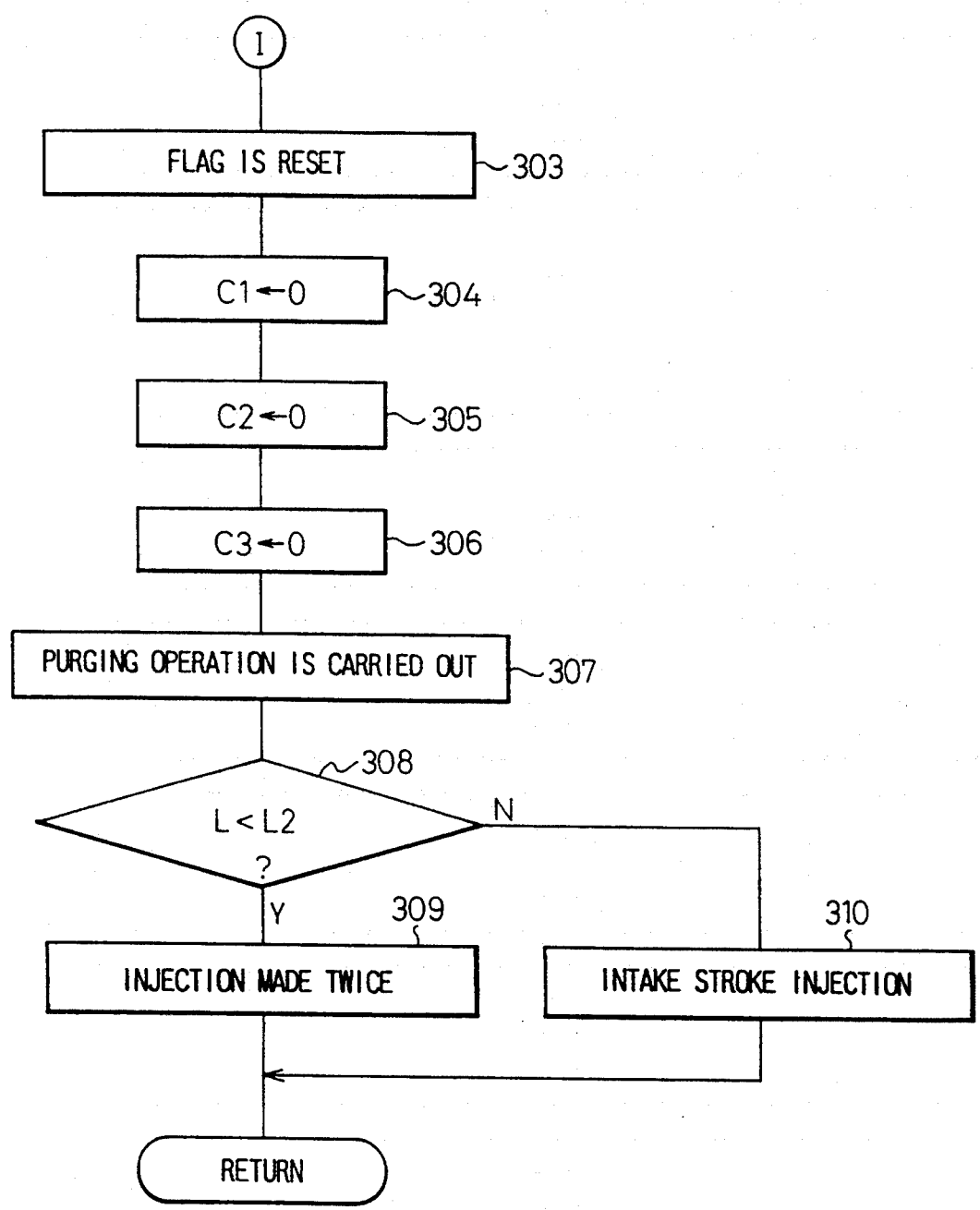
Figure 31:
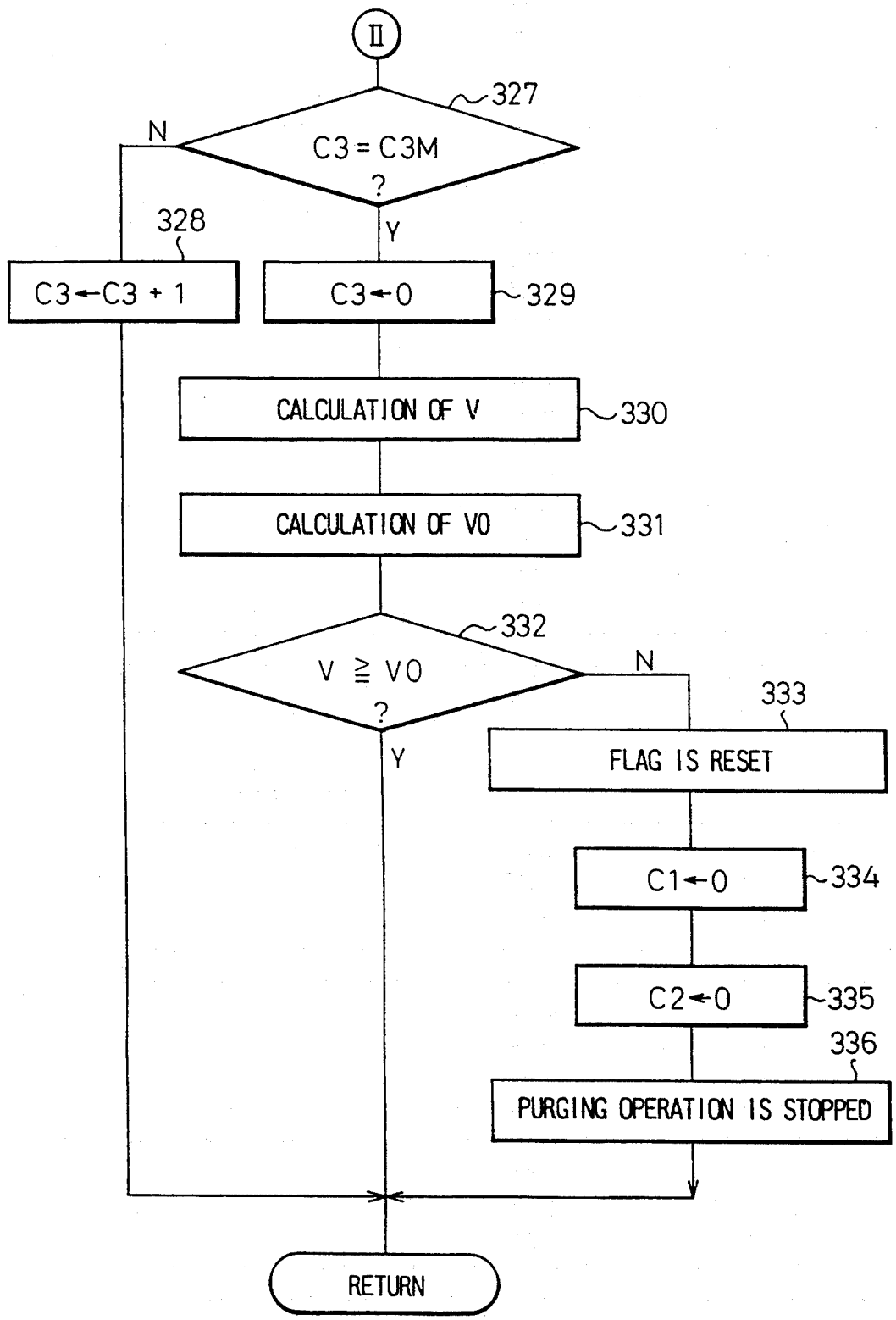

Thereafter, when a second predetermined time passes from the carrying out of the purging operation when the engine is operating under a light load, it is determined whether or not the amount of fuel vapor V fed into the engine is larger than a tolerable minimum amount V0 in which fuel vapor fed into the engine is substantially completely burned even when the engine is operating under a light load wherein an air-fuel mixture is burned in an excess of air. As illustrated in FIG. 28, this tolerable minimum amount V0, which becomes smaller as the amount of fuel injection Q becomes larger and as the temperature of the intake air T rises, is stored in the ROM of an electronic control unit. If the amount of fuel vapor V fed into the engine is larger than the tolerable minimum amount V0, the purging operation is continued and the degree of opening D of the first solenoid valve 21 is made D1 which is higher than D0, i.e., at this time, the amount of fuel vapor fed into the engine is increased. Also, the first predetermined time is shortened, whereby the time during which the purging operation is stopped when the engine is operating under a light load is shortened. Conversely, if the amount of fuel vapor V fed into the engine is smaller than the tolerable minimum amount V0, the purging operation is stopped. Accordingly, fuel vapor is prevented from being discharged into the exhaust manifold 8 without being burned. Also, at this time, the first predetermined time is lengthened so that the time during which the purging operation is stopped when the engine is operating under the light load is lengthened.

Next, the routine executing the sixth embodiment will be described with reference to FIGS. 29A, 29B, 30 and 31.

Figure 32:
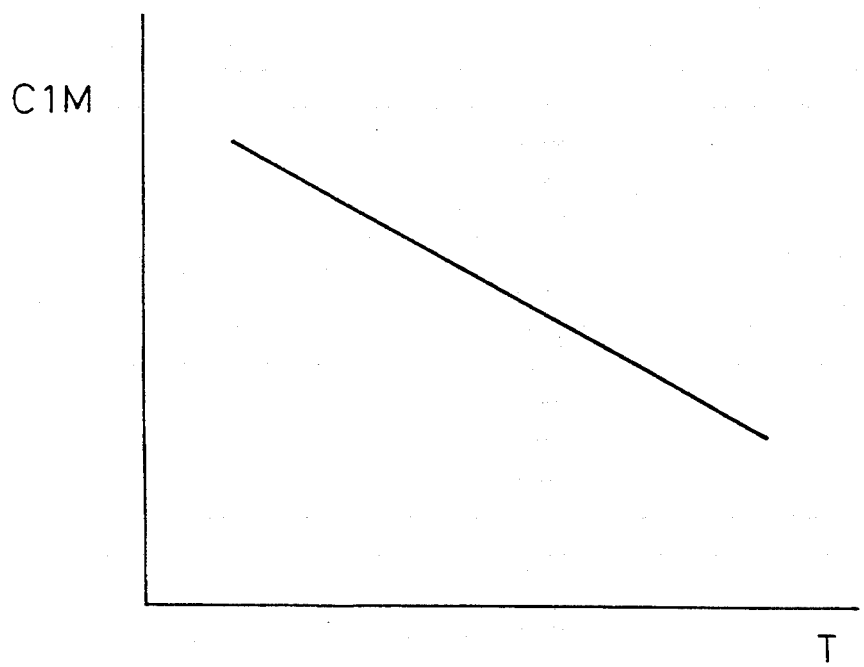
FIG. 32 is a diagram illustrating the predetermined value for the first counter.

Referring to FIGS. 29A, 29B, 30 and 31, in step 300, it is determined whether or not the value in the first counter C1 is larger than a predetermined value C1M which is calculated when the engine is started. As illustrated in FIG. 32, the value C1M, which becomes smaller as the temperature of the intake air T becomes higher, is and is stored in the ROM of the electronic control unit. On the other hand, the value of the first counter C1 represents the time during which the purging operation is stopped when the engine is operating under a light load. If C1<C1M, the routine goes to step 302 via step 301 wherein the first counter is incremented. If C1≧C1M, then the routine goes directly to step 302, and it is determined whether or not a depression L of accelerator pedal 10 is smaller than L1, i.e., the engine is operating under a light load. If L≧L1, the routine goes to step 303.

In step 303, a flag, which is set when the purging operation is to be carried out while the engine is operating under a light load, is reset. In step 304, the first counter is reset. In step 305, a second counter is reset. In step 306, a third counter is also reset. In step 307, the purging operation is carried out. In step 308, it is determined whether or not the depression L of the accelerator pedal 10 is smaller than L2, i.e., the engine is operating under a medium load. If L<L2, the routine goes to step 309, and the fuel injection is performed twice. If L≧L2, the routine goes to step 310, and the intake stroke injection is carried out.

If L<L1, the routine goes to step 311, and compression stroke injection is carried out. In step 312, it is determined whether or not the flag is set. If the flag is reset, the routine goes to step 313, and the third counter is reset. In step 314, it is determined whether or not the value of the first counter C1 is smaller than the value of C1M. If C1<C1M, the routine goes to step 315, and the purging operation is stopped. Then the processing cycle is ended. If C1≧C1M, the routine goes to step 316, and the degree of opening D of the first solenoid valve 21 is made the predetermined degree D0.

In step 317, it is determined whether or not the value of the second counter C2 equals a predetermined value C2M. The value of the second counter C2 represents the time during which the degree of opening D remains D0. If C2≠C2M, the routine goes to step 318, and the second counter is incremented, and then the processing cycle is ended. If C2=C2M, the routine goes to step 319, and the amount of fuel vapor V fed into the engine is calculated. In step 320, a tolerable minimum amount V0 is calculated. In step 321, it is determined whether the amount of fuel vapor V fed into the engine is equal to or larger than the tolerable minimum amount V0. If V≧V0, the routine goes to step 322, and the flag is set. In step 323, the degree of opening D of the first solenoid valve 21 is made a predetermined degree D1, which is predetermined to be higher than D0. In step 324, the value C1M is made C1M-c. Conversely, if V<V0, the routine goes to step 325, and the purging operation is stopped. In step 326, the value C1M is made C1M+c'.

If the flag is set, the routine goes from step 312 to step 327, and it is determined whether or not the value of the third counter C3 equals a predetermined value C3M. If C3≠C3M, the routine goes to step 328, and the third counter is incremented, and then the processing cycle is ended. If C3=C3M, the routine goes to step 329 and the third counter is reset. In step 330, the amount of fuel vapor V fed into the engine is calculated. In step 331, the tolerable minimum amount V0 is calculated. In step 332, it is determined whether the amount of fuel vapor V fed into the engine is equal to or larger than the tolerable minimum amount V0. If V≧V0, the processing cycle is ended, i.e., the purging operation is continued wherein the degree of opening D remains D1. If V<V0, the routine goes to step 333, and the flag is reset. In step 334, the first counter is reset. In step 335, the second counter is reset. In step 336, the purging operation is stopped.

Next, the seventh embodiment will be described. In this embodiment, however, the engine operation will be described only when the engine operation state is idling operation state, and the engine operation when the engine operation state is other than the idling operation state is the same as in the sixth embodiment described above.

When the engine operation mode is an idling operation, the purging operation is stopped. Thereafter, when a first predetermined time passes from the stopping of the purging operation, the purging operation is carried out wherein the degree of opening D of the first solenoid valve 21 is made a predetermined degree of opening D0. Thereafter, when a second predetermined time passes from the carrying out of the purging operation during the idling operation of the engine, it is determined whether or not the amount of fuel vapor V fed into the engine is larger than a tolerable minimum amount V0 in which fuel vapor fed into the engine is substantially completely burned even when the air-fuel mixture is burned in the excess air during the idling operation of the engine. As illustrated in FIG. 28, this tolerable minimum amount V0 is stored in the ROM of an electronic control unit as a function of an amount of fuel injection Q and of the temperature of the intake air T, as in the aforementioned embodiment. If the amount of fuel vapor V fed into the engine is larger than the tolerable minimum amount V0, the purging operation is continued and the degree of opening D of the first solenoid valve 21 is made D1 which is larger than D0, i.e., at this time, the amount of fuel vapor fed into the engine is increased. Conversely, if the amount of fuel vapor V fed into the engine is smaller than the tolerable minimum amount V0, the purging operation is stopped. Accordingly, the fuel vapor is prevented from being discharged into the exhaust manifold 8 without being burned.

When the purging operation is continued during the idling operation of the engine when the amount of the fuel vapor V fed into the engine is larger than the tolerable minimum amount V0, the fuel injection is stopped, in this seventh embodiment. Also, at this time, the degree of opening D of the first solenoid valve 21 is feedback-controlled so that the idling speed N is maintained at a desired speed. In this case, if the idling speed N becomes lower than a tolerable minimum idling speed Nmin, the fuel injection is restarted and the purging operation is stopped. Accordingly, the engine speed N can be prevented from becoming lower than the tolerable minimum speed Nmin while the fuel vapor is prevented from being discharged to the exhaust manifold 8 without being burned.

Next, the routine executing the seventh embodiment will be described with reference to FIGS. 33A, 33B, and 34.

Figure 33B:
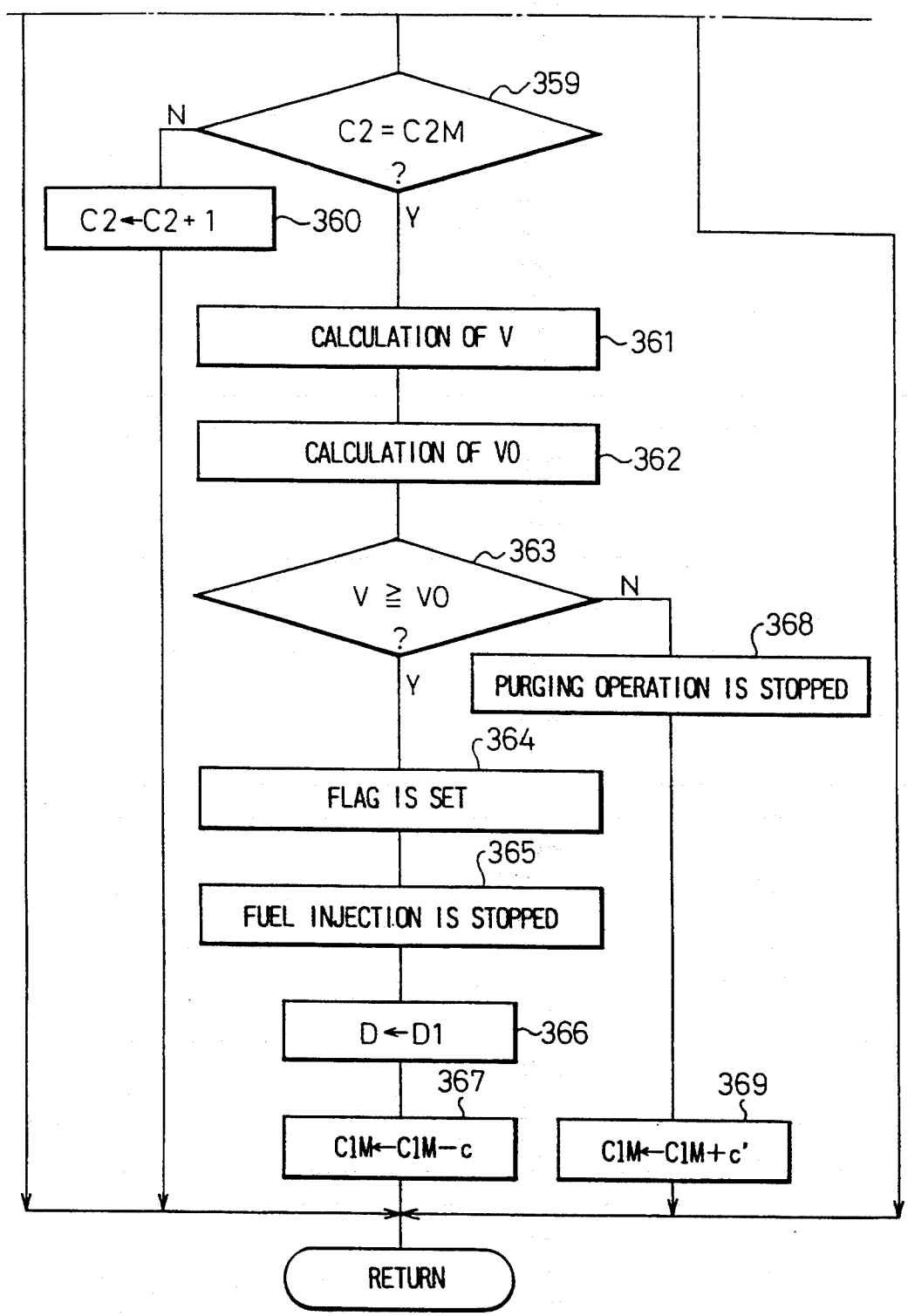

Referring to FIGS. 33A, 33B, and 34, in step 350, it is determined whether or not the value in a first counter C1 is larger than a predetermined value C1M which is calculated when the engine is started. As illustrated in FIG. 32, the value C1M, which becomes smaller as a temperature of an intake air T rises, is stored in the ROM of the electronic control unit. On the other hand, the value of the first counter C1 represents the time during which the purging operation is stopped during the idling operation of the engine. If $C1 < C1M$, the routine goes to step 352 via step 351 wherein the first counter C1 is incremented. If $C1 \geq C1M$, then the routine goes directly to step 352, and it is determined whether or not the engine operating state is the idling operation state. If the engine operating state is not the idling operation state, the routine goes to step 353, and the first counter is reset. In step 354, a second counter is also reset, and then the processing cycle is ended.

If the engine operating state is the idling operation state, the routine goes to step 355, and it is determined whether or not a flag, which is set when the fuel injection is to be stopped during the idling operation, is set. If the flag is reset, the routine goes to step 356, and it is determined whether the value of the first counter C1 is equal to or larger than the value C1M. If $C1 < C1M$, the routine goes to step 357, and the purging operation is stopped, and then the processing cycle is ended. If $C1 \geq C1M$, the routine goes to step 358, and the degree of opening D of the first solenoid valve 21 is made a predetermined degree D0.

In step 359, it is determined whether or not the value of the second counter C2 equals a predetermined value C2M. The value of the second counter C2 represents the time during which the degree of opening D remains D0. If $C2 \neq C2M$, the routine goes to step 360, and the second counter is incremented, and then the processing cycle is ended. If $C2 = C2M$, the routine goes to step 361, and the amount of fuel vapor V fed into the engine is calculated. In step 362, a tolerable minimum amount V0 is calculated. In step 363, it is determined whether the amount of fuel vapor V fed into the engine is equal to or larger than the tolerable minimum amount V0. If $V \geq V0$, the routine goes to step 364, and the flag is set. In step 365, fuel injection is stopped. In step 366, the degree of opening D of the first solenoid valve 21 is made a predetermined degree D1, which is predetermined to be larger than D0. In step 367, the value C1M is made C1M-c. Conversely, if $V < V0$, the routine goes to step 368, and the purging operation is stopped. In step 369, the value C1M is made $C1M + c'$.

If the flag is set, the routine goes from step 355 to step 370, and it is determined whether or not the idling speed N of the engine is higher than the tolerable minimum speed Nmin. If $N > N\text{min}$, the routine goes to step 371, and the first solenoid valve 21 is controlled so that the idling speed of the engine is maintained at the desired idling speed, and then the processing cycle is ended. If $N \leq N\text{min}$, the routine goes to step 372, and the flag is reset. In step 373, the first counter is reset. In step 374, the second counter is reset. In step 375 fuel injection is restarted. In step 376, the purging operation is stopped.

Next, a eighth embodiment will be described. In this embodiment, the engine 1 may be constructed as illustrated in FIG. 27, but the concentration sensor illustrated in FIG. 27 need not be provided.

Also, in this embodiment, a method for fuel injection and combustion is carried out as in the fifth embodiment illustrated in FIG. 23. Namely, when the engine is operating under a heavy load, fuel injection is carried out at the beginning of the intake stroke. When the engine is operating under a medium load, fuel injection is carried out twice: at the beginning of the intake stroke and at the end of the compression stroke. When the engine is operating under a light load, including during the idling operation thereof, fuel injection is carried out at the end of the compression stroke. Further, in this embodiment, a purging operation is continuously carried out when the engine is operating under a heavy load or a medium load.

When the engine operates under a light load, including during the idling operation, the purging operation is stopped. Thereafter, when a first predetermined time passes from the stopping of the purging operation, the purging operation is carried out wherein a degree of opening D of a first solenoid valve 21 is made a predetermined degree of opening D0. The first predetermined time which is predetermined to become shorter as the temperature of the intake air T increases is determined when the engine is started.

Figure 35:
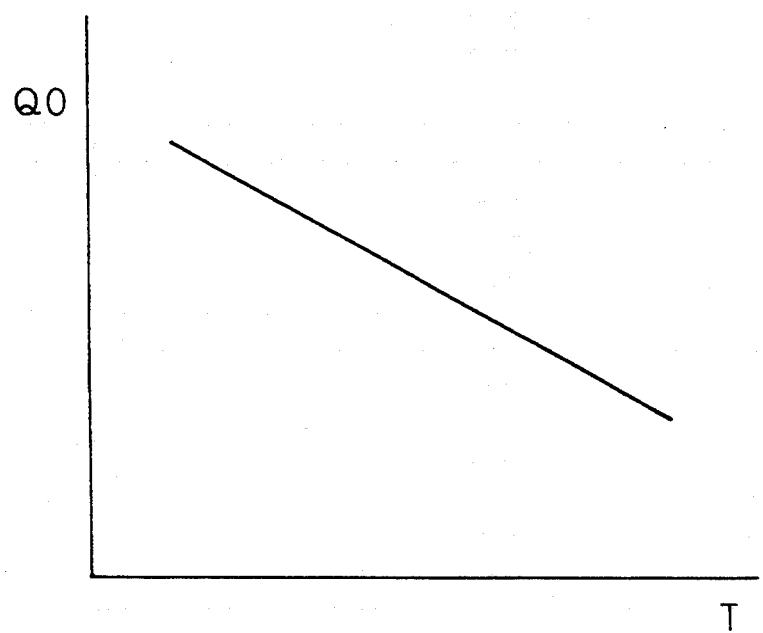
FIG. 35 is a diagram illustrating the tolerable maximum amount.
Figure 36B:
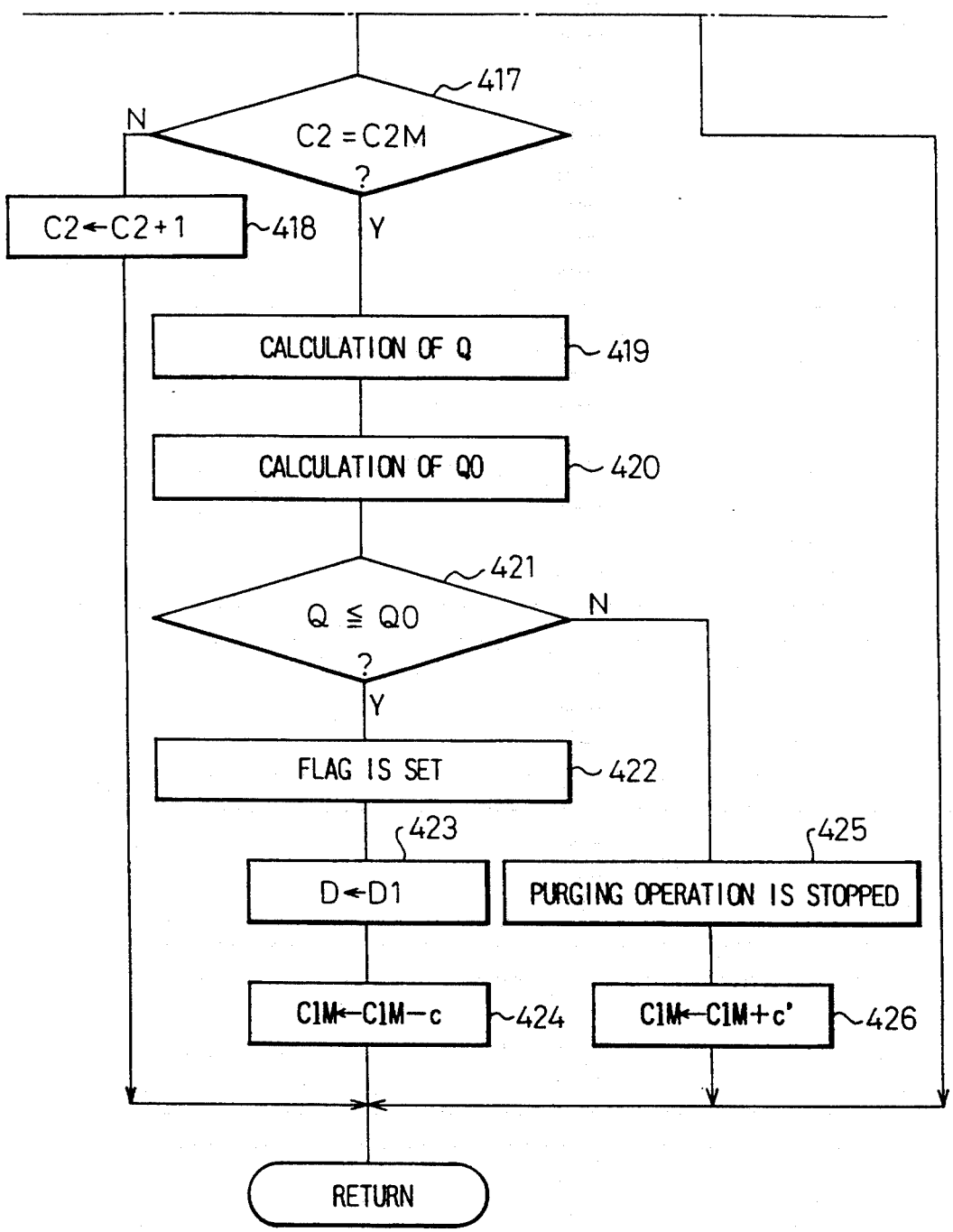
Figure 37:
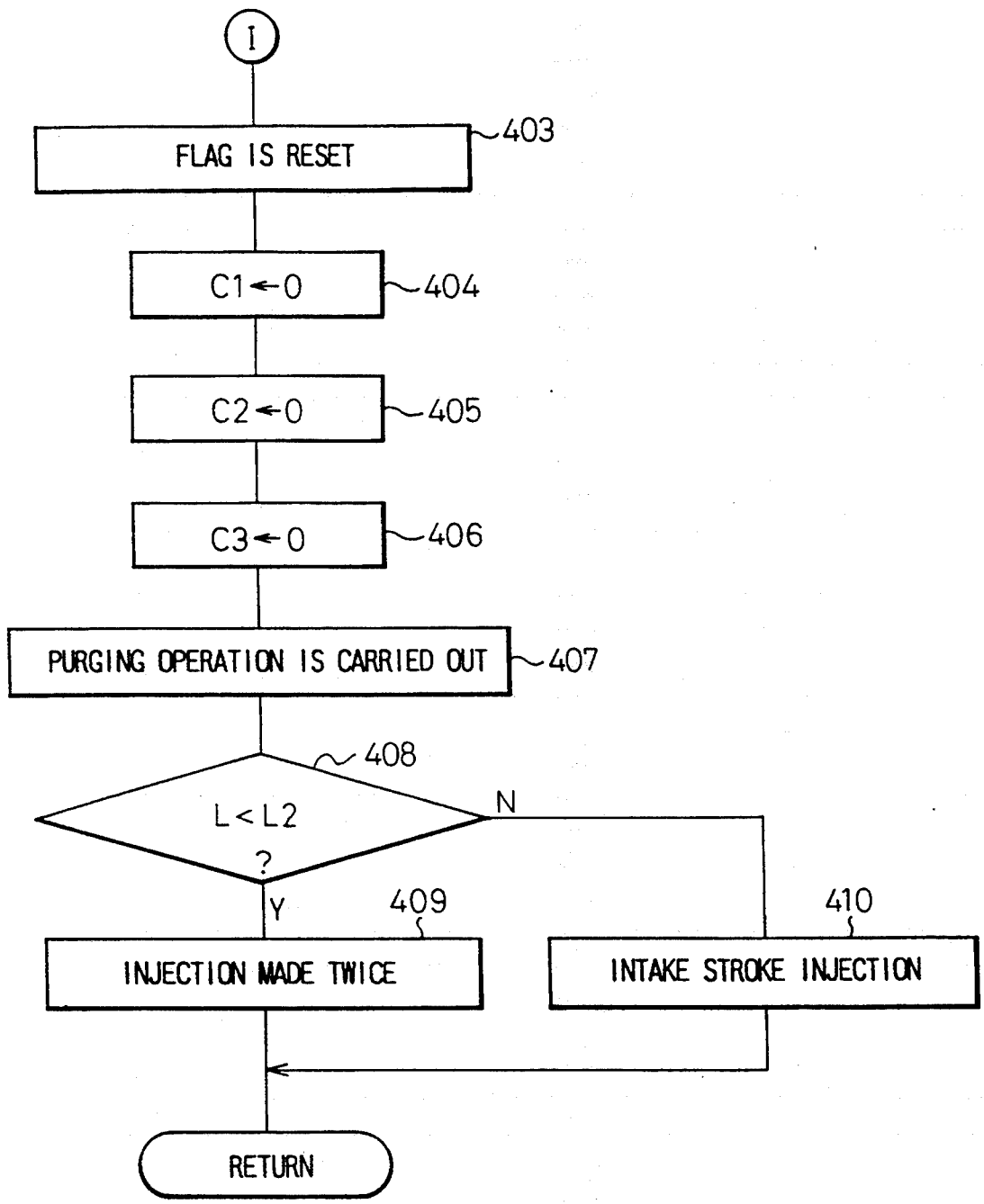
Figure 38:
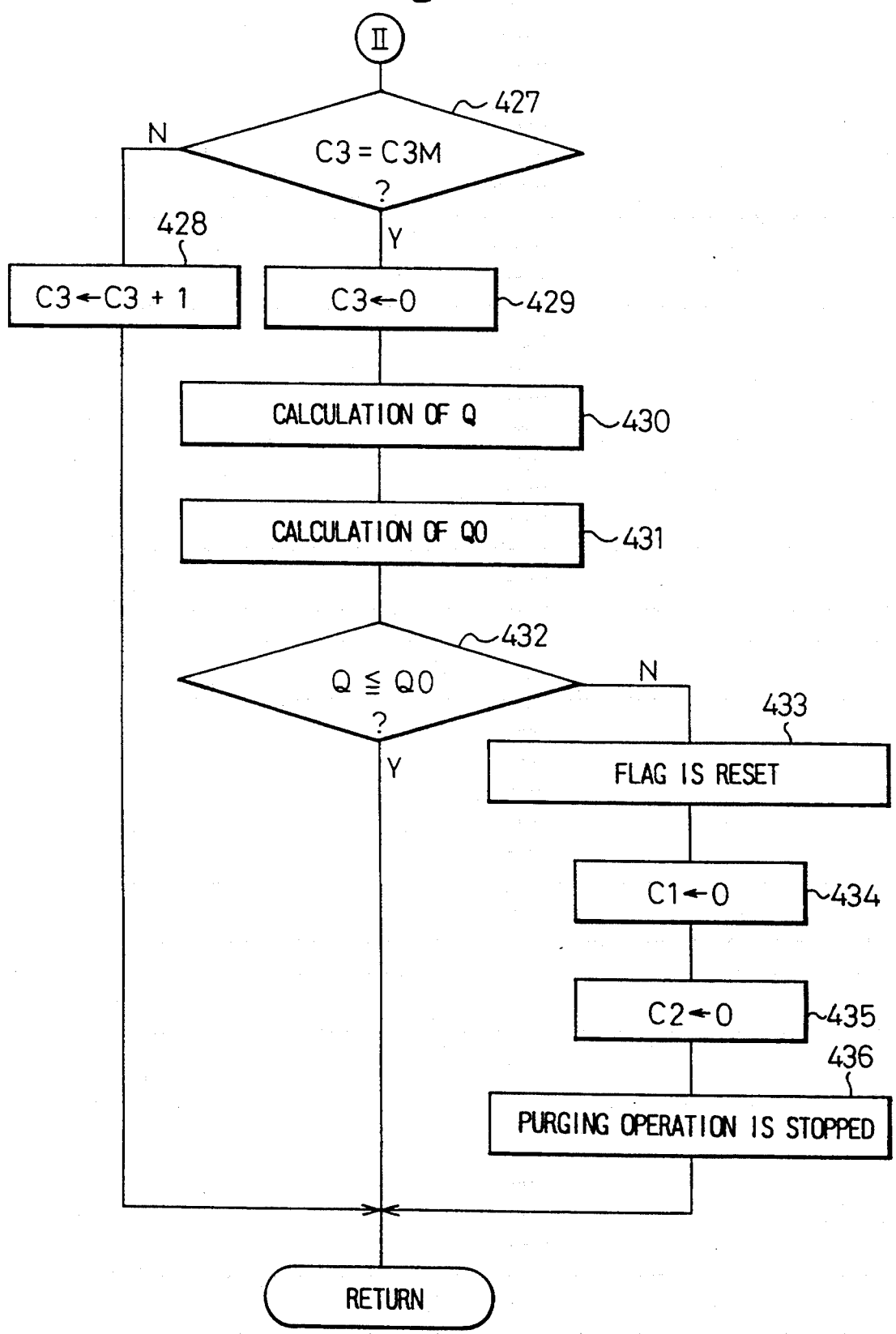

Thereafter, when a second predetermined time passes from carrying out of the purging operation when the engine is operating under a light load, it is determined whether or not an amount of fuel injection Q is smaller than a tolerable maximum amount Q0. In this embodiment, the amount of fuel injection is increased when the amount of fuel vapor becomes smaller. Accordingly, when the amount of fuel injection becomes smaller than the tolerable maximum amount Q0, it can be detected that the fuel vapor fed into the engine is substantially completely burned even when the engine is operating under the light load, wherein an air-fuel mixture is burned in the excess air. As illustrated in FIG. 35, this tolerable maximum amount Q0, which becomes smaller as the temperature of the intake air T increases, is stored in the ROM of an electronic control unit.

If the amount of fuel injection Q is smaller than the tolerable maximum amount Q0, the purging operation is continued and the degree of opening D of the first solenoid valve 21 is made D1 which is larger than D0, i.e., at this time, the amount of fuel vapor fed into the engine is increased. Also, the first predetermined time is shortened, whereby the time during which the purging operation is stopped when the engine is operating under a light load is shortened. Conversely, if the amount of fuel injection Q becomes larger than the tolerable maximum amount Q0, the purging operation is stopped since, at this time the amount of fuel vapor fed into the engine becomes smaller. Accordingly, fuel vapor is prevented from being discharged to the exhaust manifold 8 without being burned. Also, at this time, the first predetermined time is lengthened so that the time during which the purging operation is stopped when the engine is operating under a light load is lengthened.

Next, the routine executing the eighth embodiment will be described with reference to FIGS. 36A, 36B, 37 and 38.

Referring to FIGS. 36A, 36B, 37 and 38, in step 400, it is determined whether or not the value in the first counter C1 is larger than a predetermined value C1M which is calculated when the engine is started. As illustrated in FIG. 32, the value C1M is stored in the ROM of the electronic control unit, as a function of the temperature of the intake air T. On the other hand, the value of the first counter C1 represents the time during which the purging operation is stopped when the engine is operating under a light load. If C1<C1M, the routine goes to step 402 via step 401 wherein the first counter C1 is incremented. If C1≧C1M, then the routine goes directly to step 402, and it is determined whether or not a depression L of accelerator pedal 10 is smaller than L1, i.e., the engine is operating under a light load. If L≧L1, the routine goes to step 403.

In step 403, a flag, which is set when the purging operation is to be carried out when the engine is operating under a light load, is reset. In step 404, the first counter is reset. In step 405, the second counter is reset. In step 406, the third counter is reset. In step 407, the purging operation is carried out. In step 408, it is determined whether or not the depression L of the accelerator pedal 10 is smaller than L2, i.e., the engine is operating under a medium load. If L<L2, the routine goes to step 409, and the fuel injection is performed twice. If L≧L2, the routine goes to step 410, and the intake stroke injection is carried out.

If L<L1, the routine goes to step 411, and compression stroke injection is carried out. In step 412, it is determined whether or not the flag is set. If the flag is reset, the routine goes to step 413, and the third counter is reset. In step 414, it is determined whether the value of the first counter C1 is equal to or larger than the value C1M. If C1<C1M, the routine goes to step 415, and the purging operation is stopped, and then the processing cycle is ended. If C1≧C1M, the routine goes to step 416, and the degree of opening D of the first solenoid valve 21 is made a predetermined degree D0.

In step 417, it is determined whether or not the value of the second counter C2 equals the predetermined value C2M. The value of the second counter C2 represents the time during which the degree of opening D remains D0. If C2≠C2M, the routine goes to step 418, and the second counter is incremented, and then the processing cycle is ended. If C2=C2M, the routine goes to step 419, and the amount of fuel injection Q is calculated. In step 420, a tolerable maximum amount Q0 is calculated. In step 421, it is determined whether or not the amount of fuel injection Q is smaller than or equal to the tolerable maximum amount Q0. If Q≦Q0, the routine goes to step 422, and the flag is set. In step 423, the degree of opening D of the first solenoid valve 21 is made the predetermined degree D1, which is predetermined to be larger than D0. In step 424, the value C1M is made C1M-c. Conversely, if Q>Q0, the routine goes to step 425, and the purging operation is stopped. In step 426, the value C1M is made C1M+c'.

If the flag is set, the routine goes from step 412 to step 427, and it is determined whether or not the value of the third counter C3 equals a predetermined value C3M. If C3≠C3M, the routine goes to step 428, and the third counter C3 is incremented, and then the processing cycle is ended. If C3=C3M, the routine goes to step 429, and the third counter is reset. In step 430, the amount of fuel injection Q is calculated. In step 431, the tolerable maximum amount Q0 is calculated. In step 432, it is determined whether the amount of fuel injection Q is smaller than or equal to the tolerable maximum amount Q0. If Q≦Q0, the processing cycle is ended, i.e., the purging operation is continued wherein the degree of opening D remains D1. If Q>Q0, the routine goes to step 433, and the flag is reset. In step 434, the first counter is reset. In step 435, the second counter is reset. In step 436, the purging operation is stopped.

In the embodiments described above, an EGR system, wherein, for example, the exhaust manifold 8 is connected to the intake duct 4 via a solenoid valve, may be provided.

According to the present invention, it is possible to suppress the discharge of harmful gas to the outside air and to maintain an idling speed within a predetermined range.

While the invention has been described by reference to specific embodiments chosen for purposes of illustration, it should be apparent that numerous modifications could be made thereto by those skilled in the art without departing from the basic concept and scope of the invention.

I claim:

1. An internal combustion engine having a combustion chamber, an intake passage and an exhaust passage, the engine comprising:
   fuel injection means for feeding fuel into the engine;
   purge control means for controlling the feeding of fuel vapor into the engine;
   idling speed control means for controlling a fuel injection operation and a purging operation while the engine is idling, wherein the idling speed control means controls the purge control means to carry out the purging operation continuously, the idling speed control means determining a quantity of fuel which, in addition to the fuel vapor fed to the engine via the purge control means, is required to maintain an idling speed of the engine at a desired idling speed and controlling the fuel injection means to feed the required additional quantity of fuel to the engine, and wherein the idling speed control means stops the fuel injection operation when the required additional quantity of fuel becomes smaller than a predetermined minimum fuel injection amount.

2. An engine according to claim 1, wherein the idling speed control means restarts the fuel injection operation when the idling speed of the engine becomes lower than a tolerable minimum idling speed.

3. An engine according to claim 1, wherein the idling speed control means comprises injection pressure control means for controlling a fuel injection pressure and injection time control means for controlling a fuel injection time, wherein the fuel injection time control means adjusts the fuel injection time to adjust the amount of fuel fed into the engine by the fuel injection control means, while the fuel injection pressure is maintained constant, and wherein the injection pressure control means controls the fuel injection pressure to adjust the amount of fuel fed into the engine by the fuel injection control means when a determined fuel injection time becomes less than a predetermined minimum injection time while the fuel injection time is maintained at the predetermined minimum injection time.

4. An engine according to claim 1, wherein the purge control means comprises a charcoal canister having an activated carbon layer therein for adsorbing fuel vapor, and wherein the charcoal canister comprises a fuel vapor chamber arranged on one side of the activated carbon layer, the fuel vapor chamber being connected to a fuel vapor source and to the intake passage via a purge control valve, the charcoal canister further including an air chamber connected to the outside air and arranged on a side of the activated carbon layer opposite the fuel vapor chamber, the purge control means opening the purge control valve when the purging operation of the fuel vapor is to be carried out and closing the purge control valve when the purging operation is to be stopped.

5. An internal combustion engine having a combustion chamber, an intake passage and an exhaust passage, said engine comprising:

purge control means for controlling the feeding of fuel vapor into the engine;

air-fuel mixture forming means for forming an air-fuel mixture substantially contained within a restricted region within the combustion chamber when purging operation is carried out while the engine load is lower than a predetermined load and for forming an air-fuel mixture spreading over substantially the entire interior of the combustion chamber when the engine load is higher than said predetermined load; and combustion control means for controlling an air-fuel mixture forming operation and a purging operation, when the purging operation is carried out while the engine load is lower than the predetermined load, to burn the fuel vapor fed into the engine.

6. An engine according to claim 5, wherein the combustion control means controls the air-fuel mixture forming means to form an air-fuel mixture spreading over the entire interior of the combustion chamber when the purging operation is carried out while the engine load is lower than the predetermined load.

7. An engine according to claim 5, comprising reducing means for reducing the amount of intake air, wherein the combustion control means controls the reducing means to reduce the amount of intake air when the purging operation is carried out while the engine load is lower than the predetermined load.

8. An engine according to claim 5, comprising determining means for determining whether the amount of fuel vapor fed into the engine exceeds a first predetermined amount of fuel vapor, wherein the combustion control means stops the purging operation when the amount of fuel vapor is smaller than the first predetermined amount and carries out the purging operation when the amount of fuel vapor exceeds the first predetermined amount.

9. An engine according to claim 8, further comprising air-fuel mixture forming means including fuel feeding means for feeding fuel into the engine and air-fuel ratio controlling means for controlling the fuel feeding means so that the air-fuel ratio is maintained at a predetermined desired air-fuel ratio, wherein the determining means determines that the amount of fuel vapor fed into the engine exceeds the first predetermined amount when the amount of fuel injected becomes lower than a second predetermined amount.

10. An engine according to claim 8, wherein the determining means determines that the amount of fuel vapor exceeds the first predetermined amount when the idling speed of the engine is higher than a predetermined idling speed.

11. An engine according to claim 8, comprising detecting means for detecting the amount of fuel vapor fed into the engine, the determining means determining that the amount of fuel vapor fed into the engine exceeds the first predetermined amount when the amount of fuel vapor detected by said detecting means exceeds a third predetermined value.

12. An engine according to claim 8, further comprising means for detecting the temperature of the intake air, wherein the determining means determines whether the amount of fuel vapor exceeds the first predetermined amount at selected time intervals which become shorter as the detected temperature of the intake air becomes higher.

13. An engine according to claim 8, further comprising fuel feeding means for feeding fuel to the engine, wherein the combustion control means controls the fuel feeding means to stop the fuel feeding operation when the amount of fuel vapor fed into the engine exceeds the first predetermined amount and wherein the combustion control means controls the fuel feeding means to carry out the fuel feeding operation when the amount of fuel vapor is smaller than the first predetermined amount.

14. An engine according to claim 5, wherein the combustion control means carries out the purging operation continuously when the engine load is higher than the predetermined load.

15. An engine according to claim 5, wherein the mixture forming means includes a fuel injector arranged in the combustion chamber, said fuel injector injecting fuel during the compression stroke of the engine when the air-fuel mixture forming means forms an air-fuel mixture substantially contained within a restricted region within the combustion chamber and injecting fuel during the intake stroke of the engine when the air-fuel mixture forming means forms an air-fuel mixture spreading over substantially the entire interior of the combustion chamber.

16. An engine according to claim 5, wherein the air-fuel mixture forming means comprising a first fuel injector arranged in the combustion chamber and a second fuel injector arranged in the intake passage of the engine, wherein the air-fuel mixture forming means controls the first and second fuel injectors so that only the first fuel injector injects fuel when the air-fuel mixture forming means forms an air-fuel mixture substantially contained within a restricted region within the combustion chamber and wherein the air-fuel mixture forming means controls the first and second fuel injectors so that the second fuel injector injects fuel when the air-fuel mixture forming means forms an air-fuel mixture spreading over substantially the entire interior of the combustion chamber.

17. An engine according to claim 5, wherein the purge control means comprises a charcoal canister having an activated carbon layer therein for adsorbing fuel vapor, and, wherein the charcoal canister further includes a fuel vapor chamber arranged on a first side of the activated carbon layer, the fuel vapor chamber being connected to a fuel vapor source and being connected to the intake passage via a purge control valve, and, wherein the charcoal canister further includes an air chamber arranged on a second side of the activated carbon layer, opposite the first side, the air chamber being connected to the outside air, wherein the purge control means opens the purge control valve when the purging operation is to be carried out and closing the purge control valve when the purging operation is to be stopped.

* * * * *

UNITED STATES PATENT AND TRADEMARK OFFICE
CERTIFICATE OF CORRECTION

PATENT NO. : 5,438,967
DATED : August 8, 1995
INVENTOR(S) : Yasusi ITO

It is certified that error appears in the above-indentified patent and that said Letters Patent is hereby corrected as shown below:

Column 1, line 29, delete "an" before "another".

Column 2, line 33, after "FIGS." delete "14".

Column 2, line 46, after "FIGS." delete "21".

Column 2, line 52, after "FIGS." delete "25".

Column 2, line 59, after "FIGS." delete "29".

Column 2, line 63, after "FIGS." delete "33".

Column 2, line 67, after "FIGS." delete "36".

Column 2, line 68, change "a" to --an--.

Column 3, line 16, change "and" to --are-- and insert --by-- before "signals".

Column 4, line 27, change "cably" to --ceably--.

Column 4, line 39, insert --on-- between "and" and "the"

Column 8, line 26, after "injection" insert a comma.

Column 11, line 27, after "out" insert a comma.

Column 13, line 5, change "KAFO" to --KAF'--.

UNITED STATES PATENT AND TRADEMARK OFFICE
CERTIFICATE OF CORRECTION

PATENT NO. : 5,438,967
DATED : August 8, 1995
INVENTOR(S) : Yasusi ITO

It is certified that error appears in the above-indentified patent and that said Letters Patent is hereby corrected as shown below:

Column 13, line 10, change "KAF= (N-1)KAF+KAF /N" to --KAF' = (N-1)· KAF' + KAF /N --.

Column 14, line 2, change "k KAF"," to --k KAF'--.

Column 14, line 22, change "is" at end of line to --in--.

Column 15, line 26, delete "of".

Column 17, line 52, change "KAF"" to --KAF'--.

Column 17, line 52, change "for which the purging" to --corresponding to a condition where in the purging--.

Column 19, line 55, change "KAF"" to --KAF'--.

Column 19, line 55, change "for which the purging" to --corresponding to a condition where in the purging--.

Column 21, line 42, change "higher, is and is stored" to --higher, is stored--.

Column 23, line 11, delete "the".

Column 23, line 15, delete "the" at end of line.

Column 23, line 17, delete "the".

Column 23, line 23, delete "the" before "fuel".

UNITED STATES PATENT AND TRADEMARK OFFICE
CERTIFICATE OF CORRECTION

PATENT NO. : 5,438,967
DATED : August 8, 1995
INVENTOR(S) : Yasusi ITO

It is certified that error appears in the above-indentified patent and that said Letters Patent is hereby corrected as shown below:

Column 23, line 26, delete "the".

Column 24, line 25, change "a" to --an--.

Column 24, line 28, insert --be-- before "provided."

Column 24, line 54, insert --the-- after "from".

Column 28, line 61, change "comprising" to --comprises--.

Signed and Sealed this

Sixteenth Day of April, 1996

BRUCE LEHMAN

Attest:

Attesting Officer

Commissioner of Patents and Trademarks